United States Patent
Lin et al.

(10) Patent No.: US 12,472,272 B2
(45) Date of Patent: *Nov. 18, 2025

(54) RADIOLABELLED COMPOUNDS FOR DIAGNOSIS OR TREATMENT OF PROSTATE-SPECIFIC MEMBRANE ANTIGEN- EXPRESSING CANCER

(71) Applicants: PROVINCIAL HEALTH SERVICES AUTHORITY, Vancouver (CA); THE UNIVERSITY OF BRITISH COLUMBIA, Vancouver (CA)

(72) Inventors: Kuo-Shyan Lin, Richmond (CA); François Bénard, Vancouver (CA); Hsiou-Ting Kuo, Sherbrooke (CA); Helen Merkens, Burnaby (CA); Zhengxing Zhang, Vancouver (CA)

(73) Assignees: PROVINCIAL HEALTH SERVICES AUTHORITY, Vancouver (CA); THE UNIVERSITY OF BRITISH COLUMBIA, Vancouver (CA)

( * ) Notice: Subject to any disclaimer, the term of this patent is extended or adjusted under 35 U.S.C. 154(b) by 1043 days.

This patent is subject to a terminal disclaimer.

(21) Appl. No.: 17/604,703

(22) PCT Filed: Apr. 16, 2020

(86) PCT No.: PCT/CA2020/050509
§ 371 (c)(1),
(2) Date: Oct. 18, 2021

(87) PCT Pub. No.: WO2020/210909
PCT Pub. Date: Oct. 22, 2020

(65) Prior Publication Data
US 2022/0233726 A1 Jul. 28, 2022

Related U.S. Application Data

(60) Provisional application No. 62/835,183, filed on Apr. 17, 2019.

(51) Int. Cl.
*A61K 51/04* (2006.01)
*A61P 35/00* (2006.01)

(52) U.S. Cl.
CPC ...... *A61K 51/0497* (2013.01); *A61K 51/0478* (2013.01); *A61K 51/048* (2013.01); *A61K 51/0482* (2013.01); *A61P 35/00* (2018.01)

(58) Field of Classification Search
None
See application file for complete search history.

(56) References Cited

U.S. PATENT DOCUMENTS 5,650,134 A 7/1997 Albert et al.
8,114,381 B2 2/2012 Perrin et al.
(Continued)

FOREIGN PATENT DOCUMENTS

CA 3060143 A1 11/2018
CN 102066974 A 5/2011
(Continued)

OTHER PUBLICATIONS

CAS Registry No. 1207181-29-0, "L-Glutamic acid, N-[[[(1S)-1-carboxy-5-[[6-(fluoro-18F)-3-pyridinyl]carbonyl]amino]pentyl]amino]carbonyl]—", American Chemical Society. Entered STN database Feb. 23, 2010, 1 page.
CAS Registry No. 2093321-18-5, "18F-PSMA 1007", American Chemical Society. Entered STN database Apr. 26, 2017, 1 page.
Extended European Search Report for European Application No. EP20825937.4 dated Jan. 22, 2024, 8 pages.
International Search Report and Written Opinion for PCT Application No. PCT/CA2023/050959, mailed Sep. 25, 2023, 11 pages.
Leamon, C.P. et al., "Prostate-Specific Membrane Antigen-Specific Antitumor Activity of a Self-Immolative Tubulysin Conjugate" Bioconjugate Chemistry, May 10, 2019;30(6):1805-1813.
(Continued)

*Primary Examiner* — Frederick F Krass
*Assistant Examiner* — Kaila A Craig
(74) *Attorney, Agent, or Firm* — COOLEY LLP

(57) ABSTRACT

This application relates to compounds of Formula I. $R^{1a}$, $R^{1b}$ and $R^{1c}$ is —$CO_2H$, —$SO_2H$, —$SO_3H$, —$SO_4H$, —$PO_2H$, —$PO_3H$ or —$PO_4H$. $R^2$ is a linker, e.g. butylene. $R^3$ is a linkage, e.g. —O—, —S—, —S(O)—, $S(O)_2$—, —NHC(O)—, —C(O)NH—, or 1,2,3-triazole. R4 is —$(CH_2)_{0-3}$CH$(R^7)(CH_2)_{0-3}$— wherein $R^7$ is —$(CH_2)_5CH_3$ or certain aromatic fused-ring systems. $R^5$ and $R^6$ are hydrogen or methyl. Each $Xaa^1$ (if present) is an amino acid. $R^X$ is a radiolabeling group, e.g.: a radiometal chelator optionally bound by a radiometal; an aryl substituted with a radioisotope; a prosthetic group containing a trifluoroborate; or a prosthetic group containing a silicon-fluorine-acceptor moiety. The compounds may be useful for imaging prostate-specific membrane antigen (PSMA)-expressing tissues or for treating PSMA-expressing diseases (e.g. cancer).

(I)

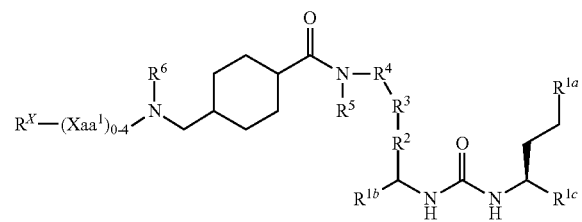

40 Claims, 4 Drawing Sheets

(56) References Cited

U.S. PATENT DOCUMENTS

| | | | |
|---|---|---|---|
| 8,153,101 | B2 | 4/2012 | McBride et al. |
| 8,574,546 | B2 | 11/2013 | Perrin et al. |
| 8,691,761 | B2 | 4/2014 | Rivier et al. |
| 10,150,804 | B2 | 12/2018 | Benard et al. |
| 10,471,160 | B2 | 11/2019 | Eder et al. |
| 10,688,200 | B2 | 6/2020 | Kung et al. |
| 10,806,806 | B2 | 10/2020 | Babich et al. |
| 10,882,871 | B2 | 1/2021 | Benard et al. |
| 11,504,441 | B2 | 11/2022 | Lin et al. |
| 2014/0147381 | A1 | 5/2014 | Espenan |
| 2016/0333068 | A1 | 11/2016 | Bénard et al. |
| 2019/0008988 | A1* | 1/2019 | Eder ................ A61P 35/00 |
| 2019/0177345 | A1 | 6/2019 | Larsen |
| 2020/0339625 | A1 | 10/2020 | Lin et al. |
| 2021/0121585 | A1 | 4/2021 | Li et al. |
| 2021/0338851 | A1 | 11/2021 | Lin et al. |
| 2022/0062446 | A1 | 3/2022 | Perrin et al. |
| 2023/0114807 | A1 | 4/2023 | Lin et al. |
| 2023/0348535 | A1 | 11/2023 | Lin et al. |
| 2024/0018110 | A1 | 1/2024 | Bénard et al. |
| 2025/0186627 | A1 | 6/2025 | Lin et al. |

FOREIGN PATENT DOCUMENTS

| | | | |
|---|---|---|---|
| CN | 105636924 A | 6/2016 | |
| CN | 106967152 A | 7/2017 | |
| CN | 108699087 A | 10/2018 | |
| CN | 112062695 A | 12/2020 | |
| CN | 114401947 A | 4/2022 | |
| EP | 3 064 224 A1 | 9/2016 | |
| JP | 2016535013 A | 11/2016 | |
| WO | WO 2005/077967 A1 | 8/2005 | |
| WO | WO 2008/053360 A2 | 5/2008 | |
| WO | WO 2008/058192 A2 | 5/2008 | |
| WO | WO 2009/002529 A2 | 12/2008 | |
| WO | WO 2009/012596 A1 | 1/2009 | |
| WO | WO-2009135015 A2 | 11/2009 | |
| WO | WO 2010/014933 A2 | 2/2010 | |
| WO | WO 2012/094334 A1 | 7/2012 | |
| WO | WO 2012/118909 A1 | 9/2012 | |
| WO | WO 2013/028664 A1 | 2/2013 | |
| WO | WO 2013/028791 A1 | 2/2013 | |
| WO | WO 2014/078484 A1 | 5/2014 | |
| WO | WO 2014/134716 A1 | 9/2014 | |
| WO | WO 2015/055318 A1 | 4/2015 | |
| WO | WO 2015/073678 A1 | 5/2015 | |
| WO | WO 2015/100498 A1 | 7/2015 | |
| WO | WO 2015/135082 A1 | 9/2015 | |
| WO | WO 2017/117687 A1 | 7/2017 | |
| WO | WO 2018/098390 A1 | 5/2018 | |
| WO | WO 2018/215627 A1 | 11/2018 | |
| WO | WO 2018/223180 A1 | 12/2018 | |
| WO | WO-2019075583 A1 * | 4/2019 | ......... A61K 51/0402 |
| WO | WO 2019/115547 A1 | 6/2019 | |
| WO | WO 2019/204335 A1 | 10/2019 | |
| WO | WO 2020/065045 A1 | 4/2020 | |
| WO | WO 2020/109523 A1 | 6/2020 | |
| WO | WO 2020/124237 A1 | 6/2020 | |
| WO | WO 2020/210909 A1 | 10/2020 | |
| WO | WO 2020/252598 A1 | 12/2020 | |
| WO | WO-2021168567 A1 | 9/2021 | |
| WO | WO-2022126275 A1 | 6/2022 | |
| WO | WO-2023164775 A1 | 9/2023 | |
| WO | WO-2024016071 A1 | 1/2024 | |

OTHER PUBLICATIONS

Afshar-Oromieh et al., "Repeated PSMA-targeting radioligand therapy of metastatic prostate cancer with 131I-MIP-1095," Eur. J. Nucl. Med. Mol. Imaging, 44, 950-959 (2017).

Ahmadzadehfar et al., "Overall survival and response pattern of castration-resistant metastatic prostate cancer to multiple cycles of radioligand therapy using [177Lu]Lu-PSMA-617," Eur. J. Nucl. Med. Mol. Imaging, 44, 1448-1454 (2017).

Antunes et al., "Influence of Different Spacers on the Biological Profile of a DOTA-Somatostatin Analogue," Bioconjugate Chemistry, 2007, vol. 18, pp. 84-92.

Apostolidis et al., "Production of Ac-225 from Th-229 for targeted a therapy," Anal. Chem., 77, 6288-6291 (2005).

Bander et al., "Phase I trial of $^{177}$lutetium-labeled J591, a monoclonal antibody to prostate-specific membrane antigen, in patients with androgen-independent prostate cancer," J. Clin. Oncol., 23, 4591-4601 (2005).

Banerjee et al., "$^{64}$Cu-Labeled Inhibitors of Prostate-Specific Membrane Antigen for PET Imaging of Prostate Cancer," Journal of Medicinal Chemistry, 2014, vol. 57, pp. 2657-2669.

Banerjee et al., "$^{68}$Ga-Labeled Inhibitors of Prostate-Specific Membrane Antigen (PSMA) for Imaging Prostate Cancer," Journal of Medicinal Chemistry, 2010, vol. 53, pp. 5333-5341.

Banerjee et al., "Clinical applications of Gallium-68," Applied Radiation and Isotopes, 2013, vol. 76, pp. 2-13.

Benesova et al., "Linker modification strategies to control the prostate-specific membrane antigen (PSMA)-targeting and pharmacokinetic properties of DOTA-conjugated PSMA inhibitors," J. Med. Chem, 59, 1761-1775 (2016).

Benesova et al., "Albumin-binding PSMA ligands: optimization of the tissue distribution profile," Mol. Pharmaceutics, 15, 934-946 (2018).

Benesova et al., "Preclinical evaluation of a tailor-made DOTA-conjugated PSMA inhibitor with optimized linker moiety for imaging and endoradiotherapy of prostate cancer," J. Nucl. Med., 56, 914-920 (2015).

Berge et al., "Pharmaceutical Salts," Journal of Pharmaceutical Sciences, Jan. 1977, vol. 66, No. 1, pp. 1-19.

Bouvet et al., "Automated synthesis of [$^{18}$F]DCFPyL via direct radiofluorination and validation in preclinical prostate cancer models," EJNMMI Research, 2016, vol. 6, Article 40, 15 pages.

Bräuer et al., "$^{177}$Lu-PSMA-617 radioligand therapy and outcome in patients with metastasized castration-resistant prostate cancer," Eur. J. Nucl. Med. Mol. Imaging, 44, 1663-1670 (2017).

Breeman et al., "Somatostatin receptor-mediated imaging and therapy: basic science, current knowledge, limitations and future perspectives," European Journal of Nuclear Medicine, Sep. 2001, vol. 28, No. 9, pp. 1421-1429.

Buchmann et al., "Comparison of $^{68}$Ga-DOTATOC PET and $^{111}$In-DTPAOC (Octreoscan)SPECT in patients with neuroendocrine tumours," Eur J Nucl Med Mol Imaging., 2007, vol. 34, pp. 1617-1626.

Cai et al., "RGD-based PET tracers for imaging receptor integrin $\alpha_v\beta_3$ expression," Journal of Labelled Compounds and Radiopharmaceuticals, 2013, vol. 56, pp. 264-279.

Carter et al., "Prostate-specific membrane antigen is a hydrolase with substrate and pharmacologic characteristics of a neuropeptidase," Proc. Natl. Acad. Sci. U.S.A., 93, 749-753 (1996).

Chatalic et al., "Towards personalized treatment of prostate cancer: PSMA I&T, a promising prostate-specific membrane antigen-targeted theranostic agent" Theranostics, 6, 849-861 (2016).

Chen et al., "2-(3-{1-Carboxy-5-[(6-[$^{18}$F]Fluoro-Pyridine-3-Carbonyl)-Amino]-Pentyl}-Ureido)-Pentanedioic Acid, [$^{18}$F]DCFPyL, a PSMA-Based PET Imaging Agent for Prostate Cancer," Clinical Cancer Research, Dec. 2011, vol. 17, No. 24, pp. 7645-7653.

Chin et al., "First Experience with Clinical-Grade [$^{18}$F]FPP(RGD)$_2$: An Automated Multi-step Radiosynthesis for Clinical PET Studies," Mol Imaging Biol., 2012, vol. 14, pp. 88-95.

Choy, C. J. et al., "$^{177}$Lu-Labeled phosphoramidate-based PSMA inhibitors: The effect of an albumin binder on biodistribution and therapeutic efficacy in prostate tumor-bearing mice," Theranostics, 7, 1928-1939 (2017), and supplemental information, 33 pages.

Dumelin et al, "A portable albumin binder from a DNA-encoded chemical library," Angew Chem. Int. Ed, 47, 3196-3201 (2008).

Eberl et al., "High beam current operation of a PETtrace™ cyclotron for $^{18}$F production," Applied Radiation and Isotopes, 2012, vol. 70, pp. 922-930.

Eder et al., "$^{68}$Ga-Complex Lipophilicity and the Targeting Property of a Urea-Based PSMA Inhibitor for PET Imaging," Bioconjugate Chemistry, 2012, vol. 23, pp. 688-697.

(56) References Cited

OTHER PUBLICATIONS

Extended Search Report for European Patent Application No. 15733077.0, dated Jun. 19, 2017, 6 pages.
Extended Search Report for European Patent Application No. 17735797.7, dated Aug. 13, 2019, 8 pages.
Fani et al., "Unexpected Sensitivity of sst$^2$ Antagonists to N-Terminal Radiometal Modifications," The Journal of Nuclear Medicine, Sep. 2012, vol. 53, No. 9, pp. 1481-1489.
Fendler et al, "Preliminary experience with dosimetry, response and patient reported outcome after $^{177}$Lu-PSMA-617 therapy for metastatic castration-resistant prostate cancer," Oncotarget, 8, 3581-3590 (2017).
Gabriel et al., "$^{68}$Ga-DOTA-Tyr$^3$-Octreotide PET in Neuroendocrine Tumors: Comparison with Somatostatin Receptor Scintigraphy and CT," The Journal of Nuclear Medicine, Apr. 2007, vol. 48, No. 4, pp. 508-518.
Gabriel et al., "An Intrapatient Comparison of $^{99m}$Tc-EDDA/HYNIC-TOC with $^{111}$In-DTPA Octreotide for Diagnosis of Somatostatin Receptor-Expressing Tumors," The Journal of Nuclear Medicine, May 2003, vol. 44, No. 5, pp. 708-716.
Ginj et al., "Design, Synthesis, and Biological Evaluation of Somatostatin-Based Radiopeptides," Chemistry & Biology, Oct. 2006, vol. 13, pp. 1081-1090.
Guo et al., "Preparation and Biological Evaluation of $^{64}$Cu Labeled Tyr$^3$-Octreotate using a Phosphonic Acid-Based Cross-Bridged Macrocyclic Chelator," Bioconjugate Chemistry, 2012, vol. 23, pp. 1470-1477.
Harada et al., "Synthesis and biological evaluation of novel $^{18}$F-labeled probes targeting prostate-specific membrane antigen for positron emission tomography of prostate cancer," J. Nucl. Med., 57, 1978-1984 (2016).
Heck et al., "Systemic radioligand therapy with $^{177}$Lu labeled prostate specific membrane antigen ligand for imaging and therapy in patients with metastatic castration resistant prostate cancer," J. Urol., 196, 382-391 (2016).
Henze et al., "PET Imaging of Somatostatin Receptors Using [$^{68}$GA]DOTA-D-Phe$^1$-Tyr$^3$-Octreotide: Firest Results in Patients with Meningiomas," The Journal of Nuclear Medicine, Jul. 2001, vol. 42, No. 7, pp. 1053-1056.
Hofman et al., "[$^{177}$Lu]-PSMA-617 radionuclide treatment in patients with metastatic castration-resistant prostate cancer (LuPSMA trial): a single-centre, single-arm, phase 2 study," Lancet Oncol., 19, 825-833 (2018).
Horiuchi et al., "Discovery of novel thieno[2,3-d]pyrimidin-4-yl hydrazone-based inhibitors of Cyclin D1-CDK4: Synthesis, biological evaluation and structure-activity relationships. Part 2" Bioorganic & Medicinal Chemistry, 2009, vol. 17, 7850-7860.
Huggins et al., "Studies on Prostatic Cancer II. The Effects of Castration on Advanced Carcinoma of the Prostate Gland," Archives of Surgery, 1941, vol. 43, No. 2, pp. 209-223.
International Search Report and Written Opinion dated Jan. 30, 2019 in PCT International Application No. PCT/CA2018/051336, 8 pages.
International Search Report and Written Opinion for International (PCT) Patent Application No. PCT/CA2015/000002, mailed May 4, 2015, 10 pages.
International Search Report and Written Opinion of the International Searching Authority for International Application No. PCT/CA2019/051853, dated Feb. 18, 2020, 8 pages.
International Search Report and Written Opinion of the International Searching Authority for International Application No. PCT/CA2020/050509, dated Jun. 11, 2020, 13 pages.
International Search Report and Written Opinion prepared by the Canadian Intellectual Property Office dated Mar. 31, 2017, for International Application No. PCT/CA2017/050026, 10 pages.
Kayani "A Comparison of $^{68}$Ga-DOTATATE and $^{18}$F-FDG PET/CT in Pulmonary Neuroendocrine Tumors," The Journal of Nuclear Medicine, Dec. 2009, vol. 50, No. 12, pp. 1927-1932.
Keenan et al., "RADAR realistic animal model series for dose assessment," J Nucl Med.; 51:471-476 (2010).
Kelly et al., "Dual-target binding ligands with modulated pharmacokinetics for endoradiotherapy of prostate cancer," J. Nucl. Med., 58, 1442-1449 (2017).
Kelly et al., "Trifunctional PSMA-targeting constructs for prostate cancer with unprecedented localization to LNCaP tumors," Eur. J. Nucl. Med. Mol. Imaging, 45:1841-1851 (2018) doi: 10.1007/s00259-018-4004-5.
Kemerink et al., "Effect of the positron range of $^{18}$F, $^{68}$Ga and $^{124}$I on PET/CT in lung equivalent materials," Eur J Nucl Med Mol Imaging, 2011, vol. 38, pp. 940-948.
Kirschner, "Radiation dosimetry of 131I-19-iodocholesterol: the pitfalls of using tissue concentration data," The author's reply. J Nucl Med.; 16:248-249 (1975).
Kopka et al. "Glu-Ureido-Based Inhibitors of Prostate-Specific Membrane Antigen: Lessons Learned During the Development of a Novel Class of Low-Molecular-Weight Theranostic Radiotracers," The Journal of Nuclear Medicine, Sep. 2017, vol. 58, No. 9 (Supple), pp. 17S-26S.
Kratochwil et al., "$^{225}$Ac-PSMA-617 for PSMA-targeted α-radiation therapy of metastatic castrationresistant prostate cancer," J. Nucl. Med., 57, 1941-1944 (2016).
Kratochwil et al., "PSMA-targeted radionuclide therapy of metastatic castration-resistant prostate cancer with $^{177}$Lu-labeled PSMA-617," J. Nucl. Med, 57, 1170-1176 (2016).
Krausz et al., "SPECT/CT hybrid imaging with $^{111}$In-pentetreotide in assessment of neuroendocrine tumours," Clinical Endocrinology, 2003, vol. 59, pp. 565-573.
Kularatne et al., "Prostate-Specific Membrane Antigen Targeted Imaging and Therapy of Prostate Cancer Using a PSMA Inhibitor as a Homing Ligand," Molecular Pharmaceutics, 2009, vol. 6, No. 3, pp. 780-789.
Kuo et al., "A $^{177}$Lu-labeled albumin-binder-conjugated PSMA-617 derivative with greatly enhanced radiation dose delivered to LNCaP tumor xenografts" J. Nucl. Med. 1, 59, Suppl 17 (2018).
Kuo et al., "Enhancing Treatment efficacy of $^{177}$Lu-PSMA-617 with the conjugation of an Albumin-binding motif: Preclinical dosimetry and endoradiotherapy studies" Mol. Pharmaceutics, 15, pp. 5183-5191 (2018).
Kuo et al., "Effects of linker modification on tumor-to-kidney contrast of 68Ga-labeled PSMA-targeted imaging probes," Mol. Pharmaceutics, 2018, 15, 3502-3511 doi: 10.1021/acs.molpharmaceut.8b00499.
Kuo et al., "One-Step $^{18}$F-Labeling and Preclinical Evaluation of Prostate Specific Membrane Antigen Trifluoroborate Probes for Cancer Imaging," J Nucl Med 2019; 60:1160-1166.
Kwekkeboom et al. "Peptide Receptor Radionuclide Therapy in Patients With Gastroenteropancreatic Neuroendocrine Tumors," Seminars in Nuclear Medicine, Mar. 2010, vol. 40, No. 2, pp. 78-88.
Kwekkeboom et al. "Somatostatin receptor-based imaging and therapy of gastroenteropancreatic neuroendocrine tumors," Endocr Relat Cancer., 2010, vol. 17, pp. R53-R73.
Laforest et al. "Image quality with non-standard nuclides in PET," QJ Nucl Med Mol Imaging, 2008, vol. 52, pp. 151-158.
Laverman et al., "A Novel Facile Method of Labeling Octreotide with $^{18}$F-Fluorine," The Journal of Nuclear Medicine, Mar. 2010, vol. 51(3), pp. 454-461.
Laverman et al., "Optimized labeling of NOTA-conjugated octreotide with F-18," Tumor Biol., 2012, vol. 33, pp. 427-434.
Leyton et al., "Targeting Somatostatin Receptors: Preclinical Evaluation of Novel $^{18}$F-Fluoroethyltriazole-Tyr$^3$-Octreotate Analogs for PET," The Journal of Nuclear Medicine, Sep. 2011, vol. 52(9), pp. 1441-1448.
Li et al., "One-step and one-pot-two-step radiosynthesis of cyclo-RGD-$^{18}$F-aryltrifluoroboronate conjugates for functional imaging," Am. J. Nucl. Med. Mol. Imaging, 2013, vol. 3(1), pp. 44-56 (32 pages).
Liu et al., ""Kit-like" radiosynthesis and biological evaluation of an F-labeled 4-(2-Aminoethyl)-benzenesulfonamide (AEBS) trimer for imaging carbonic anhydrase IX expression with positron emission tomography," World Molecular Imaging Congress, Sep. 19, 2013—poster, 1 page.

(56) References Cited

OTHER PUBLICATIONS

Liu et al., "$^{18}$F-trifluoroborate derivatives of [des-arg$^{10}$]kallidin for imaging bradykinin b1 receptorexpression with positron emission tomography," Molecular Pharmaceutics, 2015, vol. 12, No. 3, pp. 974-982.
Liu et al., "An Organotrifluoroborate for Broadly Applicable One-Step $^{18}$F-Labeling," Angewandte Chemie International Edition, Sep. 2014, vol. 53, No. 44, pp. 11876-11880.
Liu et al., "Facile synthesis and biological evaluation of an 18F-labeled 4-(2-aminoethyl) benzenesulfonamide (AEBS) trimer for imaging carbonic anhydrase IX expression with positron emission tomography," World Molecular Imaging Congress, Sep. 19, 2013, Presentation No. LBAP 029, 2 pages.
Liu et al., "From Minutes to Years: Predicting Organotrifluoroborate Solvolysis Rates," Chemistry—A European Journal, Mar. 2015, vol. 21, No. 10, pp. 3924-3928.
Liu et al., "Kit-like $^{18}$F-labeling of RGD-$^{19}$F-Arytrifluroborate in high yield and at extraordinarily high specific activity with preliminary in vivo tumor imaging," Nuclear Medicine and Biology, vol. 40, 2013, pp. 841-849.
Liu et al., "Preclinical evaluation of a high affinity $^{18}$F-trifluoroborate octreotate derivative for somatostatin receptor imaging—poster," UBC, 2014, 1 page.
Liu et al., "Preclinical Evaluation of a High-Affinity $^{18}$F-Trifluoroborate Octreotate Derivative for Somatostatin Receptor Imaging," Journal of Nuclear Medicine, Sep. 2014, vol. 55(9), pp. 1499-1505.
Liu et al., "Preclinical Evaluation of a Novel $^{18}$F-Labelled Somatostatin Receptor-Binding Peptide—Abstract Proof," ScholarOne, Inc., 2014, Control ID: 1931699, 4 pages.
Liu et al., "Preclinical evaluation of a novel $^{18}$F-labelled somatostatin receptor-binding peptide," The Journal of Nuclear Medicine, 2014, vol. 55 (Supplement 1):1089, 1 page.
Liu et al., "Rapid, one-step, high yielding $^{18}$F-labeling of an aryltrifluoroborate bioconjugate by isotope exchange at very high specific activity," Journal of Labelled Compounds and Radiopharmaceuticals, 2012, vol. 55, pp. 491-496.
Liu et al., "Stoichiometric Leverage: Rapid $^{18}$F-Aryltrifluoroborate Radiosynthesis at High Specific Activity for Click Conjugation," Angew. Chem. Int. Ed., 2013, vol. 52, pp. 2303-2307.
Liu et al., "Simple Bioconjugate chemistry serves great clinical advances: albumin as a versatile platform for diagnosis and precision therapy," Chem. Soc. Rev, 45, 1432-1456 (2016).
Maresca et al., "A Series of Halogenated Heterodimeric Inhibitors of Prostate Specific Membrane Antigen (PSMA) as Radiolabeled Probes for Targeting Prostate Cancer," Journal of Medicinal Chemistry, 2009, vol. 52, No. 2, pp. 347-357.
Matteson et al., "Iodomethaneboronic Esters and Aminomethaneboronic Esters," Journal of Organometallic Chemistry, 1979, vol. 170, pp. 259-264.
Means et al. "Chemical Modifications of Proteins: History and Applications," Bioconjugate Chemistry, 1990, vol. 1, No. 1, pp. 2-12.
Meckel et al., "DOTA based bisphosphonate with an albumin binding moiety for delayed body clearance for bone targeting," Nucl. Med. Biol., 43, 670-678 (2016).
Mukherjee et al., "Mechanistic Studies on the Substrate-Tolerant Lanthipeptide Synthetase ProcM," Journal of the American Chemical Society, 2014, vol. 136, pp. 10450-10459.
Müller et al., "DOTA conjugate with an albumin-binding entity enables the first folic acid-targeted $^{177}$Lu-radionuclide tumor therapy in mice," J. Nucl. Med, 54, 124-131 (2013).
Poeppel et al., "$^{68}$GA-DOTATOC Versus $^{68}$Ga-DOTATATE PET/CT in Functional Imaging of Neuroendocrine Tumors," The Journal of Nuclear Medicine, Dec. 2011, vol. 52(12), pp. 1864-1870.
Poethko et al., "Two-Step Methodology for High-Yield Routine Radiohalogenation of Peptides: $^{18}$F-Labeled RGD and Octreotide Analogs," The Journal of Nuclear Medicine, May 2004, vol. 45, No. 5, pp. 892-902.
Pourghisian et al., "$^{18}$F-AmBF$_3$-MJ9: a novel radiofluorinated bombesin derivative for prostate cancer imaging," Bioorganic & Medicinal Chemistry, 2015, vol. 23, No. 7, pp. 1500-1506.
Price and Orvig, "Matching chelators to radiometals for radiopharmaceuticals," Chem. Soc. Rev., 43, 260-290 (2014).
Pyka et al., "$^{68}$Ga-PSMA-HBED-CC PET for Differential Diagnosis of Suggestive Lung Lesions in Patients with Prostate Cancer," Journal of Nuclear Medicine, 2016, vol. 57, pp. 367-371.
Pyka et al., "[68Ga]PSMA-HBED PET for differential diagnosis of suspicious lung lesions in patients with prostate cancer," J Nucl Med. Nov. 19, 2015, 26 pages, doi: 10.2967/jnumed.115.164442.
Rahbar et al., "German multicenter study investigating 177Lu-PSMA-617 radioligand therapy in advanced prostate cancer patients," J. Nucl. Med., 58, 85-90 (2017).
Rahbar et al., "Radioligand therapy with $^{177}$Lu-PSMA-617 as a novel therapeutic option in patients with metastatic castration resistant prostate cancer," Clin. Nucl. Med., 41, 522-528 (2016).
Reubi et al., "Affinity profiles for human somatostatin receptor subtypes SST1-SST5 of somatostatin radiotracers selected for scintigraphic and radiotherapeutic use," European Journal of Nuclear Medicine, Mar. 2000, vol. 27, No. 3, pp. 273-282.
Rowe et al., "Imaging of metastatic clear cell renal cell carcinoma with PSMA-targeted $^{18}$F-DCFPyL PET/CT," Annals of Nuclear Medicine, Dec. 2015, vol. 29, No. 10, pp. 877-882.
Roxin et al., "A metal-free DOTA-conjugated $^{18}$F-labeledradiotracer: [$^{18}$F]DOTA-AMBF$_3$-LLP2A forimaging VLA-4 Over-expression in murine melanoma with improved tumor uptake and greatly enhanced renal clearance," Bioconjugate Chem. 2019, 30, 1210-1219.
Roxin et al., "Preliminary evaluation of $^{18}$F-labeled LLP2A-trifluoroborate conjugates as VLA-4 (α4β1 integrin) specific radiotracers for PET imaging of melanoma" Nuclear Medicine and Biology 61 (2018) 11-20.
Sathekge et al., "$^{68}$Ga-PSMA imaging of metastatic breast cancer," European Journal of Nuclear Medicine and Molecular Imaging, Aug. 2015, vol. 42, No. 9, pp. 1482-1483.
Schottelius et al., "[$^{111}$In]PSMA-I&T: expanding the spectrum of PSMA-I&T applications towards SPECT and radioguided surgery," EJNMMI Research, 2015, vol. 5, Article 68, 5 pages.
Silver et al., "Prostate-specific membrane antigen expression in normal and malignant human tissues," Clin. Cancer Res., 3, 81-85 (1997).
Sokoloff et al., "A dual-monoclonal sandwich assay for prostate-specific membrane antigen: levels in tissues, seminal fluid and urine," Prostate, 43, 150-157 (2000).
Sprague et al., "Preparation and Biological Evaluation of Copper-64-Labeled Tyr3-Octreotate Using a Cross-Bridged Macrocyclic Chelator," Clinical Cancer Research, Dec. 2004, vol. 10, pp. 8674-8682.
Stabin et al., "OLINDA/EXM: the second-generation personal computer software for internal dose assessment in nuclear medicine," J Nucl Med.; 46:1023-1027 (2005).
Stabin et al., "RADAR reference adult, pediatric, and pregnant female phantom series for internal and external dosimetry," J Nucl Med.; 53:1807-1813 (2012).
Stabin et al., "Re-evaluation of absorbed fractions for photons and electrons in spheres of various sizes," J Nucl. Med.; 41:149-160 (2000).
Storch et al., "Evaluation of [$^{99m}$Tc/EDDA/HYNIC$^0$]Octreotide Derivatives Compared with [$^{111}$In-DOTA$^0$,Tyr$^3$,Thr$^8$]Octreotide and [$^{111}$In-DTPA$^0$]Octreotide: Does Tumor or Pancreas Uptake Correlate with the Rate of Internalization?" The Journal of Nuclear Medicine, Sep. 2005, vol. 46, No. 9, pp. 1561-1569.
Thiele, N.A. et al., "An Eighteen-Membered Macrocyclic Ligand for Actinium-225 Targeted Alpha Therapy," Angewandte, vol. 56, Issue 46, pp. 14712-14717 (2017).
Umbricht et al., "Preclinical development of novel PSMA-targeting radioligands: Modulation of albumin-binding properties to improve prostate cancer therapy," Mol. Pharmaceutics, 15, 2297-2306 (2018).
Uribe et al., "Accuracy of $^{177}$Lu activity quantification in SPECT imaging: a phantom study," EJNMMI Phys.;4:2 (2017), 20 pages.
Vallabhajosula et al., "Preclinical Evaluation of Technetium-99m-Labeled Somatostatin Receptor-Binding Peptides," The Journal of Nuclear Medicine, Jun. 1996, vol. 37, No. 6, pp. 1016-1022.

(56) References Cited

OTHER PUBLICATIONS

Verburg et al., "First evidence of PSMA expression in differentiated thyroid cancer using [$^{68}$Ga]PSMA_HBED-CC PET/CT," European Journal of Nuclear Medicine and Molecular Imaging, 2015, vol. 42, pp. 1622-1623.
Virgolini et al., "Somatostatin Receptor Subtype Specificity and in Vivo Binding of a Novel Tumor Tracer. $^{99m}$Tc-P829[1]," Cancer Research, May 1998, vol. 58, pp. 1850-1859.
Walsh, K. M. "Brookhaven National Laboratory: Radioisotopes for medical imaging and disease treatment," J. Nucl. Med., 58, 11N-12N (2017).
Wängler et al., "One-Step $^{18}$F-Labeling of Carbohydrate-Conjugated Octreotate-Derivatives Containing a Silicon-Fluoride-Acceptor (SiFA): In Vitro and in Vivo Evaluation as Tumor Imaging Agents for Positron Emission Tomography," Bioconjugate Chem., 2010, vol. 21(12), pp. 2289-2296.
Wessels, "Bone marrow dosimetry using blood-based models for radiolabeled antibody therapy: a multiinstitutional comparison," J Nucl Med.; 45(10):1725-1733 (2004).
Wester et al., "PET imaging of somatostatin receptors: design, synthesis and preclinical evaluation of a novel $^{18}$F-labelled, carbohydrated analogue of octreotide," European Journal of Nuclear Medicine and Molecular Imaging, Jan. 2003, vol. 30, No. 1, pp. 117-122.
Wirtz et al., "Synthesis and in vitro and in vivo evaluation of urea-based PSMA inhibitors with increased lipophilicity," EJNMMI Research 8:84. Structures 10, 11 (2018).
Yadav et al, "$^{177}$Lu-DKFZ-PSMA-617 therapy in metastatic castration resistant prostate cancer: safety, efficacy, and quality of life assessment," Eur. J. Nucl. Med. Mol. Imaging, 44, 81-91 (2017).
Zhan et al., "Hydration of the Fluoride Anion: Structures and Absolute Hydration Free Energy from First-Principles Electronic Structure Calculations," J Phys Chem A., 2004, vol. 108, pp. 2020-2029.
Zhou et al., "A Fluorogenic Probe for the Copper(I)-Catalyzed Azide-Alkyne Ligation Reaction: Modulation of the Fluorescence Emission via 3(n,π*)-(π,π*) Inversion," Journal of the American Chemical Society, Jul. 2004, vol. 126, No. 29, pp. 8862-8863.
Rathke, H. et al. "Initial clinical experience performing sialendoscopy for salivary gland protection in patients undergoing 225Ac-PSMA-617 RLT," Eur J Nucl Med Mol Imaging. Jan. 2019;46(1):139-147. doi: 10.1007/s00259-018-4135-8. Epub Aug. 27, 2018.
Sathekge, M. et al., "225Ac-PSMA-617 in chemotherapy-naive patients with advanced prostate cancer: a pilot study," European Journal of Nuclear Medicine and Molecular Imaging, Jan. 2019; 46(1):129-138.
Violet, J. et al., "Dosimetry of 177Lu-PSMA-617 in Metastatic Castration-Resistant Prostate Cancer: Correlations Between Pretherapeutic Imaging and Whole-Body Tumor Dosimetry with Treatment Outcomes," J Nucl Med. Apr. 2019;60(4):517-523. doi: 10.2967/jnumed.118.219352. Epub Oct. 5, 2018.
Extended European Search Report for European Application No. 21904735.4 mailed Nov. 6, 2024, 9 pages.
Liu, Z. et al., "One-step $^{18}$F labeling of biomolecules using organotrifluoroborates," Nature Protocols, Sep. 2015, vol. 10, No. 9, pp. 1423-1432.

Merriam-Webster Inc., "Definition of *Derivative*" [online]. Retrieved from: http://beta.www.merriam-webster.com/dictionary/derivative; retrieved on Dec. 9, 2015; 10 pages.
Extended Search Report for European Patent Application No. 18868855.0, dated Jul. 7, 2021, 13 pages.
International Search Report and Written Opinion of the International Searching Authority for International Application No. PCT/CA2020/050864, dated Sep. 18, 2020, 8 pages.
International Search Report and Written Opinion of the International Searching Authority for International Application No. PCT/CA2021/051826, dated Mar. 21, 2022, 11 pages.
Allais, F. et al., "Straightforward Total Synthesis of 2-O-Feruloyl-L-malate, 2-O-Sinapoyl-L-malate and 2-O-5-Hydroxyferuloyl-L-malate," Synthesis, Advanced online publication, 2009, No. x, pp. 000A-000H, 8 pages. Final publication in vol. 21, pp. 3571-3578. DOI: 10.1055/s-0029-1216983.
Altamore, T. et al. "Concise synthesis of enantiomerically pure (1'S, 2'R)- and (1'R, 2'S)-2S-amino-3-(2'-aminomethyl-cyclopropyl)propionic acid: Two E-diastereoisomers of 4,5-methano-L-lysine," Australian Journal of Chemistry. 2013; 66(9):1105-1111. https://doi.org/10.1071/CH13309.
Banerjee, S.R. et al., "Effect of Chelators on the Pharmacokinetics of 99mTc-Labeled Imaging Agents for the Prostate-Specific Membrane Antigen (PSMA)" J Med Chem, 2013, vol. 56, pp. 6108-6121.
Bostwick, D.G. et al., "Prostate Specific Membrane Antigen Expression in Prostatic Intraepithelial Neoplasia and Adenocarcinoma. A Study of 184 Cases," Cancer, 1998; 82(11):2256-2261.
Extended European Search Report for Application No. 19900988.7, dated Oct. 31, 2022,7 pages.
International Search Report and Written Opinion for International Application No. PCT/CA2023/050280, dated May 9, 2023, 10 pages.
Kuo, H., et al., "177Lu-Labeled Albumin-Binder-Conjugated PSMA-Targeting Agents with Extremely High Tumor Uptake and Enhanced Tumor-to-Kidney Absorbed Dose Ratio". J. Nucl. Med., 2021, vol. 62, pp. 521-527.
Lepage, M., et al., "Toward 18 F-Labeled Theranostics: A Single Agent that Can Be Labeled with 18F, 64Cu, or 177Lu," Chembiochem, 2020, vol. 21, No. 7, pp. 943-947.
Maresca, K.P. et al., "Small molecule inhibitors of PSMA incorporating technetium-99m for imaging prostate cancer: Effects of chelate design on pharmacokinetics", Inorganica Chimica Acta, 2012, 389, 168-175.
Wang et al., "Single Low-Dose Injection of Evans Blue Modified PSMA-617 Radioligand Therapy Eliminates Prostate-Specific Membrane Antigen Positive Tumors", Bioconjugate Chem, 2018 vol. 29, pp. 3213-3221.
Yang, H. et al., "Synthesis and Evaluation of a Macrocyclic Actinium-225 Chelator, Quality Control and In Vivo Evaluation of 225Ac-crown-αMSH Peptide", Chem Eur J, 2020, 26, 11435-11440.
Bernard-Gauthier, V. et al., "18F-Labeled Silicon-Based Fluoride Acceptors: Potential Opportunities for Novel Positron Emitting Radiopharmaceuticals," Biomed Res Int, 2014, vol. 2014, Article ID: 454503, 20 pages.
Roxin et al., "The case for DOTA as a pharmacokinetic modulator for 18F-labeled peptides: DOTA-[18F]AMBF3-LLP2A for improved PET imaging of VLA-4 over-expression in murine melanoma," Journal of Nuclear Medicine. May 2019; 60 (supplement 1):1008, 2 pages.

\* cited by examiner

RADIOLABELLED COMPOUNDS FOR DIAGNOSIS OR TREATMENT OF PROSTATE-SPECIFIC MEMBRANE ANTIGEN- EXPRESSING CANCER

CROSS-REFERENCE TO RELATED APPLICATIONS

This application is a U.S. National Stage Application under 35 U.S.C. § 371 of International Application No. PCT/CA2020/050509, filed Apr. 16, 2020, which claims priority to U.S. Provisional Application No. 62/835,183, filed Apr. 17, 2019, the disclosures of which are hereby incorporated by reference in their entireties for all purposes.

FIELD OF INVENTION

The present invention relates to radiolabelled compounds for selective imaging or treatment of cancer, particularly compounds that target prostate-specific membrane antigen.

BACKGROUND OF THE INVENTION

Prostate-specific membrane antigen (PSMA) is a transmembrane protein that catalyzes the hydrolysis of N-acetyl-aspartylglutamate to glutamate and N-acetylaspartate. PSMA is not expressed in most normal tissues, but is overexpressed (up to 1,000-fold) in prostate tumors and metastases (see, e.g.: Silver et al., *Clin. Cancer Res.* 1997, 3:81-85; and Sokoloff et al. *Prostate* 2000, 43:150-157). Due to its pathological expression pattern, various radiolabeled PSMA-targeting constructs have been designed and evaluated for endoradiotherapy of prostate cancer.

The common radiolabeled PSMA-targeting endoradio-therapeutic agents are derivatives of lysine-urea-glutamate (Lys-urea-Glu), including $^{131}$I-MIP-1095, $^{177}$Lu-PSMA-617 and $^{177}$Lu-PSMA I&T (see, e.g.: Afshar-Oromieh et al., *Eur. J. Nucl. Med. Mol. Imaging* 2017, 44:950-959; Heck et al., *J. Urol.* 2016, 196: 382-391; and Kratochwil et al., *J. Nucl. Med.* 2016, 57:1170-1176). Among them, $^{177}$Lu-PSMA-617 is the most studied agent, and is currently being evaluated in multi-center trials. Preliminary data demonstrated that $^{177}$Lu-PSMA-617 was effective in treating metastatic prostate cancer with 32-60% of patients having >50% reduction in PSA levels, and without severe side effects (Kratochwil, et al., supra; Rahbar et al., *Clin. Nucl. Med.* 2016, 41:522-528; Fendler et al., Oncotarget 2017, 8:3581-3590; Rahbar et al., *J. Nucl. Med.* 2017, 58:85-90; Ahmadzadehfar et al., *Eur. J. Nucl. Med. Mol. Imaging* 2017, 44:1448-1454; Brauer et al., *Eur. J. Nucl. Med. Mol. Imaging* 2017, 44:1663-1670; and Yadav et al., *Eur. J. Nucl. Med. Mol. Imaging* 2017, 44:81-91). In a phase 2 Australian study, an objective response was observed in 82% of patients with measurable nodal or visceral disease (Hofman et al., *Lancet Oncol.* 2018, 19:825-833). However, the complete response rate was low (<7%), and up to 33% of the patients still had progressive disease after $^{177}$Lu-PSMA-617 treatment (see: Kratochwil et al., supra; Fendler et al., supra, Rahbar et al., supra; Abmadzadehfar et al., supra; Brauer et al., supra; and Yadav et al., supra). One approach to increase the radiotherapeutic efficacy is to increase the radiation dose deposited in tumors per unit administered radioactivity of the $^{177}$Lu-labeled agents. Improving the delivery of $^{177}$Lu to tumors can also reduce the cost of therapeutic radiopharmaceuticals by decreasing radioisotope costs.

No admission is necessarily intended, nor should it be construed, that any of the preceding information constitutes prior art against the present invention.

SUMMARY OF THE INVENTION

Disclosed herein are novel compounds targeting the PSMA.

This disclosure provides a compound, wherein the compound has Formula I (shown below) or is a salt or a solvate of Formula I:

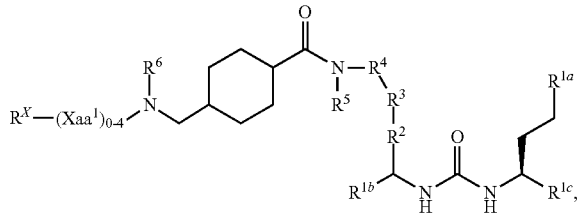

(I)

wherein: each of $R^{1a}$, $R^{1b}$ and $R^{1c}$ is independently —$CO_2H$, —$SO_2H$, —$SO_3H$, —$SO_4H$, —$PO_2H$, —$PO_3H$ or —$PO_4H$; $R^2$ is a linear or branched, cyclic or acyclic, and/or aromatic or non-aromatic $C_1$-$C_{20}$ alkylenyl or alkenylenyl, or a linear or branched, cyclic or acyclic, and/or aromatic or non-aromatic $X_2$—$X_{20}$ heteroalkylenyl or heteroalkenylenyl; $R^3$ is —O—, —S—, —S(O)—, S(O)$_2$—, —NHC(O)—, —O(O)NH—

$R^4$ is —($CH_2$)$_{0-3}$CH($R^7$)($CH_2$)$_{0-3}$—, wherein $R^7$ is —($CH_2$)$_5$$CH_3$,

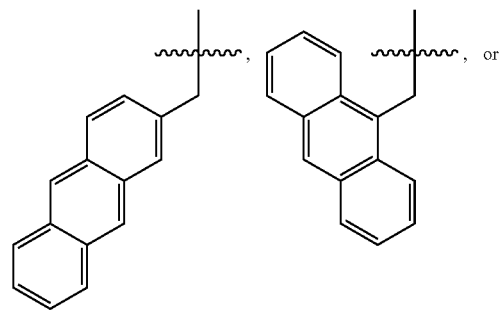

-continued

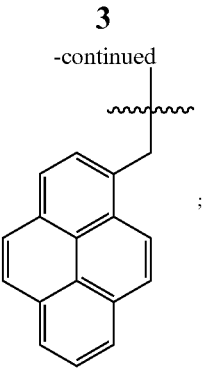

;

each of $R^5$ and $R^6$ is independently hydrogen or methyl; $Xaa^1$ is an amino acid of formula $-N(R^8)R^9C(O)-$, wherein each $R^8$ is independently hydrogen or methyl, and wherein each $R^9$ is independently: a linear or branched, cyclic or acyclic, and/or aromatic or non-aromatic $C_1$-$C_{20}$ alkylenyl, alkenylenyl or alkynylenyl; or a linear or branched, cyclic or acyclic, and/or aromatic or non-aromatic $X_2$—$X_{20}$ heteroalkylenyl, heteroalkenylenyl or heteroalkynylenyl; and $R^X$ is a radiolabeling group independently selected from: a radiometal chelator optionally bound by a radiometal; an aryl substituted with a radioisotope; a prosthetic group containing a trifluoroborate; and a prosthetic group containing a silicon-fluorine-acceptor moiety.

This summary of the invention does not necessarily describe all features of the invention.

BRIEF DESCRIPTION OF THE DRAWINGS

These and other features of the invention will become more apparent from the following description in which reference is made to the appended drawings wherein.

DETAILED DESCRIPTION

Figure 1:
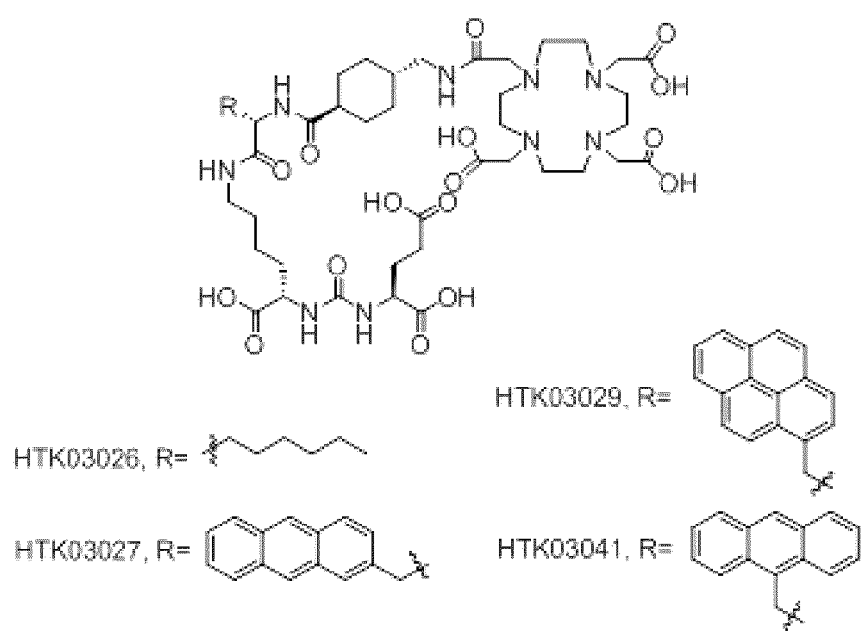
FIG. 1 depicts the chemical structures of HTK03026, HTK03027, HTK03029 and HTK03041.

As used herein, the terms "comprising," "having", "including" and "containing," and grammatical variations thereof, are inclusive or open-ended and do not exclude additional, unrecited elements and/or method steps. The term "consisting essentially of" if used herein in connection with a composition, use or method, denotes that additional elements and/or method steps may be present, but that these additions do not materially affect the manner in which the recited composition, method or use functions. The term "consisting of" if used herein in connection with a composition, use or method, excludes the presence of additional elements and/or method steps. A composition, use or method described herein as comprising certain elements and/or steps may also, in certain embodiments consist essentially of those elements and/or steps, and in other embodiments consist of those elements and/or steps, whether or not these embodiments are specifically referred to. A use or method described herein as comprising certain elements and/or steps may also, in certain embodiments consist essentially of those elements and/or steps, and in other embodiments consist of those elements and/or steps, whether or not these embodiments are specifically referred to.

A reference to an element by the indefinite article "a" does not exclude the possibility that more than one of the elements is present, unless the context clearly requires that there be one and only one of the elements. The singular forms "a", "an", and "the" include plural referents unless the content clearly dictates otherwise. The use of the word "a" or "an" when used herein in conjunction with the term "comprising" may mean "one," but it is also consistent with the meaning of "one or more," "at least one" and "one or more than one."

Unless otherwise specified, "certain embodiments", "various embodiments", "an embodiment" and similar terms includes the particular feature(s) described for that embodiment either alone or in combination with any other embodiment or embodiments described herein, whether or not the other embodiments are directly or indirectly referenced and regardless of whether the feature or embodiment is described in the context of a method, product, use, composition, compound, et cetera.

As used herein, the terms "treat", "treatment", "therapeutic" and the like includes ameliorating symptoms, reducing disease progression, improving prognosis and reducing recurrence (e.g. reducing cancer recurrence).

As used herein, the term "diagnostic agent" includes an "imaging agent". As such, a "diagnostic radiometal" includes radiometals that are suitable for use in imaging agents and "diagnostic radioisotope" includes radioisotopes that are suitable for use in imaging agents.

The term "subject" refers to an animal (e.g. a mammal or a non-mammal animal). The subject may be a human or a non-human primate. The subject may be a laboratory mammal (e.g., mouse, rat, rabbit, hamster and the like). The subject may be an agricultural animal (e.g., equine, ovine, bovine, porcine, camelid and the like) or a domestic animal (e.g., canine, feline and the like). In some embodiments, the subject is a human.

The compounds disclosed herein may also include base-free forms, salts or pharmaceutically acceptable salts thereof. Unless otherwise specified, the compounds claimed and described herein are meant to include all racemic mixtures and all individual enantiomers or combinations thereof, whether or not they are explicitly represented herein.

The compounds disclosed herein may be shown as having one or more charged groups, may be shown with ionizable groups in an uncharged (e.g. protonated) state or may be shown without specifying formal charges. As will be appreciated by the person of skill in the art, the ionization state of certain groups within a compound (e.g. without limitation, $CO_2H$, $PO_3H_2$, $SO_2H$, $SO_3H$, $SO_4H$, $OPO_3H_2$ and the like) is dependent, inter alia, on the pKa of that group and the pH at that location. For example, but without limitation, a carboxylic acid group (i.e. COOH) would be understood to usually be deprotonated (and negatively charged) at neutral pH and at most physiological pH values, unless the protonated state is stabilized. Likewise, $OSO_3H$ (i.e. $SO_4H$) groups, $SO_2H$ groups, $SO_3H$ groups, $OPO_3H_2$ (i.e. $PO_4H_2$) groups and $PO_3H$ groups would generally be deprotonated (and negatively charged) at neutral and physiological pH values.

As used herein, the terms "salt" and "solvate" have their usual meaning in chemistry. As such, when the compound is a salt or solvate, it is associated with a suitable counter-ion. It is well known in the art how to prepare salts or to exchange counter-ions. Generally, such salts can be prepared by reacting free acid forms of these compounds with a stoichiometric amount of a suitable base (e.g. without limitation, Na, Ca, Mg, or K hydroxide, carbonate, bicarbonate, or the like), or by reacting free base forms of these compounds with a stoichiometric amount of a suitable acid. Such reactions are generally carried out in water or in an organic solvent, or in a mixture of the two. Counter-ions may be changed, for example, by ion-exchange techniques such as ion-exchange chromatography. All zwitterions, salts, solvates and counter-ions are intended, unless a particular form is specifically indicated.

In certain embodiments, the salt or counter-ion may be pharmaceutically acceptable, for administration to a subject. More generally, with respect to any pharmaceutical composition disclosed herein, non-limiting examples of suitable excipients include any suitable buffers, stabilizing agents, salts, antioxidants, complexing agents, tonicity agents, cryoprotectants, lyoprotectants, suspending agents, emulsifying agents, antimicrobial agents, preservatives, chelating agents, binding agents, surfactants, wetting agents, non-aqueous vehicles such as fixed oils, or polymers for sustained or controlled release. See, for example, Berge et al. 1977. (*J. Pharm Sci.* 66:1-19), or Remington—The Science and Practice of Pharmacy, 21st edition (Gennaro et al editors. Lippincott Williams & Wilkins Philadelphia), each of which is incorporated by reference in its entirety.

As used herein, the expression "Xy-Xz", where y and z are integers (e.g. $X_1$—$X_{15}$, $X_1$—$X_{30}$, $X_1$—$X_{100}$, and the like), refers to the number of carbons (for alkyls, whether saturated or unsaturated, or aryls) in a compound, R-group or substituent, or refers to the number of carbons plus heteroatoms (for heteroalkyls, whether saturated or unsaturated, or heteroaryls) in a compound, R-group or substituent. Heteroatoms may include any, some or all possible heteroatoms. For example, in some embodiments, the heteroatoms are selected from N, O, S, P and Se. In some embodiments, the heteroatoms are selected from N, O, S and P. Such embodiments are non-limiting. Alkyls and aryls may alternatively be referred to using the expression "Cy-Cz", where y and z are integers (e.g. $C_3$-$C_{15}$ and the like).

Unless explicitly stated otherwise, the terms "alkyl" and "heteroalkyl" each includes any reasonable combination of the following: (1) saturated alkyls as well as unsaturated (including partially unsaturated) alkyls (e.g. alkenyls and alkynyls); (2) linear or branched; (3) acyclic or cyclic (aromatic or nonaromatic), the latter of which may include multi-cyclic (fused rings, multiple non-fused rings or a combination thereof); and (4) unsubstituted or substituted. For example, an alkyl or heteroalkyl (i.e. "alkyl/heteroalkyl") may be saturated, branched and cyclic, or unsaturated, branched and cyclic, or linear and unsaturated, or any other reasonable combination according to the skill of the person of skill in the art. If unspecified, the size of the alkyl/heteroalkyl is what would be considered reasonable to the person of skill in the art. For example, but without limitation, if unspecified, the size of an alkyl may be 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 89, 90, 91, 92, 93, 94, 95, 96, 97, 98, 99, 100 or more than 100 carbons in length, subject to the common general knowledge of the person of skill in the art. Further, but without limitation, if unspecified, the size of a heteroalkyl may be 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 89, 90, 91, 92, 93, 94, 95, 96, 97, 98, 99, 100 or more than 100 carbons and heteroatoms in length, subject to the common general knowledge of the person of skill in the art. In the context of the expression "alkyl, alkenyl or alkynyl" and similar expressions, the "alkyl" would be understood to be a saturated alkyl. Likewise, in the context of the expression "heteroalkyl, heteroalkenyl or heteroalkynyl" and similar expressions, the "heteroalkyl" would be understood to be a saturated heteroalkyl.

As used herein, in the context of an alkyl/heteroalkyl group of a compound, the term "linear" may be used as it is normally understood to a person of skill in the art and generally refers to a chemical entity that comprises a skeleton or main chain that does not split off into more than one contiguous chain. Non-limiting examples of linear alkyls include methyl, ethyl, n-propyl, and n-butyl.

As used herein, the term "branched" may be used as it is normally understood to a person of skill in the art and generally refers to a chemical entity that comprises a skeleton or main chain that splits off into more than one contiguous chain. The portions of the skeleton or main chain that split off in more than one direction may be linear, cyclic or any combination thereof. Non-limiting examples of a branched alkyl group include tert-butyl and isopropyl.

The term "alkylenyl" refers to a divalent analog of an alkyl group. In the context of the expression "alkylenyl, alkenylenyl or alkynylenyl", "alkylenyl or alkenylenyl" and similar expressions, the "alkylenyl" would be understood to be a saturated alkylenyl. The term "heteroalkylenyl" refers to a divalent analog of a heteroalkyl group. In the context of the expression "heteroalkylenyl, heteroalkenylenyl or heteroalkynylenyl", "heteroalkylenyl or heteroalkenylenyl" and similar expressions, the "heteroalkylenyl" would be understood to be a saturated heteroalkylenyl.

As used herein, the term "saturated" when referring to a chemical entity may be used as it is normally understood to a person of skill in the art and generally refers to a chemical entity that comprises only single bonds, and may include linear, branched, and/or cyclic groups. Non-limiting examples of a saturated $C_1$-$C_{20}$ alkyl group may include methyl, ethyl, n-propyl, i-propyl, sec-propyl, n-butyl, i-butyl, sec-butyl, t-butyl, n-pentyl, i-pentyl, sec-pentyl, t-pentyl, n-hexyl, i-hexyl, 1,2-dimethylpropyl, 2-ethylpropyl, 1-methyl-2-ethylpropyl, 1-ethyl-2-methylpropyl, 1,1,2-trimethylpropyl, 1,1,2-triethylpropyl, 1,1-dimethylbutyl, 2,2-dimethylbutyl, 2-ethylbutyl, 1,3-dimethylbutyl, 2-methyl pentyl, 3-methylpentyl, sec-hexyl, t-hexyl, n-heptyl, i-heptyl, sec-heptyl, t-heptyl, n-octyl, i-octyl, sec-octyl, t-octyl, n-nonyl, i-nonyl, sec-nonyl, t-nonyl, n-decyl, i-decyl, sec-decyl, t-decyl, cyclopropanyl, cyclobutanyl, cyclopentanyl, cyclohexanyl, cycloheptanyl, cyclooctanyl, cyclononanyl, cyclodecanyl, and the like. Unless otherwise specified, a $C_1$-$C_{20}$ alkylenyl therefore encompasses, without limitation, all divalent analogs of the above-listed saturated alkyl groups.

As used herein, the term "unsaturated" when referring to a chemical entity may be used as it is normally understood to a person of skill in the art and generally refers to a chemical entity that comprises at least one double or triple bond, and may include linear, branched, and/or cyclic groups. Non-limiting examples of a $C_2$-$C_{20}$ alkenyl group may include vinyl, allyl, isopropenyl, I-propene-2-yl, 1-butene-I-yl, I-butene-2-yl, I-butene-3-yl, 2-butene-I-yl, 2-butene-2-yl, octenyl, decenyl, cyclopropenyl, cyclobutenyl, cyclopentenyl, cyclohexenyl, cycloheptenyl, cyclooctenyl, cyclononanenyl, cyclodecanenyl, and the like. Unless otherwise specified, a $C_1$-$C_{20}$ alkenylenyl therefore encompasses, without limitation, all divalent analogs of the above-listed alkenyl groups. Non-limiting examples of a $C_2$-$C_{20}$ alkynyl group may include ethynyl, propynyl, butynyl, pentynyl, hexynyl, heptynyl, octynyl, nonynyl, decynyl, and the like. Unless otherwise specified, a $C_1$-$C_{20}$ alkynylenyl therefore encompasses, without limitation, all divalent analogs of the above-listed alkynyl groups. Without limitation, the above-defined saturated $C_1$-$C_{20}$ alkyl groups, $C_2$-$C_{20}$ alkenyl groups and $C_2$-$C_{20}$ alkynyl groups are all encompassed within the term "$X_1$—$X_{20}$ alkyl", unless otherwise indicated. Without limitation, the above-defined saturated $C_1$-$C_{20}$ alkylenyl groups, $C_2$-$C_{20}$ alkenylenyl groups and $C_2$-$C_{20}$ alkynylenyl groups are all encompassed within the term "$X_1$—$X_{20}$ alkylenyl", unless otherwise indicated.

Without limitation, the term "$X_1$—$X_{20}$ heteroalkyl" would encompass each of the above-defined saturated $C_1$-$C_{20}$ alkyl groups, $C_2$-$C_{20}$ alkenyl groups and $C_2$-$C_{20}$ alkynyl groups, where one or more of the carbon atoms is independently replaced with a heteroatom. Likewise, without limitation, the term "$X_1$—$X_{20}$ heteroalkylenyl" would encompass each of the above-defined saturated $C_1$-$C_{20}$ alkylenyl groups, $C_2$-$C_{20}$ alkenylenyl groups and $C_2$-$C_{20}$ alkynylenyl groups, where one or more of the carbon atoms is independently replaced with a heteroatom. The person of skill in the art would understand that various combinations of different heteroatoms may be used. Non-limiting examples of non-aromatic heterocyclic groups include aziridinyl, azetidinyl, diazetidinyl, pyrrolidinyl, pyrrolinyl, piperidinyl, piperazinyl, imidazolinyl, pyrazolidinyl, imidazolidinyl, phthalimidyl, succinimidyl, oxiranyl, tetrahydropyranyl, oxetanyl, dioxanyl, thietanyl, thiepinyl, morpholinyl, oxathiolanyl, and the like.

Unless further specified, an "aryl" group includes both single aromatic rings as well as fused rings containing at least one aromatic ring. non-limiting examples of $C_3$-$C_{20}$ aryl groups include phenyl (Ph), pentalenyl, indenyl, naphthyl and azulenyl. Non-limiting examples of $X_3$—$X_{20}$ aromatic heterocyclic groups include pyrrolyl, imidazolyl, pyrazolyl, pyridinyl, pyridazinyl, pyrimidinyl, pirazinyl, quinolinyl, isoquinolinyl, acridinyl, indolyl, isoindolyl, indolizinyl, purinyl, carbazolyl, indazolyl, phthalazinyl, naphthyridinyl, quinoxalinyl, quinazolinyl, cinnolinyl, pteridinyl, phenanthridinyl, phenazinyl, phenanthrolinyl, perimidinyl, furyl, dibenzofuryl, xanthenyl, benzofuryl, thiophenyl, thianthrenyl, benzothiophenyl, phosphorinyl, phosphinolinyl, phosphindolyl, thiazolyl, oxazolyl, isoxazolyl, and the like.

As used herein, the term "substituted" is used as it would normally be understood to a person of skill in the art and generally refers to a compound or chemical entity that has one chemical group replaced with a different chemical group. Unless otherwise specified, a substituted alkyl is an alkyl in which one or more hydrogen atom(s) are independently each replaced with an atom that is not hydrogen. For example, chloromethyl is a non-limiting example of a substituted alkyl, more particularly an example of a substituted methyl. Aminoethyl is another non-limiting example of a substituted alkyl, more particularly an example of a substituted ethyl. Unless otherwise specified, a substituted compound or group (e.g. alkyl, heteroalkyl, aryl, heteroaryl and the like) may be substituted with any chemical group reasonable to the person of skill in the art. For example, but without limitation, a hydrogen bonded to a carbon or heteroatom (e.g. N) may be substituted with halide (e.g. F, I, Br, Cl), amine, amide, oxo, hydroxyl, thiol, phosphate, phosphonate, sulfate, $SO_2H$, $SO_3H$, alkyls, heteroalkyls, aryl, heteroaryl, ketones, carboxaldehyde, carboxylates, carboxamides, nitriles, monohalomethyl, dihalomethyl or trihalomethyl.

As used herein, the term "unsubstituted" is used as it would normally be understood to a person of skill in the art. Non-limiting examples of unsubstituted alkyls include methyl, ethyl, tert-butyl, pentyl and the like. The expression "optionally substituted" is used interchangeably with the expression "unsubstituted or substituted".

In the structures provided herein, hydrogen may or may not be shown. In some embodiments, hydrogens (whether shown or implicit) may be protium (i.e. $^1H$), deuterium (i.e. $^2H$) or combinations of $^1H$ and $^2H$. Methods for exchanging $^1H$ with $^2H$ are well known in the art. For solvent-exchangeable hydrogens, the exchange of $^1H$ with $^2H$ occurs readily in the presence of a suitable deuterium source, without any catalyst. The use of acid, base or metal catalysts, coupled with conditions of increased temperature and pressure, can facilitate the exchange of non-exchangeable hydrogen atoms, generally resulting in the exchange of all $^1H$ to $^2H$ in a molecule.

The term "Xaa" refers to an amino acid residue in a peptide chain (linear or branched) or an amino acid that is otherwise part of a compound. Amino acids have both an amino group and a carboxylic acid group, either or both of which can be used for covalent attachment. In attaching to the remainder of the compound, the amino group and/or the carboxylic acid group may be converted to an amide or other structure; e.g. a carboxylic acid group of a first amino acid is converted to an amide (i.e. a peptide bond) when bonded to the amino group of a second amino acid. As such, Xaa may have the formula —N($R^a$)$R^b$C(O)—, where $R^a$ and $R^b$ are R-groups. $R^a$ will typically be hydrogen or methyl. The amino acid residues of a peptide may comprise typical peptide (amide) bonds and may further comprise bonds between side chain functional groups and the side chain or main chain functional group of another amino acid. For example, the side chain carboxylate of one amino acid residue in the peptide (e.g. Asp, Glu, etc.) may be bonded to and the amine of another amino acid residue in the peptide (e.g. Dap, Dab, Orn, Lys). Further details are provided below. Unless otherwise indicated, "Xaa" may be any amino acid, including proteinogenic and nonproteinogenic amino acids. Non-limiting examples of nonproteinogenic amino acids are shown in Table 1 and include: D-amino acids (including without limitation any D-form of the following amino acids), ornithine (Orn), 3-(1-naphtyl)alanine (Nal), 3-(2-naphtyl)alanine (2-Nal), α-aminobutyric acid, norvaline, norleucine (Nle), homonorleucine, beta-(1,2,3-triazol-4-yl)-L-alanine, 1,2,4-triazole-3-alanine, Phe(4-F), Phe(4-Cl), Phe(4-Br), Phe(4-I), Phe(4-$NH_2$), Phe(4-$NO_2$), homoarginine (hArg), 2-amino-4-guanidinobutyric acid (Agb), 2-amino-3-guanidinopropionic acid (Agp), B-alanine, 4-aminobutyric acid, 5-aminovaleric acid, 6-aminohexanoic acid, 7-aminoheptanoic acid, 8-aminooctanoic acid, 9-aminononanoic acid, 10-aminodecanoic acid, 2-aminooctanoic acid, 2-amino-3-(anthracen-2-yl)propanoic acid, 2-amino-3-(anthracen-9-yl) propanoic acid, 2-amino-3-(pyren-1-yl)propanoic acid, Trp(5-Br), Trp(5-$OCH_3$), Trp(6-F), Trp(5-OH) or Trp(CHO), 2-aminoadipic acid (2-Aad), 3-aminoadipic acid (3-Aad), propargylglycine (Pra), homopropargylglycine (Hpg), beta-homopropargylglycine (Bpg), 2,3-diaminopropionic acid (Dap), 2,4-diaminobutyric acid (Dab), azidolysine (Lys(N$_3$)), azido-ornithine (Orn (N$_3$)), 2-amino-4-azidobutanoic acid Dab(N$_3$), Dap(N$_3$), 2-(5'-azidopentyl)alanine, 2-(6'-azidohexyl)alanine, 4-amino-1-carboxymethyl-piperidine (Pip), 4-(2-aminoethyl)-1-carboxymethyl-piperazine (Acp), and tranexamic acid. If not specified as an L- or D-amino acid, an amino acid shall be understood to encompass both L- and D-amino acids.

TABLE 1

List of non-limiting examples of non-proteinogenic amino acids.

Any D-amino acid of a proteinogenic amino acid
ornithine (Orn)
3-(1-naphtyl)alanine (Nal)
3-(2-naphtyl)alanine (2-Nal)
α-aminobutyric acid
norvaline
norleucine (Nle)
homonorleucine
beta-(1,2,3-triazol-4-yl)-L-alanine
1,2,4-triazole-3-alanine
Phe(4-F),
Phe(4-Cl),
Phe(4-Br),
Phe(4-I),
Phe(4-NH$_2$),
Phe(4-NO$_2$),
homoarginine (hArg)
4-(2-aminoethyl)-1-carboxymethyl-piperazine (Acp)
2-(5'-azidopentyl)alanine, 2-(6'-azidohexyl)alanine
2-amino-4-guanidinobutyric acid (Agb)
2-amino-3-guanidinopropionic acid (Agp)
β-alanine
4-aminobutyric acid
5-aminovaleric acid
6-aminohexanoic acid
7-aminoheptanoic acid
8-aminooctanoic acid
9-aminononanoic acid
10-aminodecanoic acid
2-aminooctanoic acid
2-amino-3-(anthracen-2-yl)propanoic acid
2-amino-3-(anthracen-9-yl)propanoic acid
2-amino-3-(pyren-1-yl)propanoic acid
Trp(5-Br),
Trp(5-OCH$_3$),
Trp(6-F),
Trp(5-OH)
Trp(CHO),
2-aminoadipic acid (2-Aad)
3-aminoadipic acid (3-Aad)
propargylglycine (Pra)
homopropargylglycine (Hpg)
beta-homopropargylglycine (Bpg)
2,3-diaminopropionic acid (Dap)
2,4-diaminobutyric acid (Dab)
azidolysine (Lys(N$_3$))
azido-ornithine (Orn(N$_3$))
amino-4-azidobutanoic acid Dab(N$_3$)
tranexamic acid
4-amino-1-carboxymethyl-piperidine (Pip)
NH$_2$(CH$_2$)$_2$O(CH$_2$)$_2$C(O)OH
NH$_2$(CH$_2$)$_2$[O(CH$_2$)$_2$]$_2$C(O)OH
NH$_2$(CH$_2$)$_2$[O(CH$_2$)$_2$]$_3$C(O)OH
NH$_2$(CH$_2$)$_2$[O(CH$_2$)$_2$]$_4$C(O)OH
NH$_2$(CH$_2$)$_2$[O(CH$_2$)$_2$]$_5$C(O)OH
NH$_2$(CH$_2$)$_2$[O(CH$_2$)$_2$]$_6$C(O)OH The wavy line "〰" symbol shown through or at the end of a bond in a chemical formula (e.g. in the definitions R$^3$, R$^7$, etc.) is intended to define the R group on one side of the wavy line, without modifying the definition of the structure on the opposite side of the wavy line. Where an R group is bonded two or more sides (e.g. R$^3$), any atoms shown outside the wavy lines are intended to clarify orientation of the R group. As such, only the atoms between the two wavy lines constitute the definition of the R group. When atoms are not shown outside the wavy lines, or for a chemical group shown without wavy lines but does have bonds on multiple sides (e.g. —C(O)NH—, and the like), the chemical group should be read from left to right matching the orientation in the formula that the group relates to (e.g. for formula —R$^a$—R$^b$—R$^3$—, the definition of R$^b$ as —C(O)NH— would be incorporated into the formula as —R$^a$—C(O)NH—R$^3$— not as —R$^a$—NHC(O)—R$^3$—).

In various aspects, there is disclosed a compound, wherein the compound has Formula I or is a salt or a solvate of Formula I:

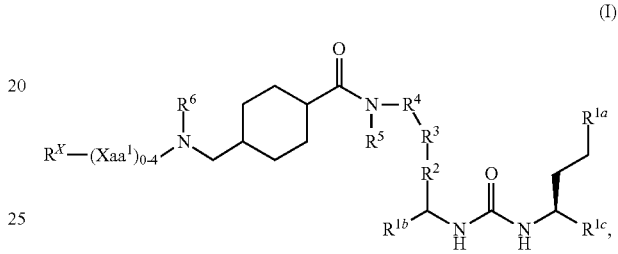

(I)

wherein:

each of R$^{1a}$, R$^{1b}$ and R$^{1c}$ is independently —CO$_2$H, —SO$_2$H, —SO$_3$H, —SO$_4$H, —PO$_2$H, —PO$_3$H or —PO$_4$H;

R$^2$ is a linear or branched, cyclic or acyclic, and/or aromatic or non-aromatic C$_1$-C$_{20}$ alkylenyl or alkenylenyl, or a linear or branched, cyclic or acyclic, and/or aromatic or non-aromatic X$_2$—X$_{20}$ heteroalkylenyl or heteroalkenylenyl;

R$^3$ is —O—, —S—, —S(O)—, S(O)$_2$—, —NHC(O)—, —C(O)NH—,

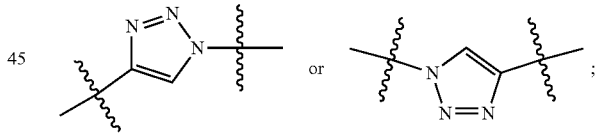

R$^4$ is —(CH$_2$)$_{0-3}$CH(R$^7$)(CH$_2$)$_{0-3}$—, wherein R$^7$ is —(CH$_2$)$_5$CH$_3$,

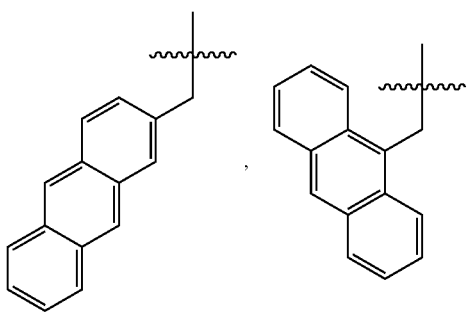

or 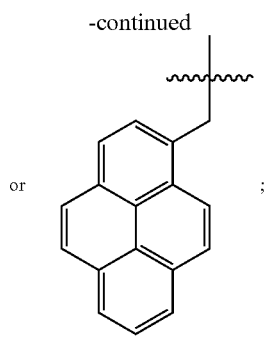 ;

each of $R^5$ and $R^6$ is independently hydrogen or methyl;
$Xaa^1$ is an amino acid of formula —N(R$^8$)R$^9$C(O)—,
wherein each $R^8$ is independently hydrogen or methyl, and wherein each $R^9$ is independently: a linear or branched, cyclic or acyclic, and/or aromatic or non-aromatic $C_1$-$C_{20}$ alkylenyl, alkenylenyl or alkynylenyl; or a linear or branched, cyclic or acyclic, and/or aromatic or non-aromatic $X_2$—$X_{20}$ heteroalkylenyl, heteroalkenylenyl or heteroalkynylenyl;
$R^X$ is a radiolabeling group independently selected from: a radiometal chelator optionally bound by a radiometal; an aryl substituted with a radioisotope; a prosthetic group containing a trifluoroborate; and a prosthetic group containing a silicon-fluorine-acceptor moiety.

In some embodiments, the compound has Formula I-a or is a salt or solvate of Formula I-a:

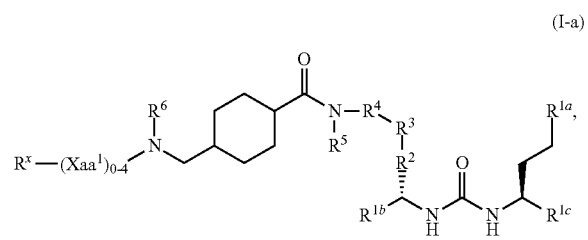

(I-a)

wherein $R^{1a}$, $R^{1b}$, $R^{1c}$, $R^2$, $R^3$, $R^4$, $R^5$, $R^6$, $Xaa^1$ and $R^X$ are as defined for Formula I.

In some embodiments, the compound has Formula I-b or is a salt or solvate of Formula I-b:

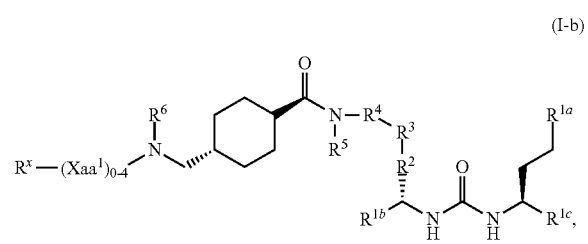

(I-b)

wherein $R^{1a}$, $R^{1b}$, $R^{1c}$, $R^2$, $R^3$, $R^4$, $R^5$, $R^6$, $Xaa^1$ and $R^X$ are as defined in Formula I.

In some embodiments, $R^{1a}$ is —CO$_2$H. In some embodiments, $R^{1b}$ is —CO$_2$H. In some embodiments, $R^{1c}$ is —CO$_2$H. In some embodiments, $R^{1a}$ and $R^{1b}$ are each —CO$_2$H. In some embodiments, $R^{1a}$ and $R^{1c}$ are each —CO$_2$H. In some embodiments, $R^{1b}$ and $R^{1c}$ are each —CO$_2$H. In some embodiments, $R^{1a}$, $R^{1b}$ and $R^{1c}$ are each —CO$_2$H.

In some embodiments, $R^2$ is a linear or branched $C_1$-$C_{20}$ alkylenyl in which 0-5 carbons are replaced with N, S and/or O heteroatoms. In some embodiments, $R^2$ is a linear acyclic $C_3$-$C_{15}$ alkylenyl. In some embodiments, $R^2$ is a linear acyclic $C_3$-$C_{15}$ heteroalkylenyl having 1-5 N, S and/or O heteroatoms. In some embodiments, $R^2$ is a linear acyclic saturated $C_3$-$C_{10}$ alkylenyl, optionally substituted with 1-5 amine, amide, oxo, hydroxyl, thiol, methyl or ethyl groups. In some embodiments, $R^2$ is —(CH$_2$)$_{3-15}$—. In some embodiments, $R^2$ is —(CH$_2$)$_{1-8}$—. In some embodiments, $R^2$ is —CH$_2$—. In some embodiments, $R^2$ is —(CH$_2$)$_2$—. In some embodiments, $R^2$ is —(CH$_2$)$_3$—. In some embodiments, $R^2$ is —(CH$_2$)$_4$—. In some embodiments, $R^2$ is —(CH$_2$)$_5$—. In some embodiments, $R^2$ is —CH$_2$—O—CH$_2$—. In some embodiments, $R^2$ is —CH$_2$—S—CH$_2$—.

In some embodiments, $R^3$ is —O—. In some embodiments, $R^3$ is —S—. In some embodiments, $R^3$ is —NHC(O)—. In some embodiments, $R^3$ is —C(O)NH—. In some embodiments, $R^3$ is

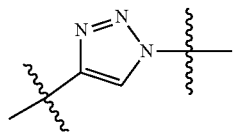

In some embodiments, $R^3$ is

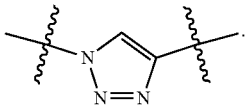 [SMILES: *c1cn(*)nn1]

In some embodiments, $R^3$ is —S(O)—. In some embodiments, $R^3$ is —S(O)$_2$—.

In some embodiments, $R^2$ is —(CH$_2$)$_{3-15}$— and $R^3$ is —C(O)NH—. In some embodiments, $R^2$ is —(CH$_2$)$_{3-5}$— and $R^3$ is —C(O)NH—. In some embodiments, $R^2$ is —(CH$_2$)$_{1-8}$— and $R^3$ is —C(O)NH—. In some embodiments, $R^2$ is —(CH$_2$)$_4$— and $R^3$ is —C(O)NH—.

In some embodiments, $R^4$ is —(CH$_2$)$_3$CH(R$^7$)(CH$_2$)$_3$—. In some embodiments, $R^4$ is —(CH$_2$)$_2$CH(R$^7$)(CH$_2$)$_2$—. In some embodiments, $R^4$ is —CH$_2$CH(R$^7$)CH$_2$—. In some embodiments, $R^4$ is —CH$_2$CH(R$^7$)(CH$_2$)$_{0-3}$—. In some embodiments, $R^4$ is —(CH$_2$)$_{0-3}$CH(R$^7$)CH$_2$—. In some embodiments, $R^4$ is —CH$_2$CH(R$^7$)—. In some embodiments, $R^4$ is —CH(R$^7$)CH$_2$—. In some embodiments, $R^4$ is —CH(R$^7$)—.

In some embodiments, $R^7$ forms the side chain of an L-amino acid residue. In other embodiments, $R^7$ forms the side chain of a D-amino acid residue.

In some embodiments, $R^7$ is —(CH$_2$)$_5$CH$_3$. In some embodiments, $R^7$ is

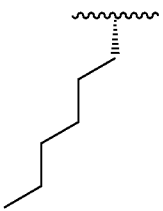

In some embodiments, $R^7$ is

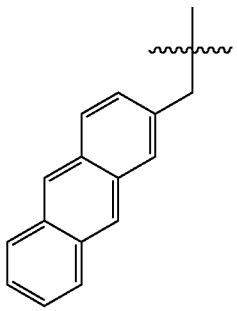

In certain embodiments, $R^7$ is

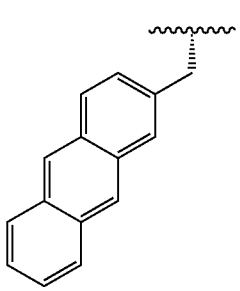

In some embodiments, $R^7$ is

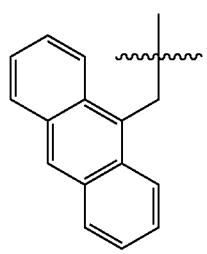

In certain embodiments, $R^7$ is

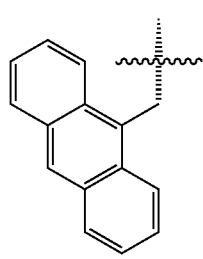

In some embodiments, $R^7$ is

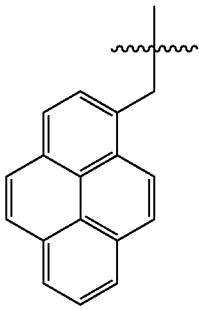

In certain embodiments, $R^7$ is

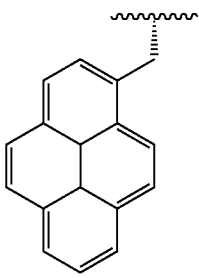

In some embodiments, $R^4$ is —CH($R^7$)— and $R^7$ is

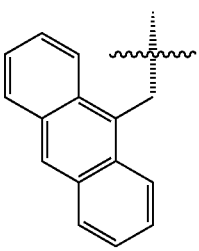

In some embodiments, $R^5$ is hydrogen. In some embodiments, $R^5$ is methyl. In some embodiments, $R^6$ is hydrogen. In some embodiments, $R^6$ is methyl. In some embodiments, $R^5$ and $R^6$ are both hydrogen. In some embodiments, $R^5$ and $R^6$ are both methyl. In some embodiments, $R^5$ is methyl and $R^6$ is hydrogen. In some embodiments, $R^5$ is hydrogen and $R^6$ is methyl.

In some embodiments, the compound has Formula II or is a salt or solvate of Formula II:

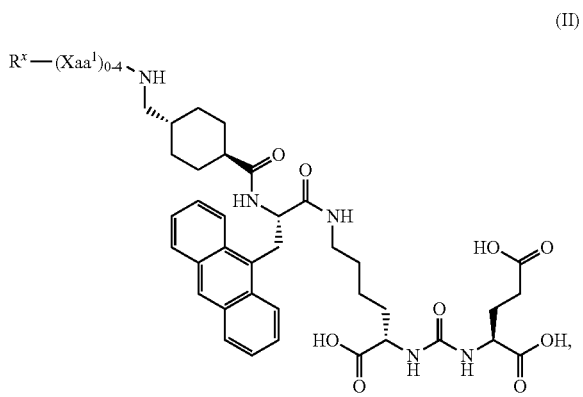

(II)

wherein $R^X$ and $Xaa^1$ are as defined in Formula I.

In some embodiments, $(Xaa^1)_{0-4}$ is $(Xaa^1)_{2-4}$. In some embodiments, $(Xaa^1)_{0-4}$ is $Xaa^1$. In some embodiments, $(Xaa^1)_{0-4}$ is $(Xaa^1)_2$. In some embodiments, $(Xaa^1)_{0-4}$ is $(Xaa^1)_3$. In some embodiments, $(Xaa^1)_{0-4}$ is $(Xaa^1)_4$. In some embodiments, $(Xaa^1)_{0-4}$ is absent.

In some embodiments, $(Xaa^1)_{0-4}$ consists of a single amino acid residue. In some embodiments, $(Xaa^1)_{0-4}$ is a dipeptide, wherein each $Xaa^1$ may be the same or different. In some embodiments, $(Xaa^1)_{0-4}$ is a tripeptide, wherein each $Xaa^1$ may be the same, different or a combination thereof. In some embodiments, $(Xaa^1)_{0-4}$ consists of 4 amino acid residues connected by peptide bonds, wherein each $Xaa^1$ may be the same, different or a combination thereof. In some embodiments, each $Xaa^1$ is independently selected from proteinogenic amino acids and the non-proteinogenic amino acids listed in Table 1, wherein each peptide backbone amino group is optionally methylated. $R^X$ may form an amide bond with $Xaa^1$. The linkages between $Xaa^1$ groups and between $R^X$ and $Xaa^1$ may be amide bonds.

In some embodiments, each $R^9$ is independently: a linear or branched $C_1$-$C_{18}$ alkylenyl in which 0-5 carbons are replaced with N, S and/or O heteroatoms; or —CH($CH_2R^{19}$)— wherein each $R^{19}$ is independently a $C_5$-$C_{16}$ cyclic or multicylic system in which 0-5 carbons are replaced with N and optionally substituted with 0-5 hydroxy groups, and which is non-aromatic, partially aromatic or fully aromatic. Each $R^8$ is independently hydrogen or methyl. In some embodiments, each $R^8$ is hydrogen. In some embodiments, each $R^8$ is methyl. In some embodiments, the $R^8$ groups are a combination of hydrogen and methyl.

In some embodiments, $R^X$ comprises a radiometal chelator optionally bound by a radiometal. The radiometal chelator may be any radiometal chelator suitable for binding to the radiometal and which is functionalized for attachment to an amino group. Many suitable radiometal chelators are known, e.g. as summarized in Price and Orvig, Chem. Soc. Rev., 2014, 43, 260-290, which is incorporated by reference in its entirety. Non-limiting examples of radioisotope chelators include chelators selected from the group consisting of: DOTA and derivatives; DOTAGA; NOTA; NODAGA; NODASA; CB-DO2A; 3p-C-DEPA; TCMC; DO3A; DTPA and DTPA analogues optionally selected from CHX-A"-DTPA and 1B4M-DTPA; TETA; NOPO; Me-3,2-HOPO; CB-TE1A1P; CB-TE2P; MM-TE2A; DM-TE2A; sarcophagine and sarcophagine derivatives optionally selected from SarAr, SarAr-NCS, diamSar, AmBaSar, and BaBaSar; TRAP; AAZTA; DATA and DATA derivatives; H2-macropa or a derivative thereof; $H_2$dedpa, Haoctapa, $H_4$py4pa, $H_4$Pypa, $H_2$azapa, $H_5$decapa, and other picolinic acid derivatives; CP256; PCTA; C-NETA; C-NE3TA; HBED; SHBED; BCPA; CP256; YM103; desferrioxamine (DFO) and DFO derivatives; and $H_6$phospa. Exemplary non-limiting examples of radioisotope chelators and example radioisotopes chelated by these chelators are shown in Table 2. In alternative embodiments, $R^X$ comprises a radioisotope chelator selected from those listed above or in Table 2, or is any other radioisotope chelator. One skilled in the art could replace any of the chelators listed herein with another chelator.

TABLE 2

Exemplary chelators and exemplary isotopes which bind said chelators.

| Chelator | Isotopes |
|---|---|
| DOTA, 1,4,7,10-tetraazacyclododecane-1,4,7,10-tetraacetic acid | Cu-64/67<br>Ga-67/68<br>In-111<br>Lu-177<br>Y-86/90<br>Bi-203/212/213<br>Pb-212<br>Ac-225<br>Gd-159<br>Yb-175<br>Ho-166<br>As-211<br>Sc-44/47<br>Pm-149<br>Pr-142<br>Sn-117m<br>Sm-153<br>Tb-149/161<br>Er-165<br>Ra-223/224<br>Th-227 |

TABLE 2-continued
Exemplary chelators and exemplary isotopes which bind said chelators.
| Chelator | Isotopes |
| --- | --- |
| 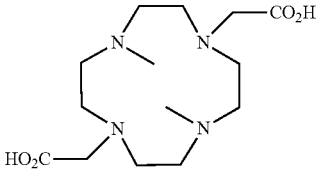<br>CB-DO2A, 4,10-bis(carboxymethyl)-1,4,7,10-tetraazabicyclo[5.5.2]tetradecane | Cu-64/67 |
| 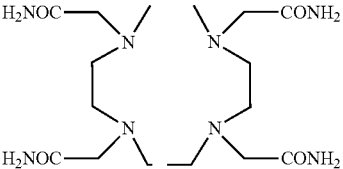<br>TCMC, 1,4,7,10-tetrakis(carbamoylmethyl)-1,4,7,10-tetraazacyclododecane | Pb-212 |
| 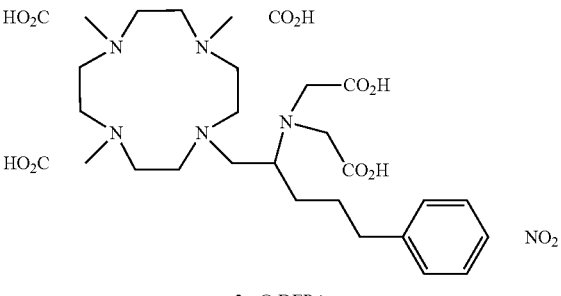<br>3p-C-DEPA | Bi-212/213 |
| 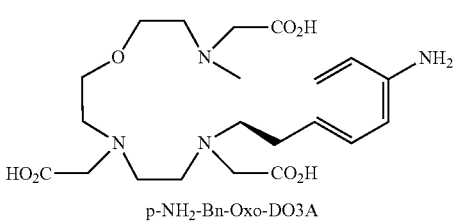<br>p-NH$_2$-Bn-Oxo-DO3A | Cu-64/67 |
| 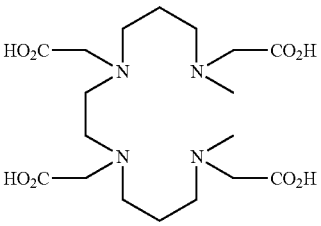<br>TETA, 1,4,8,11-tetraazacyclotetradecane-1,4,8,11-tetraacetic acid | Cu-64/67 |

TABLE 2-continued

Exemplary chelators and exemplary isotopes which bind said chelators.

| Chelator | Isotopes |
|---|---|
| 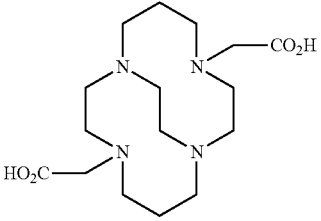<br>CB-TE2A, 4,11-bis-(carboxymethyl)-1,4,8,11-tetraazabicyclo[6.6.2]-hexadecane | Cu-64/67 |
| 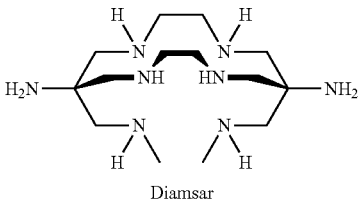<br>Diamsar | Cu-64/67 |
| 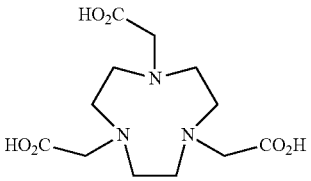<br>NOTA, 1,4,7-triazacyclononane-1,4,7-triacetic acid | Cu-64/67<br>Ga-68<br>In-111<br>Sc-44/47 |
| 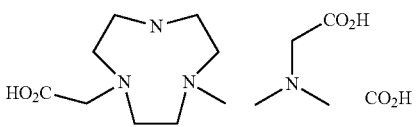<br>NETA, {4-[2-(bis-carboxymethylamino)-ethyl]-7-carboxymethyl-[1,4,7]triazonan-1-yl}-acetic acid | Cu-64/67<br>Ga-68<br>Lu-177<br>Y-86/90<br>Bi-213<br>Pb-212 |
| 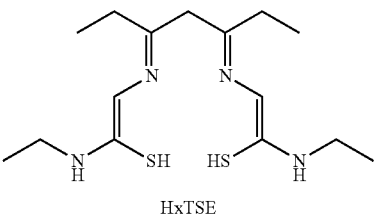 [SMILES: CCN/C(S)=C/N=C(\CC)C/C(CC)=N/C=C(\S)NCC]<br>HxTSE | Au-198/199 |
| 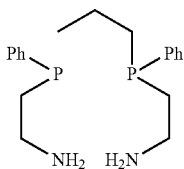<br>$P_2N_2Ph_2$ | Rh-105 |

TABLE 2-continued

Exemplary chelators and exemplary isotopes which bind said chelators.

| Chelator | Isotopes |
|---|---|
| 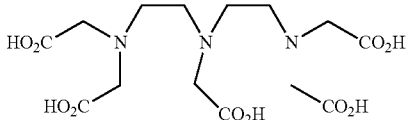<br>DTPA, diethylenetriaminepentaacetic acid | In-111<br>Sc-44/47<br>Lu-177<br>Y-86/90<br>Sn-117m<br>Pd-109 |
| 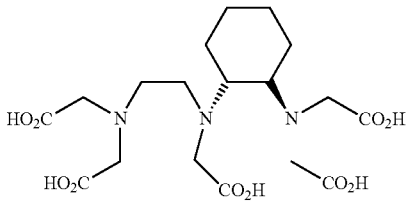<br>CHX-A00-DTPA, 2-(p-isothiocyanatobenzyl)-cyclohexyldiethylenetriaminepentaacetic acid | In-111<br>Lu-177<br>Y-86/90<br>Bi-212/213 |
| 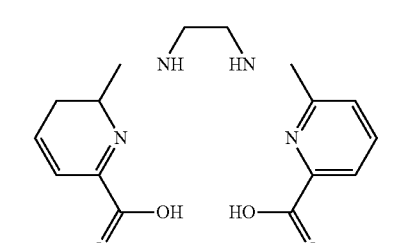<br>H$_2$dedpa, 1,2-[[6-(carboxy)-pyridin-2-yl]-methylamino]ethane | Cu-64/67 |
| 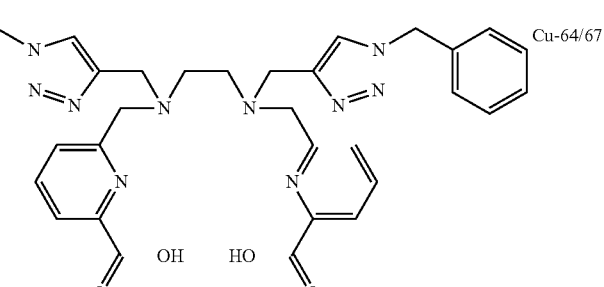<br>H$_2$azapa, N,N0-[1-benzyl-1,2,3-triazole-4-yl]methyl-N,N0-[6-(carboxy)pyridin-2-yl]-1,2-diaminoethane | Cu-64/67 |
| 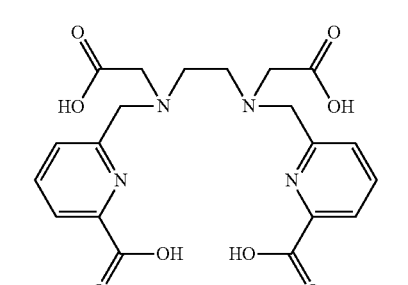<br>H$_4$octapa | In-111<br>Lu-177<br>Y-86/90<br>Ac-225 |

TABLE 2-continued
Exemplary chelators and exemplary isotopes which bind said chelators.
| Chelator | Isotopes |
|---|---|
| 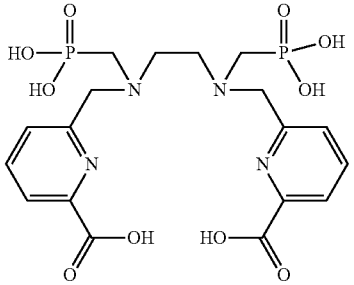<br>H$_6$phospa | Ac-225 |
| 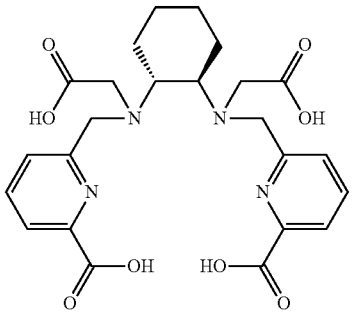<br>H$_4$CHXoctapa | In-111<br>Ac-225 |
| 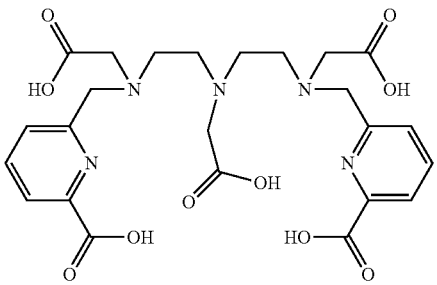<br>H$_5$decapa | In-111<br>Lu-177<br>Ac-225 |
| 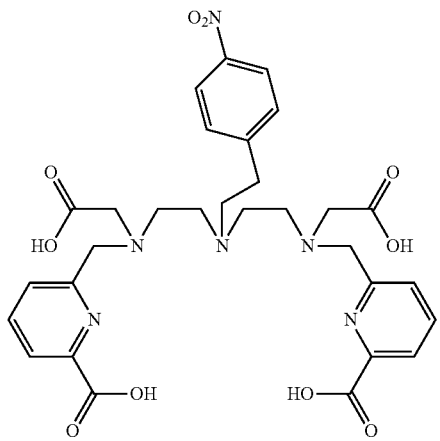<br>H$_4$neunpa-p-Bn-NO$_2$ | In-111<br>Lu-177<br>Ac-225 |

TABLE 2-continued

Exemplary chelators and exemplary isotopes which bind said chelators.

| Chelator | Isotopes |
|---|---|
| 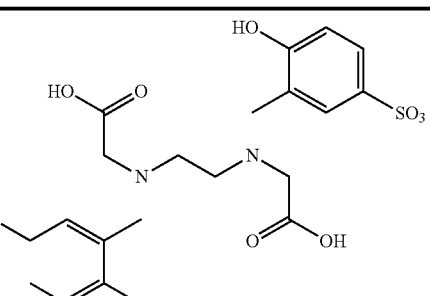<br>SHBED, N,N0-bis(2-hydroxy-5-sulfobenzyl)-ethylenediamine-N,N0-diacetic acid | In-111<br>Ga-68 |
| 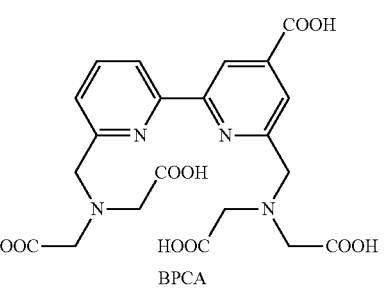<br>BPCA | In-111 |
| 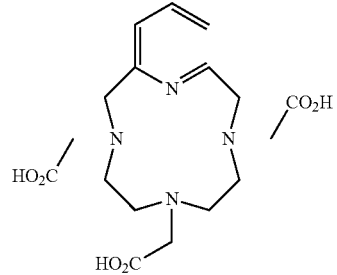<br>PCTA, 3,6,9,15-tetraazabicyclo[9.3.1]-pentadeca-1(15),11,13-triene-3,6,9,-triacetic acid | Cu-64/67 |
| H2-MACROPA (N,N'-bis[(6-carboxy-2-pyridil)methyl]-4,13-diaza-18-crown-6) | Ac-225 |

In some embodiments, $R^X$ is polyaminocarboxylate chelator attached through an amide bond. In some embodiments, $R^X$ is: DOTA (1,4,7,10-tetraazacyclododecane-1,4,7,10-tetraacetic acid) or a derivative thereof; TETA (1,4,8,11-tetraazacyclotetradecane-1,4,8,11-tetraacetic acid) or a derivative thereof; SarAr (1-N-(4-Aminobenzyl)-3,6,10,13,16,19-hexaazabicyclo[6.6.6]-eicosane-1,8-diamine or a derivative thereof; NOTA (1,4,7-triazacyclononane-1,4,7-triacetic acid) or a derivative thereof; TRAP (1,4,7-triazacyclononane-1,4,7-tris[methyl(2-carboxyethyl)phosphinic acid) or a derivative thereof; HBED (N,N0-bis(2-hydroxybenzyl)-ethylenediamine-N,N0-diacetic acid) or a derivative thereof; 2,3-HOPO (3-hydroxypyridin-2-one) or a derivative thereof; PCTA (3,6,9,15-tetraazabicyclo[9.3.1]-pentadeca-1(15),11,13-triene-3,6,9,-triacetic acid) or a derivative thereof; DFO (desferrioxamine) or a derivative thereof; DTPA (diethylenetriaminepentaacetic acid) or a derivative thereof; OCTAPA (N,N0-bis(6-carboxy-2-pyridylmethyl)-ethylenediamine-N,N0-diacetic acid) or a derivative thereof; or H2-MACROPA (N,N'-bis[(6-carboxy-2-pyridil)methyl]-4,13-diaza-18-crown-6) or a derivative thereof. In some embodiments, $R^X$ is DOTA. In some embodiments, $R^X$ is a chelator moiety in complex with radioisotope X wherein X is $^{64}$Cu, $^{67}$Cu, $^{90}$Y, $^{111}$In, $^{114m}$In, $^{117m}$Sn, $^{153}$Sm, $^{149}$Tb, $^{161}$Tb, $^{177}$Lu, $^{225}$Ac, $^{213}$Bi, $^{224}$Ra, $^{212}$Bi, $^{212}$Pb, $^{227}$Th, $^{223}$Ra, $^{47}$Sc, $^{186}$Re or $^{188}$Re. In some embodiments, X is $^{177}$Lu. In some embodiments, $R^X$ is a chelator moiety in complex with radioisotope X wherein X is $^{64}$Cu, $^{68}$Ga, $^{86}$Y, $^{111}$In, $^{94m}$Tc, $^{44}$Sc, $^{89}$Zr, or $^{99m}$Tc. In some embodiments, X is $^{68}$Ga.

In some embodiments, the radioisotope chelator is conjugated with a radioisotope. The conjugated radioisotope may be, without limitation, $^{68}$Ga, $^{61}$Cu, $^{64}$Cu, $^{67}$Ga, $^{99m}$Tc, 111In, $^{44}$Sc, $^{86}$Y, $^{89}$Zr, $^{99}$Nb, $^{177}$Lu, $^{117m}$Sn, $^{165}$Er, $^{99}$Y, $^{227}$Th, $^{225}$Ac, $^{213}$Bi, $^{212}$Bi, $^{211}$As, $^{203}$Pb, $^{212}$Pb, $^{47}$Sc, $^{166}$Ho, $^{188}$Re, $^{186}$Re, $^{149}$Pm, $^{159}$Gd, $^{105}$Rh, $^{109}$Pd, $^{198}$Au, $^{199}$Au, $^{175}$Yb, $^{142}$Pr, $^{114m}$In, $^{111}$In, and the like. In some embodiments, the chelator is a chelator from Table 2 and the conjugated radioisotope is a radioisotope indicated in Table 2 as a binder of the chelator.

In some embodiments, the radioisotope chelator is not conjugated to a radioisotope.

In some embodiments, the chelator is: DOTA or a derivative thereof, conjugated with $^{177}$Lu, $^{111}$In $^{213}$Bi, $^{68}$Ga, $^{67}$Ga, $^{203}$Pb, $^{212}$Pb, $^{44}$Sc, $^{47}$Sc, $^{90}$Y, $^{86}$Y, $^{225}$Ac, $^{117m}$Sn, $^{153}$Sm, $^{149}$Tb, $^{161}$Tb, $^{165}$Er, $^{213}$Bi, $^{224}$Ra, $^{212}$Bi, $^{212}$Pb, $^{227}$Th, $^{223}$Ra, $^{64}$Cu or $^{67}$Cu, H2-MACROPA conjugated with $^{225}$Ac; Me-3, 2-HOPO conjugated with $^{227}$Th; H$_4$py4pa conjugated with $^{225}$Ac, $^{227}$Th or $^{177}$Lu; H$_4$pypa conjugated with $^{177}$Lu; NODAGA conjugated with $^{68}$Ga; DTPA conjugated with $^{111}$In; or DFO conjugated with $^{89}$Zr.

In some embodiments, the chelator is TETA (1,4,8,11-tetraazacyclotetradecane-1,4,8,11-tetraacetic acid), SarAr (1-N-(4-Aminobenzyl)-3,6,10,13,16,19-hexaazabicyclo [6.6.6]-eicosane-1,8-diamine), NOTA (1,4,7-triazacyclo-nonane-1,4,7-triacetic acid), TRAP (1,4,7-triazacyclo-nonane-1,4,7-tris[methyl(2-carboxyethyl)phosphinic acid), HBED (N,N0-bis(2-hydroxybenzyl)-ethylenediamine-N, N0-diacetic acid), 2,3-HOPO (3-hydroxypyridin-2-one), PCTA (3,6,9,15-tetraazabicyclo[9.3.1]-pentadeca-1 (15), 11,13-triene-3,6,9,-triacetic acid), DFO (desferrioxamine), DTPA (diethylenetriaminepentaacetic acid), OCTAPA (N,N0-bis(6-carboxy-2-pyridylmethyl)-ethylenediamine-N, N0-diacetic acid) or another picolinic acid derivative.

In some embodiments, $R^X$ is a chelator for radiolabelling with $^{99m}$Tc, $^{94m}$Tc, $^{186}$Re, or $^{188}$Re, such as mercaptoacetyl, hydrazinonicotinamide, dimercaptosuccinic acid, 1,2-ethyl-enediylbis-L-cysteine diethyl ester, methylenediphospho-nate, hexamethylpropyleneamineoxime and hexakis (methoxy isobutyl isonitrile, and the like. In some embodiments, $R^X$ is a chelator, wherein the chelator is mercaptoacetyl, hydrazinonicotinamide, dimercaptosuccinic acid, 1,2-ethylenediylbis-L-cysteine diethyl ester, methyl-enediphosphonate, hexamethylpropyleneamineoxime or hexakis(methoxy isobutyl isonitrile). In some of these embodiments, the chelator is bound by a radioisotope. In some such embodiments, the radioisotope is $^{99m}$Tc, $^{94m}$Tc, $^{186}$Re, or $^{188}$Re.

In some embodiments, $R^X$ is a chelator that can bind $^{18}$F-aluminum fluoride ([$^{18}$F]AlF), such as 1,4,7-triazacyc-lononane-1,4-diacetate (NODA) and the like. In some embodiments, the chelator is NODA. In some embodiments, the chelator is bound by [$^{18}$F]AlF.

In some embodiments, $R^X$ is a chelator that can bind $^{72}$As or $^{77}$As, such as a trithiol chelate and the like. In some embodiments, the chelator is a trithiol chelate. In some embodiments, the chelator is conjugated to $^{72}$As. In some embodiments, the chelator is conjugated to $^{77}$As.

In some embodiments, $R^X$ comprises an aryl substituted with a radioisotope. In some embodiments, $R^X$ is wherein A, B, C, D and E are independently C or N, and $R^{15}$ is a radiohalogen. In some embodiments, $R^X$ is In some embodiments, $R^X$ is In some embodiments, $R^X$ is In some embodiments, $R^X$ is In some embodiments, $R^X$ is In some embodiments, $R^X$ is In some embodiments, $R^X$ is

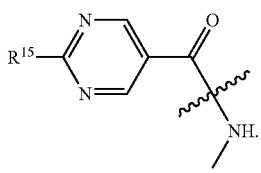

In some embodiments, $R^X$ is

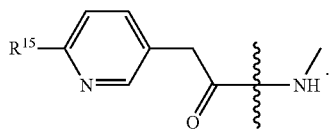

In some of these embodiments, $R^{15}$ is independently $^{211}$At, $^{131}$I, $^{124}$I, $^{123}$I, $^{77}$Br or $^{18}$F. In some of these embodiments, $R^{15}$ is $^{18}$F. In some embodiments, the radioisotope (e.g. $R^{15}$) is $^{131}$I.

In some embodiments, $R^X$ is a prosthetic group containing a trifluoroborate ($BF_3$), capable of $^{18}F/^{19}F$ exchange radiolabeling. The prosthetic group may be $R^{16}R^{17}BF_3$, wherein $R^{16}$ is independently

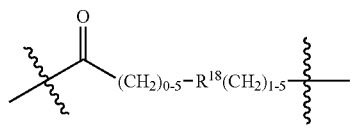

and $R^{18}$ is absent,

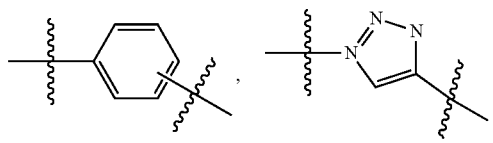

or

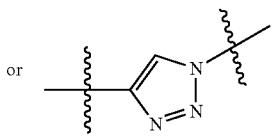

The group —$R^{17}BF_3$ may independently be selected from one or a combination of those listed in Table 3 (below), Table 4 (below), or

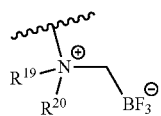

wherein $R^{19}$ and $R^{20}$ are independently $C_1$-$C_5$ linear or branched alkyl groups. For Tables 3 and 4, the R in the pyridine substituted with —OR, —SR, —NR—, —NHR or —NR$_2$ groups is $C_1$-$C_5$ branched or linear alkyl. In some embodiments, —$R^{17}BF_3$ is selected from those listed in Table 3. In some embodiments, —$R^{17}BF_3$ is independently selected from one or a combination of those listed in Table 4. In some embodiments, one fluorine is $^{18}$F. In some embodiments, all three fluorines are $^{19}$F.

TABLE 3

Exemplary $R^{17}BF_3$ groups.

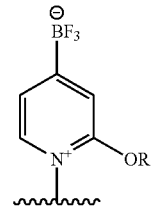

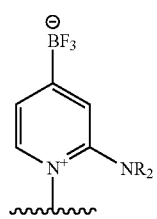

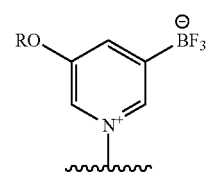

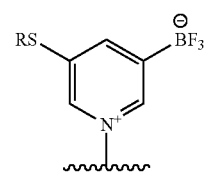

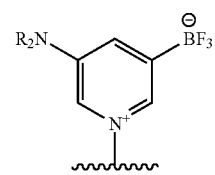

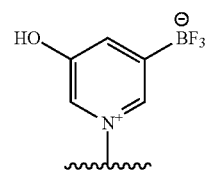

TABLE 3-continued
Exemplary R$^{17}$BF$_3$ groups.
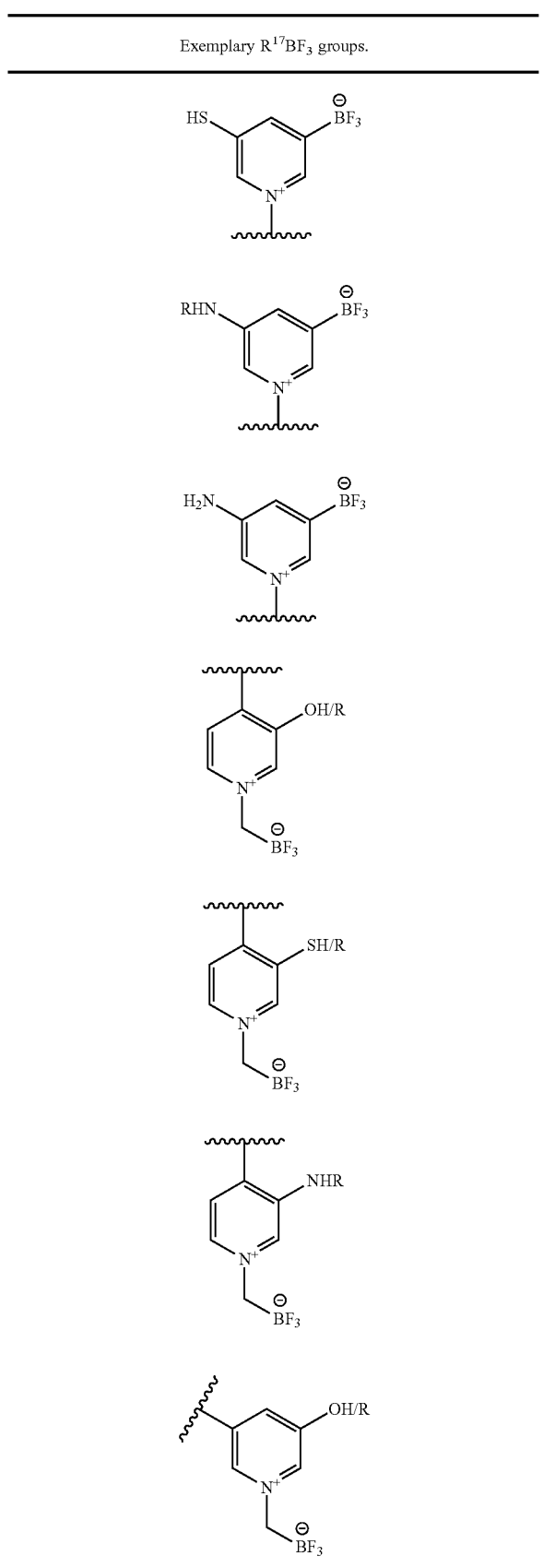
TABLE 3-continued
Exemplary R$^{17}$BF$_3$ groups.
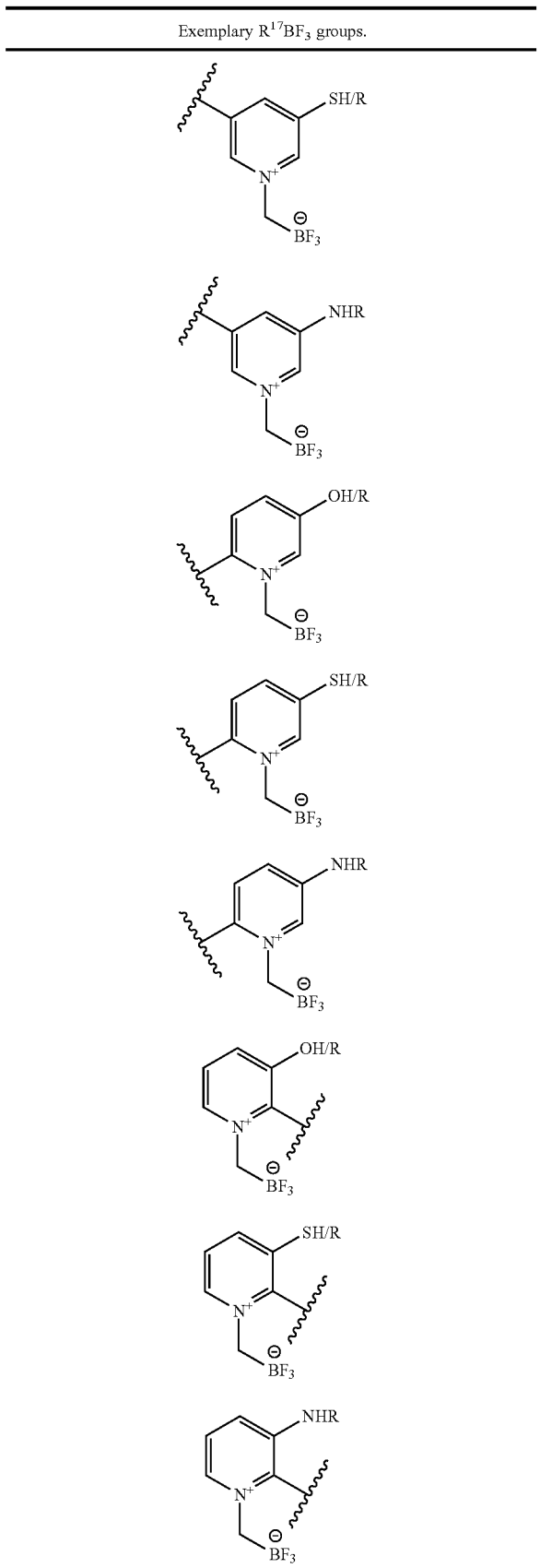

TABLE 3-continued
Exemplary $R^{17}BF_3$ groups.
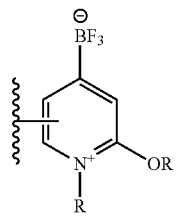
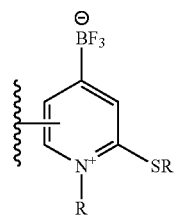
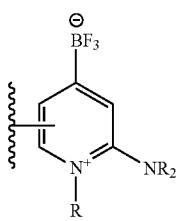
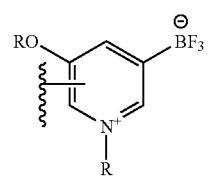
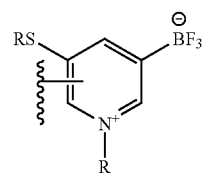
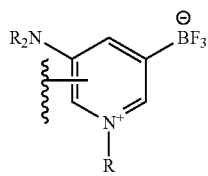
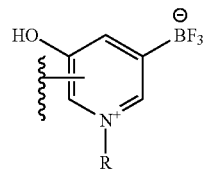
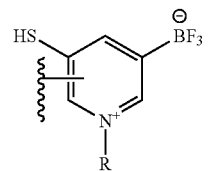
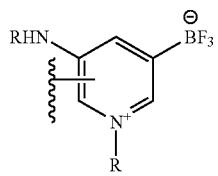
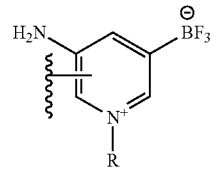
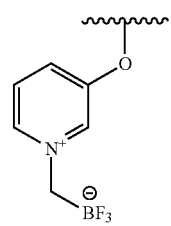
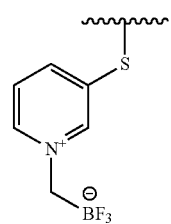
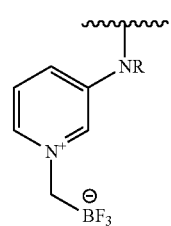
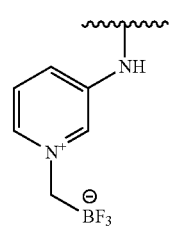
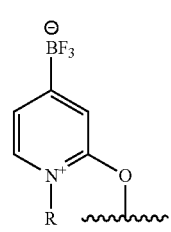

TABLE 3-continued
Exemplary $R^{17}BF_3$ groups.
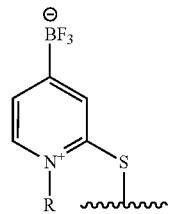
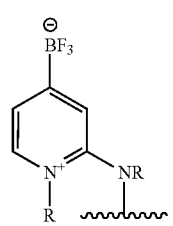
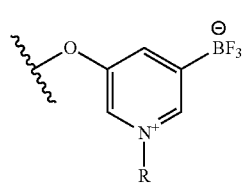
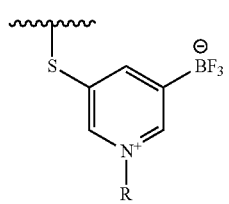
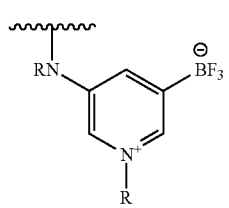
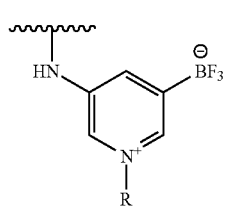
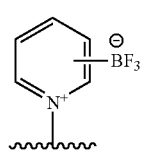
TABLE 4
Exemplary $R^{17}BF_3$ groups.
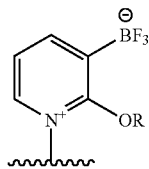
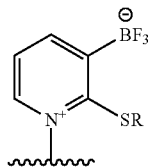
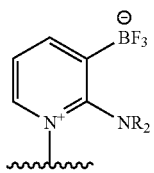
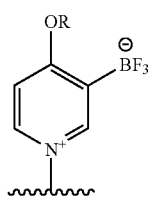
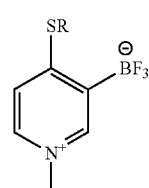
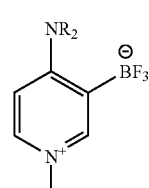
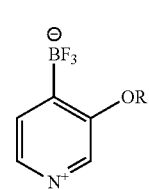
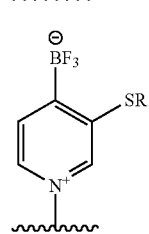

TABLE 4-continued
Exemplary R[17]BF₃ groups.
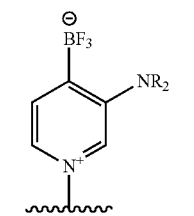
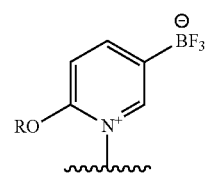
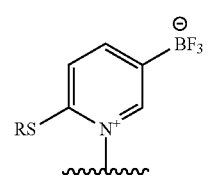
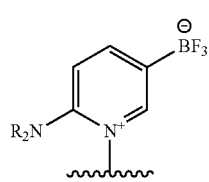
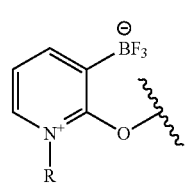
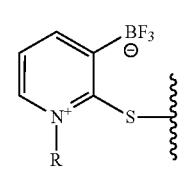
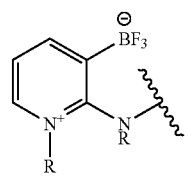
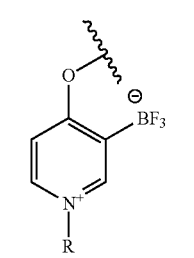
TABLE 4-continued
Exemplary R[17]BF₃ groups.
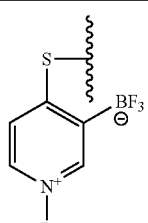
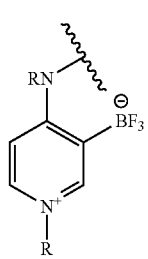
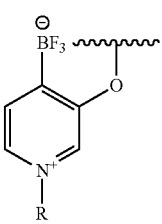
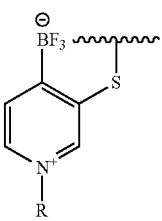
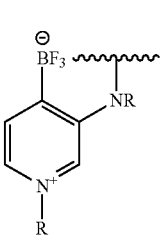
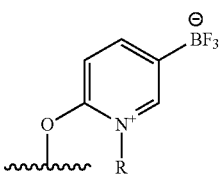
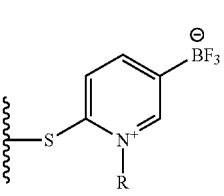

TABLE 4-continued
Exemplary R^17BF_3 groups.
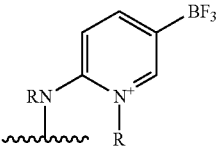
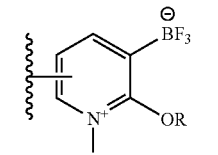
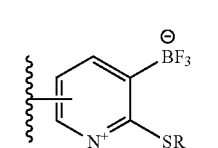
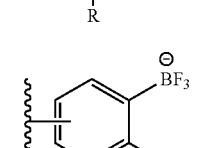
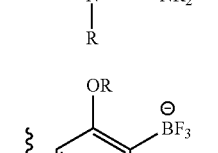
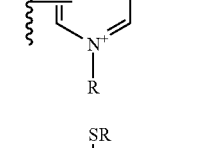
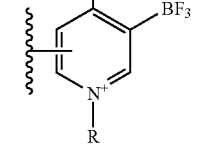
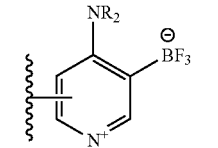
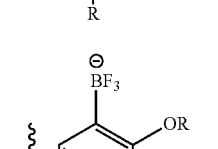
TABLE 4-continued
Exemplary R^17BF_3 groups.
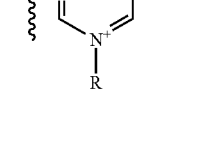
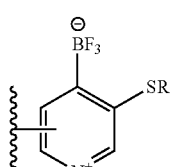
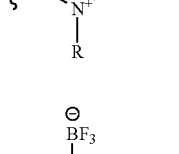
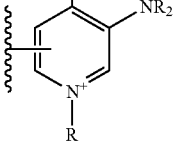
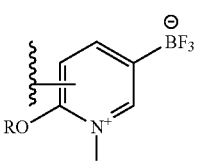
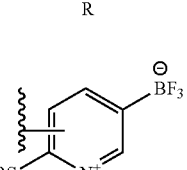
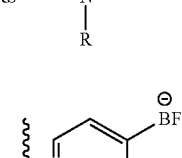

TABLE 4-continued
Exemplary $R^{17}BF_3$ groups.
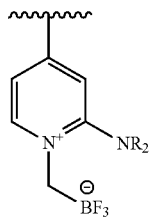
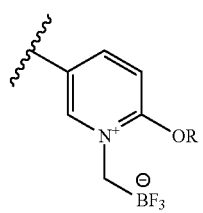
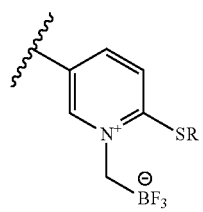
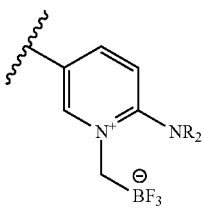
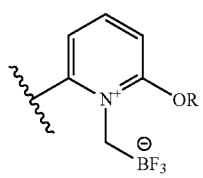
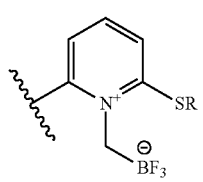
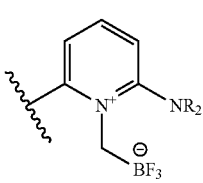
TABLE 4-continued
Exemplary $R^{17}BF_3$ groups.
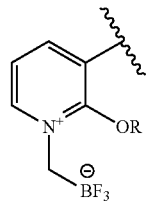
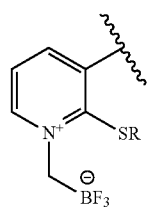
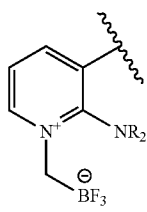
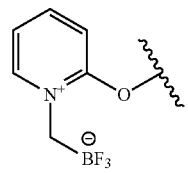
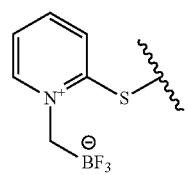
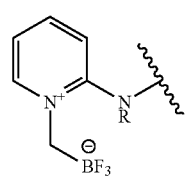
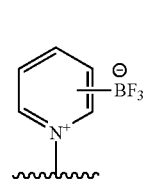

In some embodiments, $R^{17}BF_3$ may form
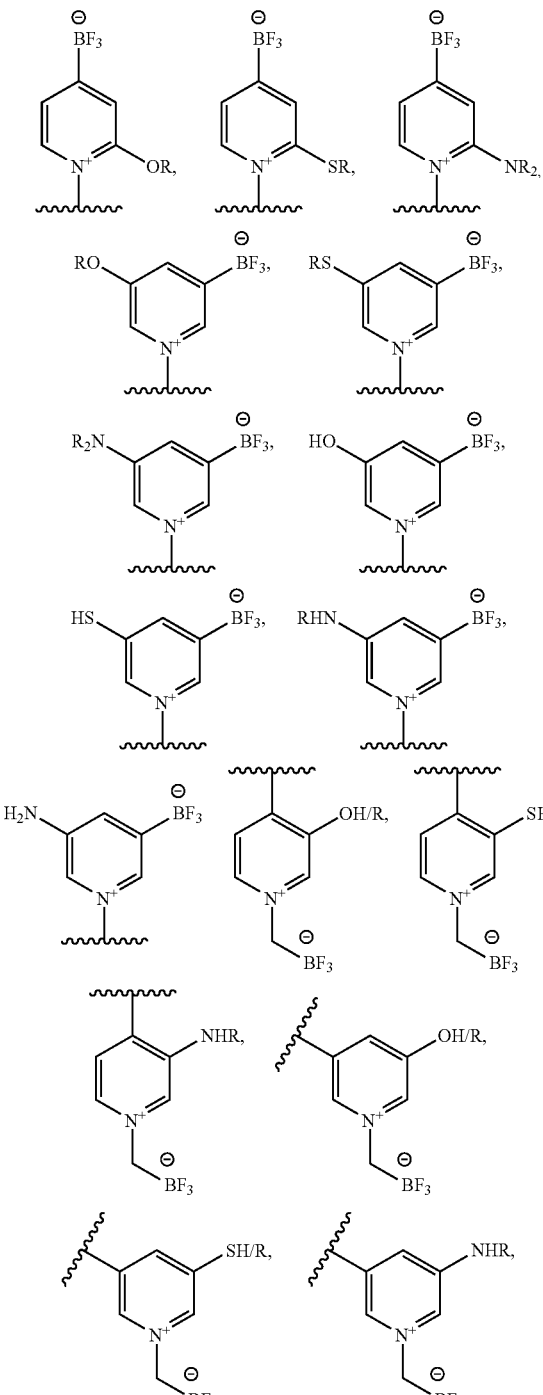
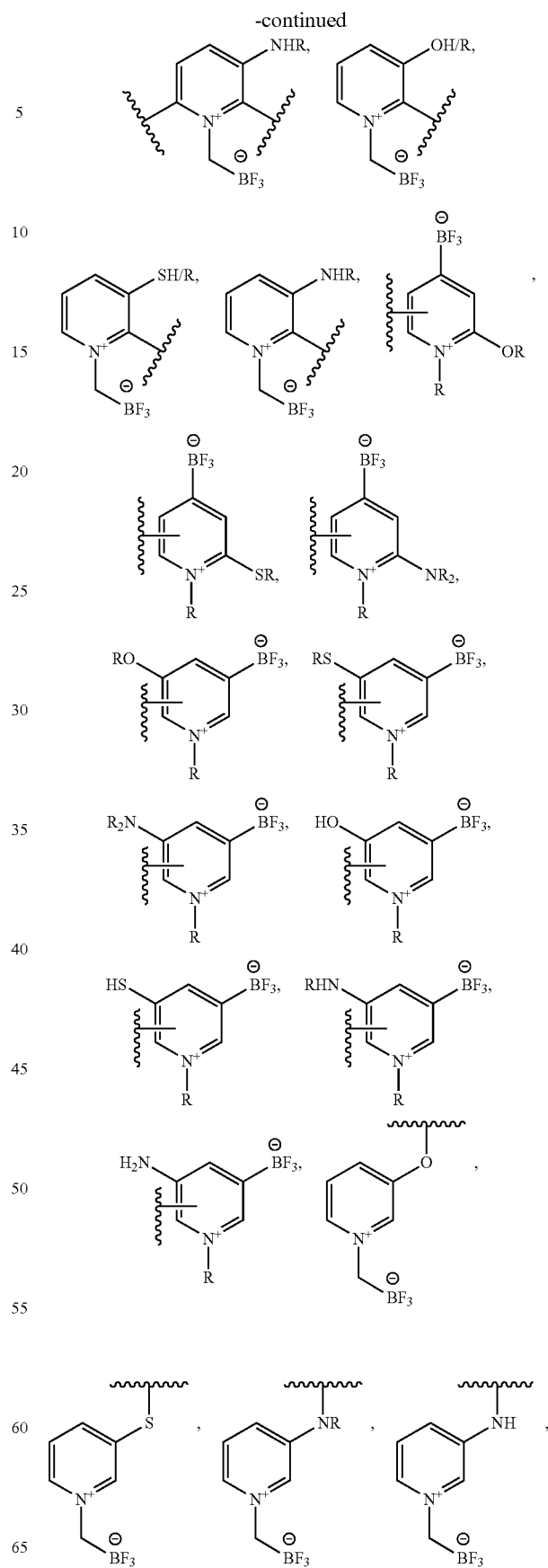

-continued

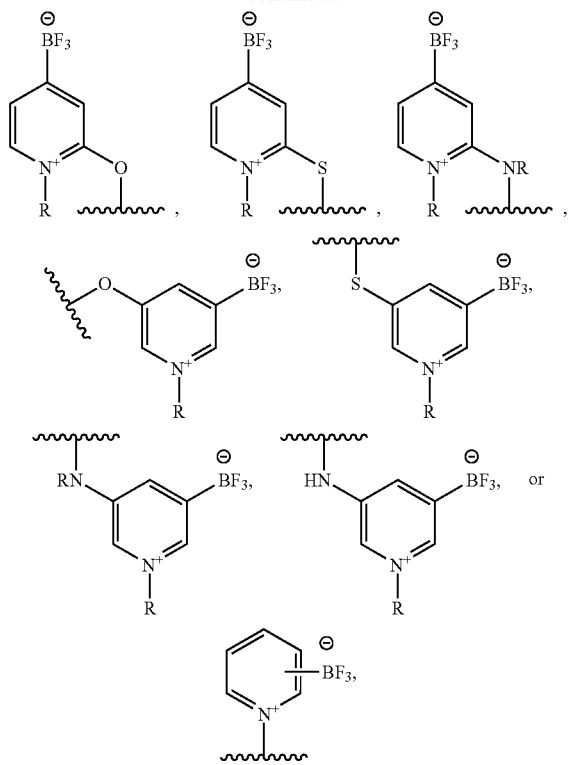

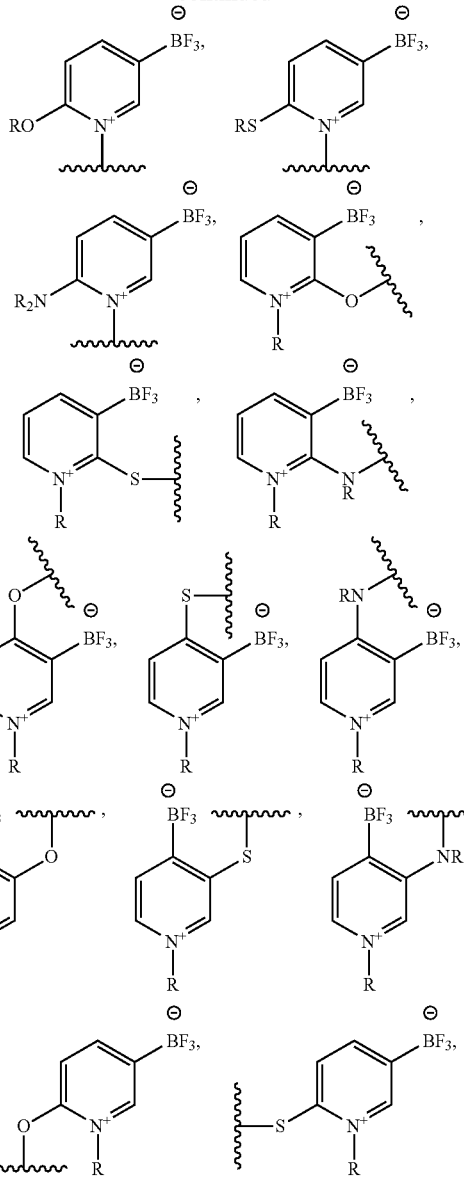

in which the R (when present) in the pyridine substituted —OR, —SR, —NR—, —NHR or —NR$_2$ is a branched or linear $C_1$-$C_5$ alkyl. In some embodiments, R is a branched or linear $C_1$-$C_5$ saturated alkyl. In some embodiments, R is methyl. In some embodiments, R is ethyl. In some embodiments, R is propyl. In some embodiments, R is isopropyl, In some embodiments, R is n-butyl. In some embodiments, one fluorine is $^{18}$F. In some embodiments, all three fluorines are $^{19}$F.

In some embodiments, R$^{17}$BF$_3$ may form

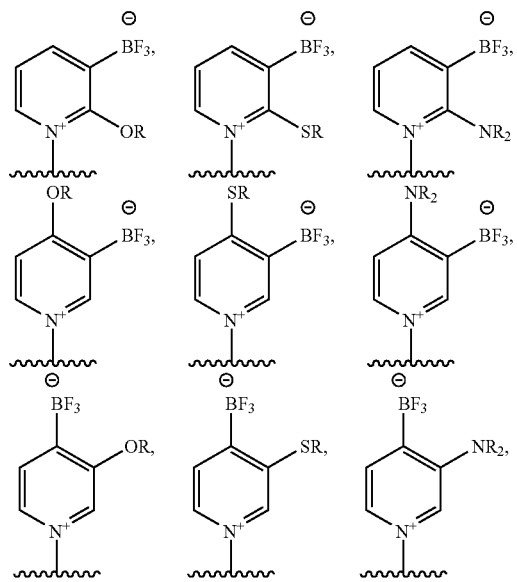

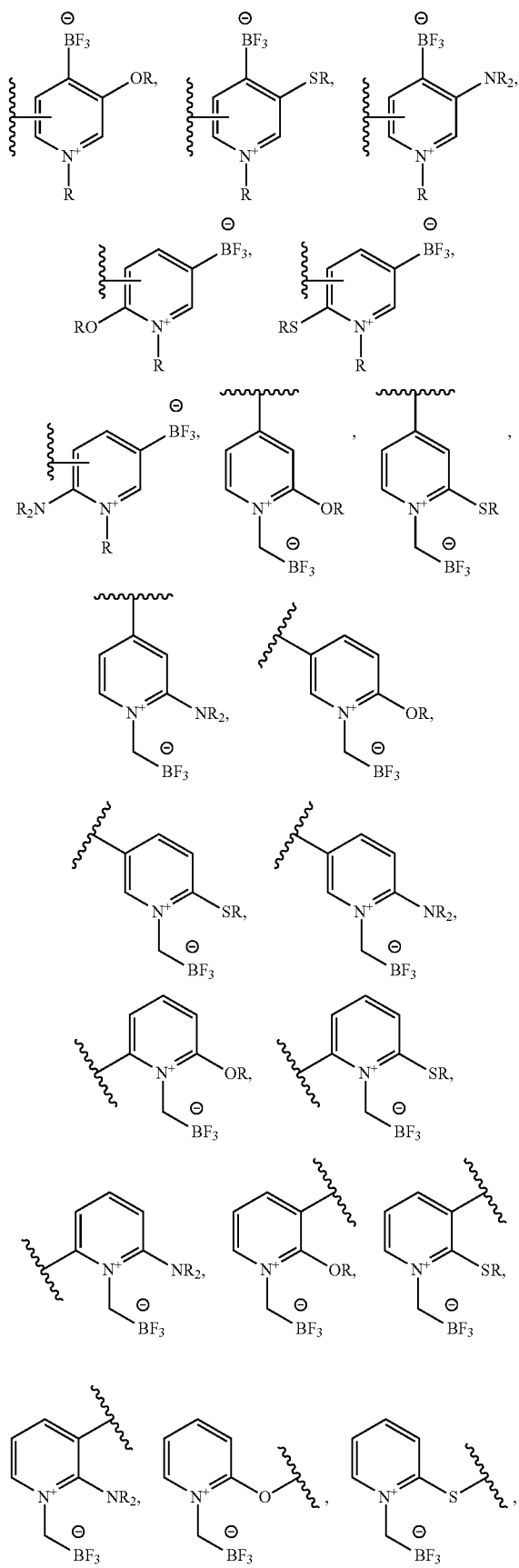

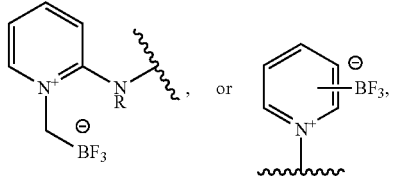

in which the R (when present) in the pyridine substituted —OR, —SR, —NR— or —NR$_2$ is branched or linear C$_1$-C$_5$ alkyl. In some embodiments, R is a branched or linear C$_1$-C$_5$ saturated alkyl. In some embodiments, R is methyl. In some embodiments, R is ethyl. In some embodiments, R is propyl. In some embodiments, R is isopropyl, In some embodiments, R is n-butyl. In some embodiments, —R$^{17}$BF$_3$ is

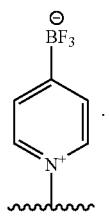

In some embodiments, one fluorine is $^{18}$F. In some embodiments, all three fluorines are $^{19}$F.

In some embodiments, —R$^{17}$BF$_3$ is

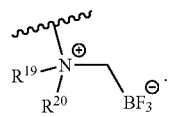

In some embodiments, R$^{19}$ is methyl. In some embodiments, R$^{19}$ is ethyl. In some embodiments, R$^{19}$ is propyl. In some embodiments, R$^{19}$ is isopropyl. In some embodiments, R$^{19}$ is butyl. In some embodiments, R$^{19}$ is n-butyl. In some embodiments, R$^{19}$ is pentyl. In some embodiments, R$^{20}$ is methyl. In some embodiments, R$^{20}$ is ethyl. In some embodiments, R$^{20}$ is propyl. In some embodiments, R$^{20}$ is isopropyl. In some embodiments, R$^{20}$ is butyl. In some embodiments, R$^{20}$ is n-butyl. In some embodiments, R$^{20}$ is pentyl. In some embodiments, R$^{19}$ and R$^{20}$ are both methyl. In some embodiments, one fluorine is $^{18}$F. In some embodiments, all three fluorines are $^{19}$F.

In some embodiments, R$^X$ is a prosthetic group containing a silicon-fluorine-acceptor moiety. In some embodiments, the fluorine of the silicon-fluorine acceptor moiety is $^{18}$F. The prosthetic groups containing a silicon-fluorine-acceptor moiety may be independently selected from one or a combination of the following:

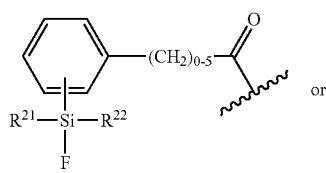

-continued

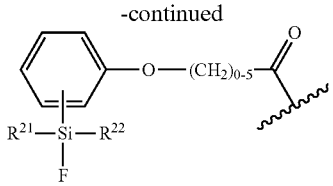

wherein $R^{21}$ and $R^{22}$ are independently a linear or branched, cyclic or acyclic, and/or aromatic or non-aromatic $C_1$-$C_{10}$ alkyl, alkenyl or alkynyl group. In some embodiments, $R^{21}$ and $R^{22}$ are independently selected from the group consisting of phenyl, tert-butyl, sec-propyl or methyl. In some embodiments, the prosthetic group is

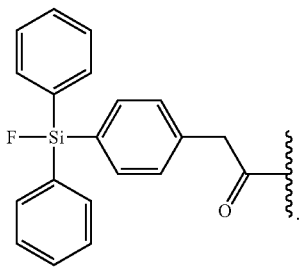 [SMILES: *C(=O)Cc1ccc([Si](F)(c2ccccc2)c2ccccc2)cc1]

In some embodiments, the prosthetic group is

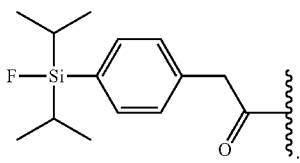 [SMILES: *C(=O)Cc1ccc([Si](F)(C(C)C)C(C)C)cc1]

In some embodiments, the prosthetic group is

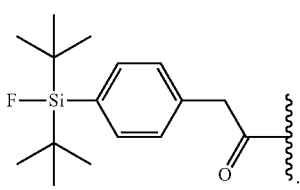 [SMILES: *C(=O)Cc1ccc([Si](F)(C(C)(C)C)C(C)(C)C)cc1]

In some embodiments, the prosthetic group is

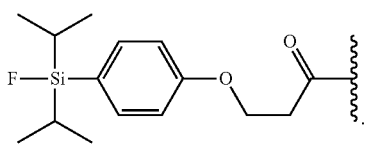 [SMILES: *C(=O)CCOc1ccc([Si](F)(C(C)C)C(C)C)cc1]

In certain embodiments, the compound is conjugated with a radioisotope for positron emission tomography (PET) or single photon emission computed tomography (SPECT) imaging of PSMA expressing tumors, wherein the compound is conjugated with a radioisotope that is a positron emitter or a gamma emitter. Without limitation, the positron or gamma emitting radioisotope may be $^{68}$Ge, $^{67}$Ga, $^{61}$Cu, $^{64}$Cu, $^{67}$Ga, $^{99m}$Tc, $^{110m}$In, $^{111}$In, $^{44}$Sc, $^{86}$Y, $^{89}$Zr, $^{90}$Nb, $^{18}$F, $^{131}$I, $^{123}$I, $^{124}$I or $^{72}$As.

When the radioisotope (e.g. X) is a diagnostic radioisotope, there is disclosed use of certain embodiments of the compound for preparation of a radiolabelled tracer for imaging PSMA-expressing tissues in a subject. There is also disclosed a method of imaging PSMA-expressing tissues in a subject, in which the method comprises: administering to the subject a composition comprising certain embodiments of the compound and a pharmaceutically acceptable excipient; and imaging tissue of the subject, e.g. using positron emission tomography (PET). When the tissue is a diseased tissue (e.g. a PSMA-expressing cancer), PSMA-targeted treatment may then be selected for treating the subject. There is therefore disclosed the use of certain compounds of the invention in imaging a PSMA-expressing cancer in a subject, wherein $R^X$ comprises or is complexed with a diagnostic or imaging radioisotope. In some embodiments, the subject is human.

In certain embodiments the compound is conjugated with a radioisotope that is used for therapy of PSMA-expressing cancer. This includes radioisotopes such as $^{165}$Er, $^{212}$Bi, $^{211}$At, $^{166}$Ho, $^{149}$Pm, $^{159}$Gd, $^{105}$Rh, $^{109}$Pd, $^{198}$Au, $^{199}$Au, $^{175}$Yb, $^{142}$Pr, 177Lu (β-emitter, $t_{2/1}$=6.65 d), $^{111}$In, $^{213}$Bi, $^{203}$Pb, $^{212}$Pb, $^{47}$Sc, $^{90}$Y (β-emitter, $t_{2/1}$=2.66 d), $^{225}$Ac, $^{117m}$Sn, $^{153}$Sm, $^{149}$Tb, $^{161}$Tb, $^{165}$Er, $^{213}$Bi, $^{224}$Ra, $^{212}$Bi, $^{212}$Pb, $^{225}$Ac (α-emitter, $t_{2/1}$=9.95 d), $^{227}$Th, $^{223}$Ra, $^{77}$As, $^{131}$I, $^{64}$Cu or $^{67}$Cu.

When the radioisotope (e.g. X) is a therapeutic radioisotope, there is disclosed use of certain embodiments of the compound (or a pharmaceutical composition thereof) for the treatment of PSMA-expressing diseases (e.g. cancer) in a subject. Accordingly, there is provided use of the compound in preparation of a medicament for treating PSMA-expressing disease in a subject. There is also provided a method of treating PSMA-expressing disease in a subject, in which the method comprises: administering to the subject a composition comprising the compound and a pharmaceutically acceptable excipient. For example, but without limitation, the disease may be a PSMA-expressing cancer. There is therefore disclosed the use of certain compounds of the invention for treating a PSMA-expressing cancer in a subject, wherein $R^X$ comprises or is complexed with a therapeutic radioisotope. In some embodiments, the subject is human.

PSMA expression has been detected in various cancers (e.g. Rowe et al., 2015, *Annals of Nuclear Medicine* 29:877-882; Sathekge et al., 2015, *Eur J Nucl Med Mol Imaging* 42:1482-1483; Verburg et al., 2015, *Eur J Nucl Med Mol Imaging* 42:1622-1623; and Pyka et al., J Nucl Med Nov. 19, 2015 jnumed.115.164442). Accordingly, without limitation, the PSMA-expressing cancer may be prostate cancer, renal cancer, breast cancer, thyroid cancer, gastric cancer, colorectal cancer, bladder cancer, pancreatic cancer, lung cancer, liver cancer, brain tumor, melanoma, neuroendocrine tumor, ovarian cancer or sarcoma. In some embodiments, the cancer is prostate cancer.

The compound may be HTK03026, HTK03027, HTK03029, HTK03041, (each shown in FIG. 1) or a salt or solvate thereof, optionally conjugated with a radiometal. In some embodiments, the DOTA chelator in these compounds is replaced by an alternative polyaminocarboxylate chelator. In some embodiments, the alternative chelator is selected from derivatives of DOTA, TETA, SarAr, NOTA, TRAP, HBED, 2,3-HOPO, PCTA, DFO, DTPA, OCTAPA or H2-MACROPA. In some embodiments, a radiometal is not conjugated in the chelator. In some embodiments, a radiometal is conjugated to the chelator. In some embodiments, the radiometal is $^{64}$Cu, $^{68}$Ga, $^{86}$Y, $^{111}$In, $^{94m}$Tc, $^{44}$Sc, $^{89}$Zr, $^{99m}$Tc. In some embodiments, the radiometal is $^{64}$Cu, $^{67}$Cu, $^{90}$Y, $^{111}$In, $^{114m}$In, $^{117m}$Sn, $^{153}$Sm, $^{149}$Tb, $^{161}$Tb, $^{177}$Lu, $^{225}$Ac, $^{213}$Bi, $^{224}$Ra, $^{212}$Bi, $^{212}$Pb, $^{225}$Ac, $^{227}$Th, 223Ra, $^{47}$Sc, $^{186}$Re, or $^{188}$Re. In some embodiments, the radiometal is $^{177}$Lu. In some embodiments, the compound is $^{177}$Lu-HTK03041 or a salt or solvate thereof. In some embodiments, the chelator in these compounds is replaced with a group that incorporates a radio-halogen (e.g. $^{131}$I). Such halogens can be incorporated via an electrophilic substitution reaction rather than complexation via the chelator portion of the compound. Compounds comprising $^{131}$I, $^{90}$Y, $^{177}$Lu and $^{225}$Ac (e.g. $^{177}$Lu-HTK03041) may be useful for radiotherapy of cancer (e.g. prostate cancer and other diseases/disorders characterized by PSMA expression). The compounds presented herein incorporate peptides, which may be synthesized by any of a variety of methods established in the art. This includes but is not limited to liquid-phase as well as solid-phase peptide synthesis using methods employing 9-fluorenylmethoxycarbonyl (Fmoc) and/or t-butyloxycarbonyl (Boc) chemistries, and/or other synthetic approaches.

Solid-phase peptide synthesis methods and technology are well-established in the art. For example, peptides may be synthesized by sequential incorporation of the amino acid residues of interest one at a time. In such methods, peptide synthesis is typically initiated by attaching the C-terminal amino acid of the peptide of interest to a suitable resin. Prior to this, reactive side chain and alpha amino groups of the amino acids are protected from reaction by suitable protecting groups, allowing only the alpha carboxyl group to react with a functional group such as an amine group, a hydroxyl group, or an alkyl halide group on the solid support. Following coupling of the C-terminal amino acid to the support, the protecting group on the side chain and/or the alpha amino group of the amino acid is selectively removed, allowing the coupling of the next amino acid of interest. This process is repeated until the desired peptide is fully synthesized, at which point the peptide can be cleaved from the support and purified. A non-limiting example of an instrument for solid-phase peptide synthesis is the Aapptec Endeavor 90 peptide synthesizer.

To allow coupling of additional amino acids, Fmoc protecting groups may be removed from the amino acid on the solid support, e.g. under mild basic conditions, such as piperidine (20-50% v/v) in DMF. The amino acid to be added must also have been activated for coupling (e.g. at the alpha carboxylate). Non-limiting examples of activating reagents include without limitation 2-(1H-benzotriazol-1-yl)-1,1,3,3-tetramethyluronium hexafluorophosphate (HBTU), 2-(1H-benzotriazol-1-yl)-1,1,3,3-tetramethyluronium tetrafluoroborate (TBTU), 2-(7-Aza-1H-benzotriazole-1-yl)-1,1,3,3-tetramethyluronium hexafluorophosphate (HATU), benzotriazole-1-yl-oxy-tris(dimethylamino)phosphoniumhexafluorophosphate (BOP), benzotriazole-1-yl-oxy-tris(pyrrolidino)phosphoniumhexafluorophosphate (PyBOP). Racemization is minimized by using triazoles, such as 1-hydroxy-benzotriazole (HOBt) and 1-hydroxy-7-azabenzotriazole (HOAt). Coupling may be performed in the presence of a suitable base, such as N,N-diisopropylethylamine (DIPEA/DIEA) and the like. For long peptides or if desired, peptide synthesis and ligation may be used.

Apart from forming typical peptide bonds to elongate a peptide, peptides may be elongated in a branched fashion by attaching to side chain functional groups (e.g. carboxylic acid groups or amino groups), either: side chain to side chain; or side chain to backbone amino or carboxylate. Coupling to amino acid side chains may be performed by any known method, and may be performed on-resin or off-resin. Non-limiting examples include: forming an amide between an amino acid side chain containing a carboxyl group (e.g. Asp, D-Asp, Glu, D-Glu, Aad, and the like) and an amino acid side chain containing an amino group (e.g. Lys, D-Lys, Orn, D-Orn, Dab, D-Dab, Dap, D-Dap, and the like) or the peptide N-terminus; forming an amide between an amino acid side chain containing an amino group (e.g. Lys, D-Lys, Orn, D-Orn, Dab, D-Dab, Dap, D-Dap, and the like) and either an amino acid side chain containing a carboxyl group (e.g. Asp, D-Asp, Glu, D-Glu, and the like) or the peptide C-terminus; and forming a 1, 2, 3-triazole via click chemistry between an amino acid side chain containing an azide group (e.g. Lys(N$_3$), D-Lys(N$_3$), and the like) and an alkyne group (e.g. Pra, D-Pra, and the like). The protecting groups on the appropriate functional groups must be selectively removed before amide bond formation, whereas the reaction between an alkyne and an azido groups via the click reaction to form an 1,2,3-triazole does not require selective deprotection. Non-limiting examples of selectively removable protecting groups include 2-phenylisopropyl esters (O-2-PhiPr) (e.g. on Asp/Glu) as well as 4-methyltrityl (Mtt), allyloxycarbonyl (alloc), 1-(4,4-dimethyl-2,6-dioxocyclohex-1-ylidene))ethyl (Dde), and 1-(4,4-dimethyl-2,6-dioxocyclohex-1-ylidene)-3-methylbutyl (ivDde) (e.g. on Lys/Orn/Dab/Dap). O-2-PhiPr and Mtt protecting groups can be selectively deprotected under mild acidic conditions, such as 2.5% trifluoroacetic acid (TFA) in DCM. Alloc protecting groups can be selectively deprotected using tetrakis(triphenylphosphine)palladium(0) and phenyl silane in DCM. Dde and ivDde protecting groups can be selectively deprotected using 2-5% of hydrazine in DMF. Deprotected side chains of Asp/Glu (L- or D-forms) and Lys/Orn/Dab/Dap (L- or D-forms) can then be coupled, e.g. by using the coupling reaction conditions described above.

Peptide backbone amides may be N-methylated (i.e. alpha amino methylated). This may be achieved by directly using Fmoc-N-methylated amino acids during peptide synthesis. Alternatively, N-methylation under Mitsunobu conditions may be performed. First, a free primary amine group is protected using a solution of 4-nitrobenzenesulfonyl chloride (Ns-Cl) and 2,4,6-trimethylpyridine (collidine) in NMP. N-methylation may then be achieved in the presence of triphenylphosphine, diisopropyl azodicarboxylate (DIAD) and methanol. Subsequently, N-deprotection may be performed using mercaptoethanol and 1,8-diazabicyclo[5.4.0]undec-7-ene (DBU) in NMP. For coupling protected amino acids to N-methylated alpha amino groups, HATU, HOAt and DIEA may be used.

The PSMA-binding moiety (e.g. Lys-ureido-Glu, and the like) may be constructed on solid phase via the formation of a ureido linkage between the amino groups of two amino acids. This can be done by attaching an Fmoc-protecting amino acid (for example Fmoc-Lys(ivDde)-OH) to Wang resin using standard activation/coupling strategy (for example, Fmoc-protected amino acid (4 eq.), HATU (4 eq.) and N,N-diisopropylethylamine (7 eq.) in N,N-dimethylformamide). The Fmoc-protecting group is then removed by 20% piperidine in N,N-dimethylformamide. To form the ureido linkage, the freed amino group of the solid-phase-attached amino acid is reacted with the 2$^{nd}$ amino acid which has its carboxylate group protected with a t-butyl group and its amino group activated and converted to an isocyanate group (—N=C=O). The activation and conversion of an amino group to an isocyanate group can be achieved by reacting the amino group with phosgene or triphosgene. After the formation of the ureido linkage, the side chain functional group of the amino acid (for example ivDde on Lys) can be removed, and then the linker, albumin-binding motif, and/or radiolabeling group (e.g. radiometal chelator and the like) can be subsequently coupled to the PSMA-binding moiety.

The formation of the thioether (—S—) and ether (—O—) linkages (e.g. for $R^3$) can be achieved either on solid phase or in solution phase. For example, the formation of thioether (—S—) linkage can be achieved by coupling between a thiol-containing compound (such as the thiol group on cysteine side chain) and an alkyl halide (such as 3-(Fmoc-amino)propyl bromide and the like) in an appropriate solvent (such as N,N-dimethylformamide and the like) in the presence of base (such as N,N-diisopropylethylamine and the like). The formation of an ether (—O—) linkage can be achieved via the Mitsunobu reaction between an alcohol (such as the hydroxyl group on the side chain of serine or threonine, for example) and a phenol group (such as the side chain of tyrosine, for example) in the presence of triphenylphosphine and diisopropyl azidicarboxylate (DIAD) in an aprotic solvent (such as 1,4-dioxane and the like). If the reactions are carried out in solution phase, the reactants used are preferably in equivalent molar ratio (1 to 1), and the desired products can be purified by flash column chromatography or high performance liquid chromatography (HPLC). If the reactions are carried out on solid phase, meaning one reactant has been attached to a solid phase, then the other reactant is normally used in excess amount (≥3 equivalents of the reactant attached to the solid phase). After the reactions, the excess unreacted reactant and reagents can be removed by sequentially washing the solid phase (resin) using a combination of solvents, such as N,N-dimethylformamide, methanol and dichloromethane, for example.

Non-peptide moieties (e.g. radiolabeling groups, albumin-binding groups and/or linkers) may be coupled to the peptide N-terminus while the peptide is attached to the solid support. This is facile when the non-peptide moiety comprises an activated carboxylate (and protected groups if necessary) so that coupling can be performed on resin. For example, but without limitation, a bifunctional chelator, such as 1,4,7,10-tetraazacyclododecane-1,4,7,10-tetraacetic acid (DOTA) tris(tert-butyl ester) may be activated in the presence of N-hydroxysuccinimide (NHS) and N,N'-dicyclohexylcarbodiimide (DCC) for coupling to a peptide. Alternatively, a non-peptide moiety may be incorporated into the compound via a copper-catalyzed click reaction under either liquid or solid phase conditions. Copper-catalyzed click reactions are well established in the art. For example, 2-azidoacetic acid is first activated by NHS and DCC and coupled to a peptide. Then, an alkyne-containing non-peptide moeity may be clicked to the azide-containing peptide in the presence of $Cu^{2+}$ and sodium ascorbate in water and organic solvent, such as acetonitrile (ACN) and DMF and the like.

The synthesis of radiometal chelators is well-known and many chelators are commercially available (e.g. from Sigma-Aldrich™/Milipore Sigma™ and others). Protocols for conjugation of radiometals to the chelators are also well known (e.g. see Example 1, below). The synthesis of the silicon-fluoride-acceptor moieties can be achieved following previously reported procedures (e.g. Bernard-Gauthier et al. *Biomed Res Int.* 2014 2014:454503; Kostikov et al. *Nature Protocols* 2012 7:1956-1963; Kostikov et al. *Bioconjug Chem.* 2012 18:23:106-114; each of which is incorporated by reference in its entirety). The synthesis or acquisition of radioisotope-substituted aryl groups is likewise facile.

The synthesis of the $R^{16}R^{17}BF_3$ component on the PSMA-targeting compounds can be achieved following previously reported procedures (e.g.: Liu et al. *Angew Chem Int Ed* 2014 53:11876-11880; Liu et al. *J Nucl Med* 2015 55:1499-1505; Liu et al. *Nat Protoc* 2015 10:1423-1432; Kuo et al., *J Nucl Med* 2019 60:1160-1166; each of which is incorporated by reference in its entirety). Generally, the $BF_3$-containing motif can be coupled to the linker via click chemistry by forming a 1,2,3-triazole ring between a $BF_3$-containing azido (or alkynyl) group and an alkynyl (or azido) group on the linker, or by forming an amide linkage between a $BF_3$-containing carboxylate and an amino group on the linker. To make the $BF_3$-containing azide, alkyne or carboxylate, a boronic acid ester-containing azide, alkyne or carboxylate is first prepared following by the conversion of the boronic acid ester to $BF_3$ in a mixture of HCl, DMF and $KHF_2$. For alkyl $BF_3$, the boronic acid ester-containing azide, alkyne or carboxylate can be prepared by coupling boronic acid ester-containing alkyl halide (such as iodomethylboronic acid pinacol ester) with an amine-containing azide, alkyne or carboxylate (such as N, N-dimethylpropargylamine). For aryl $BF_3$, the boronic acid ester can be prepared via Suzuki coupling using aryl halide (iodine or bromide) and bis(pinacolato)diboron.

$^{18}$F-Fluorination of the $BF_3$-containing PSMA-targeting compounds via $^{18}$F-$^{19}$F isotope exchange reaction can be achieved following previously published procedures (Liu et al. *Nat Protoc* 2015 10:1423-1432, incorporated by reference in its entirety). Generally, ~100 nmol of the $BF_3$-containing compound is dissolved in a mixture of 15 µl of pyridazine-HCl buffer (pH=2.0-2.5, 1 M), 15 µl of DMF and 1 µl of a 7.5 mM $KHF_2$ aqueous solution. $^{18}$F-Fluoride solution (in saline, 60 µl) is added to the reaction mixture, and the resulting solution is heated at 80° C. for 20 min. At the end of the reaction, the desired product can be purified by solid phase extraction or by reversed high performance liquid chromatography (HPLC) using a mixture of water and acetonitrile as the mobile phase.

When the peptide has been fully synthesized on the solid support, the desired peptide may be cleaved from the solid support using suitable reagents, such as TFA, tri-isopropylsilane (TIS) and water. Side chain protecting groups, such as Boc, pentamethyldihydrobenzofuran-5-sulfonyl (Pbf), trityl (Trt) and tert-butyl (tBu) are simultaneously removed (i.e. deprotection). The crude peptide may be precipitated and collected from the solution by adding cold ether followed by centrifugation. Purification and characterization of the peptides may be performed by standard separation techniques, such as high performance liquid chromatography (HPLC) based on the size, charge and polarity of the peptides. The identity of the purified peptides may be confirmed by mass spectrometry or other similar approaches.

The present invention will be further illustrated in the following examples for the synthesis and evaluation of radiolabeled HTK03026, HTK03027, HTK03029, and HTK03041.

EXAMPLES

Materials and Methods
General Methods
All chemicals and solvents were obtained from commercial sources, and used without further purification. PSMA-targeted peptides were synthesized using solid phase approach on an AAPPTec (Louisville, KY) Endeavor 90 peptide synthesizer. Purification and quality control of cold and radiolabeled peptides were performed on Agilent HPLC systems equipped with a model 1200 quaternary pump, a model 1200 UV absorbance detector (set at 220 nm), and a Bioscan (Washington, DC) NaI scintillation detector. The operation of Agilent HPLC systems was controlled using the Agilent ChemStation software. The HPLC columns used were a semi-preparative column (Luna C18, 5μ, 250×10 mm) and an analytical column (Luna C18, 5μ, 250×4.6 mm) purchased from Phenomenex (Torrance, CA). The HPLC solvents were A: $H_2O$ containing 0.1% TFA, and B: $CH_3CN$ containing 0.1% TFA. The collected HPLC eluates containing the desired peptide were lyophilized using a Labconco (Kansas City, MO) FreeZone 4.5 Plus freeze-drier. Mass analyses were performed using an AB SCI EX (Framingham, MA) 4000 QTRAP mass spectrometer system with an ESI ion source. C18 Sep-Pak cartridges (1 $cm^3$, 50 mg) were obtained from Waters (Milford, MA). $^{68}Ga$ was eluted from an iThemba Labs (Somerset West, South Africa) generator, and was purified according to the previously published procedures using a DGA resin column from Eichrom Technologies LLC (Lisle, IL) (e.g. Lin et al., *Cancer Res.* 2015, 75:387-393). Radioactivity of $^{68}Ga$-labeled peptides was measured using a Capintec (Ramsey, NJ) CRC®-25R/W dose calibrator, and the radioactivity of mouse tissues collected from biodistribution studies were counted using a Perkin Elmer (Waltham, MA) Wizard2 2480 automatic gamma counter.

Synthesis of HTK03026, HTK03027, HTK03029, and HTK03041

Solid-phase synthesis of HTK03026, HTK03027, HTK03029 and HTK03041 (see FIG. 1 for structures) was modified from literature procedures (e.g., see: Benesova et al., *J. Med. Chem.* 2016, 59:1761-1775). Fmoc-Lys(ivDde)-Wang resin (0.3 mmol, 0.61 mmol/g loading) was suspended in DMF for 30 min. Fmoc was then removed by treating the resin with 20% piperidine in DMF (3×8 min). The isocyanate derivative of di-t-butyl ester of glutamate (3 eq.) was prepared according to literature procedures (e.g. Benesova et al., *J. Med. Chem.* 2016, 59:1761-1775), and added to the lysine-immobilized resin and reacted for 16 h. After washing the resin with DMF, the ivDde-protecting group was removed with 2% hydrazine in DMF (5×5 min). Fmoc-2-Aoc-OH (for HTK03026), Fmoc-Ala(2-Anth)-OH (for HTK03027), Fmoc-Ala(1-Pyrenyl)-OH (for HTK03029) or Fmoc-Ala(9-Anth)-OH (for HTK03041) was then coupled to the side chain of Lys using Fmoc-protected amino acid (3 eq.), HBTU (3 eq.), HOBT (3 eq.) and N,N-diisopropylethylamine (8 eq.). Afterwards, elongation was continued with the addition of Fmoc-tranexamic acid, and finally DOTA-tris(t-bu)ester (2-(4,7,10-tris(2-(t-butoxy)-2-oxoehtyl)-1,4,7,10)-tetraazacyclododecan-1-yl)acetic acid).

The peptide was then deprotected and simultaneously cleaved from the resin by treating with 95/5 trifluoroacetic acid (TFA)/triisopropylsilane (TIS) for 2 h at room temperature. After filtration, the peptide was precipitated by the addition of cold diethyl ether to the TFA solution. The crude peptide was purified by HPLC using the semi-preparative column. The eluates containing the desired peptide were collected, pooled, and lyophilized. For HTK03026, the HPLC conditions were 27% acetonitrile in water with 0.1% TFA at a flow rate of 4.5 mL/min. The retention time was 10.7 min. ESI-MS: calculated $[M+H]^+$ for HTK03026 $C_{45}H_{75}N_9O_{16}$ 986.5; found $[M+H]^+$ 986.6. For HTK03027, the HPLC conditions were 32% acetonitrile in water with 0.1% TFA at a flow rate of 4.5 mL/min. The retention time was 7.1 min. ESI-MS: calculated $[M+H]^+$ for HTK03027 $C_{53}H_{74}N_9O_{16}$ 1092.5; found $[M+H]^+$ 1094.6. For HTK03029, the HPLC conditions were 33% acetonitrile in water with 0.1% TFA at a flow rate of 4.5 mL/min. The retention time was 7.3 min. ESI-MS: calculated $[M+H]^+$ for HTK03029 $C_{55}H_{74}N_9O_{16}$ 1116.5; found $[M+H]^+$ 1116.6. For HTK03041, the HPLC conditions were 31% acetonitrile in water with 0.1% TFA at a flow rate of 4.5 mL/min. The retention time was 7.2 min. ESI-MS: calculated $[M+H]^+$ for HTK03041 $C_{53}H_{74}N_9O_{16}$ 1092.5; found $[M+H]^+$ 1092.6.

Synthesis of Ga-Labeled Standards

To prepare Ga-labeled standards, a solution of each precursor was incubated with $GaCl_3$ (5 eq.) in NaOAc buffer (0.1 M, 500 μL, pH 4.2) at 80° C. for 15 min. The reaction mixture was then purified by HPLC using the semi-preparative column, and the HPLC eluates containing the desired peptide were collected, pooled, and lyophilized. For Ga-HTK03026, the HPLC conditions were 27% acetonitrile in water with 0.1% TFA at a flow rate of 4.5 mL/min. The retention time was 9.4 min. ESI-MS: calculated $[M+H]^+$ for Ga-HTK03026 $C_{44}H_{73}N_9O_{16}Ga$ 1052.4; found $[M+H]^+$ 1052.5. For Ga-HTK03027, the HPLC conditions were 32% acetonitrile in water with 0.1% TFA at a flow rate of 4.5 mL/min. The retention time was 9.5 min. ESI-MS: calculated $[M+H]^+$ for Ga-HTK03027 $C_{53}H_{72}N_9O_{16}Ga$ 1159.4; found $[M+H]^+$ 1161.4. For HTK03029, the HPLC conditions were 33% acetonitrile in water with 0.1% TFA at a flow rate of 4.5 mL/min. The retention time was 10.3 min. ESI-MS: calculated $[M+H]^+$ for Ga-HTK03029 $C_{55}H_{72}N_9O_{16}Ga$ 1183.4; found $[M+H]^+$ 1183.4. For Ga-HTK03041, the HPLC conditions were 31% acetonitrile in water with 0.1% TFA at a flow rate of 4.5 mL/min. The retention time was 9.3 min. ESI-MS: calculated $[M+H]^+$ for Ga-HTK03041 $C_{53}H_{72}N_9O_{16}Ga$, 1159.4; found $[M+H]^+$ 1159.4.

Synthesis of Lu-Labeled Standard

To prepare Lu-labeled standard HTK03041, a solution of precursor was incubated with $LuCl_3$ (5 eq.) in NaOAc buffer (0.1 M, 500 λL, pH 4.2) at 80° C. for 15 min. The reaction mixture was then purified by HPLC using the semi-preparative column, and the HPLC eluates containing the desired peptide were collected, pooled, and lyophilized. The HPLC conditions were 29% acetonitrile in water with 0.1% TFA at a flow rate of 4.5 mL/min. The retention time was 8.6 min. ESI-MS: calculated $[M+H]^+$ for Lu-HTK03041 $C_{53}H_{71}N_9O_{16}Lu$, 1264.4; found $[M+H]^+$ 1264.6.

Synthesis of $^{68}Ga$-Labeled Compounds

The radiolabeling experiments were performed following previously published procedures (e.g. Lin et al., *Cancer Res.* 2015, 75:387-393). Purified $^{68}Ga$ in 0.5 mL water was added into a 4-mL glass vial preloaded with 0.7 mL of HEPES buffer (2 M, pH 5.0) and 50 μg of the DOTA-conjugated precursor (HTK03026, HTK03027, HTK03029 or HTK03041). The radiolabeling reaction was carried out under microwave heating for 1 min. The reaction mixture was purified by HPLC using the semi-preparative column. The eluate fraction containing the radiolabeled product was collected, diluted with water (50 mL), and passed through a C18 Sep-Pak cartridge that was pre-washed with ethanol (10 mL) and water (10 mL). After washing the C18 Sep-Pak cartridge with water (10 mL), the $^{68}Ga$-labeled product was eluted off the cartridge with ethanol (0.4 mL), and diluted with saline for imaging and biodistribution. The decay-corrected radiolabeling yields for the $^{68}Ga$-labeled HTK03026, HTK03027, HTK03029 are HTK03041 were >50%, and their radiochemical purities were >95%.

Synthesis of $^{177}$Lu-Labeled HTK03041

$^{177}$LuCl$_3$ (329.3-769.9 MBq in 10-20 µL) was added to a solution of HTK03041 (25 µg) in NaOAc buffer (0.5 mL, 0.1 M, pH 4.5). The mixture was incubated at 90° C. for 15 min, and then purified by HPLC using the semi-preparative column. The eluate fraction containing the radiolabeled product was collected, diluted with water (50 mL), and passed through a C18 Sep-Pak cartridge that was pre-washed with ethanol (10 mL) and water (10 mL). After washing the C18 Sep-Pak cartridge with water (10 mL), the $^{177}$Lu-labeled HTK03041 was eluted off the cartridge with ethanol (0.4 mL), and diluted with saline for imaging and biodistribution. The decay-corrected radiolabeling yield for $^{177}$Lu-labeled HTK03041 was >50%, and its radiochemical purity was >95%.

Cell Culture

LNCap cell line was obtained from ATCC (LNCaP clone FGC, CRL-1740). It was established from a metastatic site of left supraclavicular lymph node of human prostatic adenocarcinoma. Cells were cultured in PRMI 1640 medium supplemented with 10% FBS, penicillin (100 U/mL) and streptomycin (100 µg/mL) at 37° C. in a humidified incubator containing 5% CO$_2$. Cells grown to 80-90% confluence were then washed with sterile phosphate-buffered saline (1×PBS pH 7.4) and trypsinization. The collected cells number was counted with a Hausser Scientific (Horsham, PA) Hemacytometer.

In Vitro Competition Binding Assays

The LNCaP Cells (400,000/well) were plated onto a 24-well poly-D-lysine coated plate for 48 h. Growth media was removed and replaced with HEPES buffered saline (50 mM HEPES, pH 7.5, 0.9% sodium chloride) and allowed to incubate with the cells for 1 h at 37° C. $^{18}$F-DCFPyL (0.1 nM) was added to each well (in triplicate) containing various concentrations of tested compounds. Non-specific binding was determined in the presence of 10 µM non-radiolabeled DCFPyL. The assay mixtures were further incubated for 1 h at 37° C. with gentle agitation. Then, the buffer and hot ligand were removed, and cells were washed twice with cold HEPES buffered saline. Trypsin solution (0.25%, 400 µl) was then added to each well to harvest the cells. Radioactivity was measured on the gamma counter. Data analyses of $K_i$ were performed using the nonlinear regression algorithm of GraphPad Prism 7 software.

PET/CT, SPECT/CT Imaging and Biodistribution

Imaging and biodistribution experiments were performed using NODSCID 1L2RγKO male mice. Mice were anesthetized by inhalation with 2% isoflurane in oxygen, and implanted subcutaneously with 1×10$^7$ LNCaP cells behind left shoulder. Mice were imaged or used in biodistribution studies when the tumor grew up to reach 5-8 mm in diameter during 5-6 weeks.

PET imaging experiments were conducted using Siemens Inveon micro PET/CT scanner. Each tumor bearing mouse was injected 6-8 MBq of Ga-68 labeled tracer through the tail vein under anesthesia (2% isoflurane in oxygen). The mice were allowed to recover and roam freely in their cage. After 50 min, the mice were sedated again with 2% isoflurane in oxygen inhalation and positioned in the scanner. A 10-min CT scan was conducted first for localization and attenuation correction after segmentation for reconstructing the PET images. Then, a 10-min static PET imaging was performed to determined uptake in tumor and other organs. The mice were kept warm by a heating pad during acquisition. For imaging studies acquired at 3 h post-injection (p.i.), the mice were placed in the micro PET/CT scanner at 170 min p.i. Then, the CT acquisitions were conducted as described above, a 15-min static PET imaging was performed to determined uptake in tumor and other organs.

SPECT/CT imaging experiments were conducted using the MILabs (Utrecht, the Netherlands) U-SPECT-II/CT scanner. Each tumor bearing mouse was injected with ~37 MBq of $^{177}$Lu-labeled HTK03041 through the tail vein under anesthesia (2% isoflurane in oxygen). The mice were allowed to recover and roam freely in their cage and imaged at 1, 4, 24, 72 and 120 hours after injection. At each time point, the mice were sedated again and positioned in the scanner. A 5-min CT scan was conducted first for anatomical reference with a voltage setting at 60 kV and current at 615 µA followed by a 60-min static emission scan acquired in list mode using an ultra-high resolution multi-pinhole rat-mouse (1 mm pinhole size) collimator. Data were reconstructed using the U-SPECT II software with a 20% window width on three energy windows. The photopeak window was centered at 208 keV, with lower scatter and upper scatter windows centered at 170 and 255 keV, respectively. Reconstruction parameters used maximum-likelihood expectation maximization (3 iterations), pixel-based ordered subset expectation maximization (16 subsets), and a post-processing filter (Gaussian blurring) of 0.5 mm. Images were decay corrected to injection time in PMOD (PMOD Technologies, Switzerland) then converted to DICOM for qualitative visualization in Inveon Research Workplace (Siemens Medical Solutions USA, Inc.).

For biodistribution studies, the mice were injected with the radiotracer as described above. At predetermined time points (1 or 3 h for $^{68}$Ga studies; 1, 4, 24, 72, or 120 h for $^{177}$Lu studies), the mice was anesthetized with 2% isoflurane inhalation, and euthanized by CO$_2$ inhalation. Blood was withdrawn immediately from the heart, and the organs/tissues of interest were collected. The collected organs/tissues were weighed and counted using a Perkin Elmer (Waltham, MA) Wizard2 2480 gamma counter. The uptake in each organ/tissue was normalized to the injected dose using a standard curve, and expressed as the percentage of the injected dose per gram of tissue (% ID/g).

Results

Binding Affinity

Figure 2:
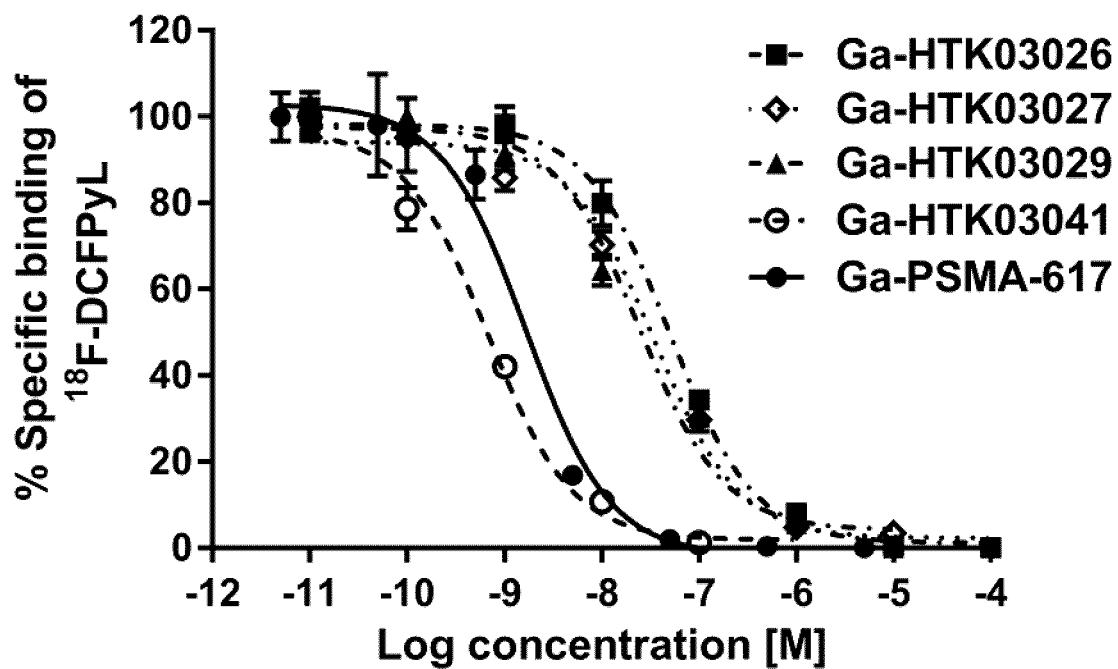
FIG. 2 shows representative displacement curves of $^{18}$F-DCFPyL by Ga-PSMA-617, Ga-HTK03026, Ga-HTK03027, Ga-HTK03029, and Ga-HTK03041.

The binding affinities of Ga-HTK03026, Ga-HTK03027, Ga-HTK03029, and Ga-HTK03041 were measured by in vitro competition binding assays using PSMA-expressing LNCaP cells and $^{18}$F-DCFPyL as the radioligand. As shown in FIG. 2, all tested compounds inhibited the binding of $^{18}$F-DCFPyL to LNCaP cells in a dose-dependent manner. The calculated K values for Ga-HTK03026, Ga-HTK03027, Ga-HTK03029, and Ga-HTK03041 were 48.2±16.8 (n=3), 22.0±8.9 (n=2), 16.6±3.6 (n=3) and 0.63±0.06 nM (n=3), respectively.

Biodistribution of $^{68}$Ga-Labeled PSMA-Targeting Tracers

Detailed uptake values of $^{68}$Ga-labeled HTK03026, HTK03027, HTK03029 and HTK03041 in various tissues/organs of LNCaP tumor-bearing mice are provided in Table 5. $^{68}$Ga-labeled HTK03026, HTK03027 and HTK03029 showed comparable tumor uptake (~13% ID/g) at 1 h post-injection. $^{68}$Ga-HTK03041 had the highest uptake (23.1±6.11% ID/g) in LNCap tumor xenografts at 1 h post-injection, and the uptake value increased to 28.2±9.17% I D/g at 3 h post-injection.

PET/CT Imaging of $^{68}$Ga-Labeled PSMA-Targeting Tracers

Figure 3:
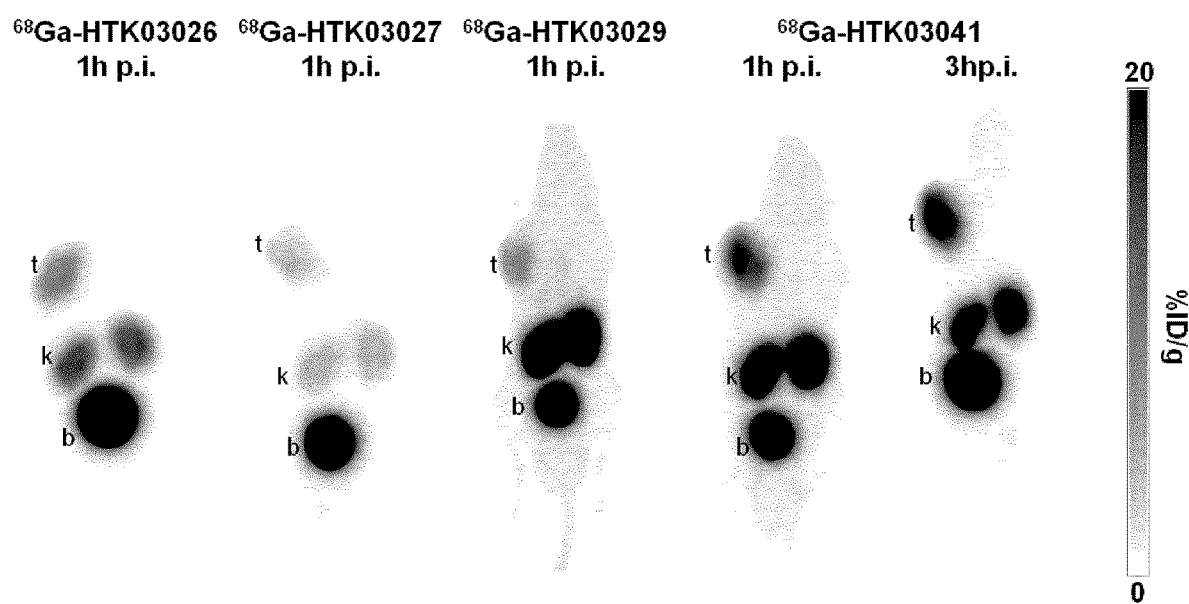
FIG. 3 shows PET/CT images of (A) $^{68}$Ga-HTK03026, (B) $^{68}$Ga-HTK03027, (C) $^{68}$Ga-HTK03029 and (D) $^{68}$Ga-HTK03041 in mice bearing LNCaP tumors (t: tumor, k: kidney, b: bladder).

Representative PET/CT images of $^{68}$Ga-labeled HTK03026, HTK03027, HTK03029 and HTK03041 are provided in FIG. 3. Consistent with the biodistribution data provided in Table 5, higher uptake was observed in LNCap tumor xenografts, kidneys and urinary bladders.

Biodistribution of $^{177}$Lu-Labeled HTK03041

Detailed uptake values of $^{177}$Lu-HTK03041 in various tissues/organs of LNCap tumor-bearing mice are provided in Table 6. The tumor uptake of $^{177}$Lu-HTK03041 peaked at 4 h post-injection (18.7±2.96% ID/g), and remained at the similar level throughout the investigated time points (up to 120 h post-injection).

SPECT/CT Imaging of $^{177}$Lu-Labeled HTK03041

Figure 4:
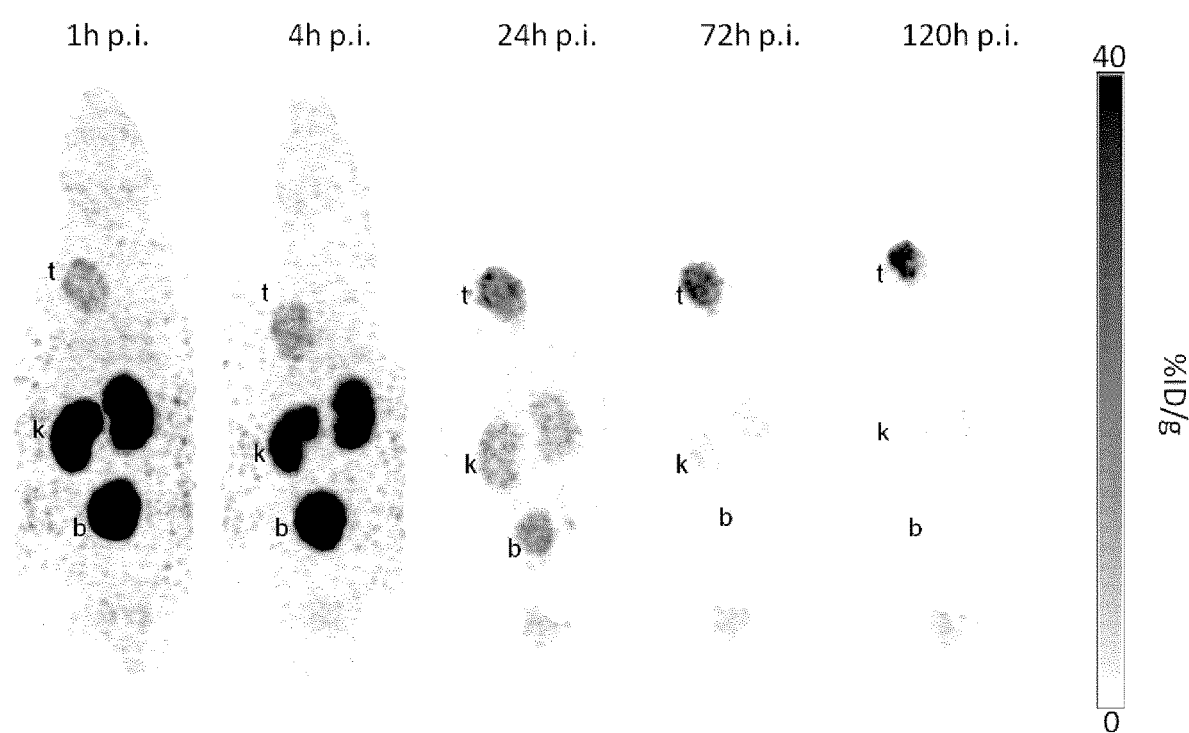
FIG. 4 shows maximum intensity projection SPECT images of $^{177}$Lu-HTK03041 acquired at 1 h, 4 h, 24 h, 72 h, and 120 h post-injection (t: tumor, k: kidney, b: bladder).

Representative SPECT images of $^{177}$Lu-HTK03041 at different time points are provided in FIG. 4. Consistent with the biodistribution data, the high uptake of $^{177}$Lu-HTK03041 in tumor sustained over the course the study (up to 120 h post-injection). In contrast, the uptake of $^{177}$Lu-HTK03041 in background tissues including kidneys cleared quickly over time.

TABLE 5

Biodistribution data and tumor-to-background contrast ratios of $^{68}$Ga-labelled HTK03026, HTK03027, HTK03029, and HTK03041 in mice bearing PSMA-expressing LNCAP cancer xenografts.

| Tissue (% ID/g) | $^{68}$Ga-HTK03026 1 h (n = 7) | $^{68}$Ga-HTK03027 1 h (n = 5) | $^{68}$Ga-HTK03029 1 h (n = 5) | $^{68}$Ga-HTK03041 1 h (n = 6) | $^{68}$Ga-HTK03041 3 h (n = 6) |
|---|---|---|---|---|---|
| Blood | 0.70 ± 0.19 | 1.56 ± 0.57 | 3.93 ± 0.91 | 1.43 ± 0.30 | 0.83 ± 0.27 |
| Urine | 575 ± 245 | 844 ± 645 | 175 ± 178 | 173 ± 93.01 | 171 ± 93.3 |
| Fat | 0.45 ± 0.11 | 1.03 ± 0.67 | 1.57 ± 0.42 | 2.06 ± 0.59 | 1.06 ± 0.20 |
| Seminal | 0.43 ± 0.31 | 10.6 ± 10.9 | 6.74 ± 10.7 | 1.03 ± 0.27 | 4.56 ± 9.00 |
| Testes | 0.35 ± 0.22 | 0.56 ± 0.18 | 1.02 ± 0.13 | 1.34 ± 0.22 | 0.89 ± 0.12 |
| Intestine | 0.29 ± 0.06 | 0.44 ± 0.12 | 0.77 ± 0.11 | 1.14 ± 0.18 | 0.67 ± 0.09 |
| Stomach | 0.10 ± 0.03 | 0.17 ± 0.10 | 0.31 ± 0.08 | 0.41 ± 0.11 | 0.26 ± 0.06 |
| Spleen | 1.34 ± 0.54 | 3.36 ± 2.54 | 7.08 ± 5.08 | 8.95 ± 3.22 | 4.19 ± 1.58 |
| Liver | 0.24 ± 0.06 | 0.46 ± 0.10 | 1.32 ± 0.63 | 1.38 ± 0.25 | 0.82 ± 0.15 |
| Pancreas | 0.71 ± 1.04 | 0.57 ± 0.20 | 0.94 ± 0.18 | 1.47 ± 0.16 | 0.71 ± 0.12 |
| Adrenal glands | 1.84 ± 0.95 | 3.55 ± 2.33 | 4.91 ± 1.57 | 8.90 ± 2.56 | 4.04 ± 1.20 |
| Kidneys | 68.5 ± 28.2 | 85.6 ± 73.5 | 198 ± 49.3 | 170 ± 26.4 | 121 ± 37.6 |
| Lungs | 0.82 ± 0.26 | 1.66 ± 0.67 | 3.59 ± 0.69 | 4.32 ± 0.62 | 2.14 ± 0.39 |
| Heart | 0.30 ± 0.06 | 0.56 ± 0.24 | 1.25 ± 0.27 | 1.82 ± 0.21 | 0.93 ± 0.17 |
| Tumor | 12.5 ± 2.90 | 13.3 ± 5.44 | 13.9 ± 6.58 | 23.1 ± 6.11 | 28.2 ± 9.17 |
| Muscle | 0.28 ± 0.13 | 0.48 ± 0.37 | 0.63 ± 0.10 | 0.75 ± 0.09 | 0.40 ± 0.06 |
| Bone | 0.54 ± 0.20 | 0.70 ± 0.33 | 0.92 ± 0.14 | 1.29 ± 0.45 | 0.98 ± 0.40 |
| Brain | 0.06 ± 0.02 | 0.06 ± 0.03 | 0.09 ± 0.02 | 0.10 ± 0.05 | 0.06 ± 0.02 |
| Tail | 0.90 ± 0.56 | 0.98 ± 0.38 | 2.18 ± 0.65 | 1.36 ± 0.45 | 0.86 ± 0.73 |
| Thyroid | 0.35 ± 0.08 | 0.76 ± 0.33 | 1.57 ± 0.32 | 2.48 ± 0.44 | 1.19 ± 0.23 |
| Salivary | 0.83 ± 0.22 | 1.86 ± 0.91 | 3.27 ± 1.02 | 4.99 ± 0.88 | 2.11 ± 0.57 |
| Lacrimal | 1.33 ± 0.90 | 1.00 ± 0.56 | 1.06 ± 0.49 | 2.44 ± 1.79 | 2.82 ± 3.84 |
| Tumor: Blood | 18.6 ± 5.54 | 8.57 ± 2.83 | 3.39 ± 1.01 | 17.3 ± 7.24 | 36.6 ± 15.4 |
| Tumor: Muscle | 52.8 ± 24.9 | 35.0 ± 18.7 | 21.3 ± 7.50 | 31.6 ± 12.1 | 73.8 ± 30.9 |
| Tumor: kidney | 0.22 ± 0.15 | 0.27 ± 0.20 | 0.07 ± 0.02 | 0.14 ± 0.04 | 0.26 ± 0.13 |

TABLE 6

Biodistribution data and tumor-to-background contrast ratios of $^{177}$Lu-labelled HTK03041 in mice bearing PSMA-expressing cancer xenografts.

| Tissue (% ID/g) | $^{177}$Lu-HTK03041 1 h (n = 5) | 4 h (n = 5) | 24 h (n = 5) | 72 h (n = 5) | 120 h (n = 5) |
|---|---|---|---|---|---|
| Blood | 0.84 ± 0.15 | 0.31 ± 0.04 | 0.07 ± 0.00 | 0.02 ± 0.00 | 0.01 ± 0.01 |
| Urine | 160 ± 49.6 | 84.6 ± 39.3 | 23.8 ± 8.50 | 0.67 ± 0.22 | 0.29 ± 0.04 |
| Fat | 1.09 ± 0.20 | 0.56 ± 0.16 | 0.16 ± 0.02 | 0.03 ± 0.01 | 0.05 ± 0.09 |
| Seminal | 1.22 ± 0.85 | 0.57 ± 0.12 | 0.23 ± 0.13 | 0.03 ± 0.01 | 0.02 ± 0.01 |
| Testes | 1.01 ± 0.17 | 0.92 ± 0.10 | 0.40 ± 0.08 | 0.08 ± 0.02 | 0.06 ± 0.01 |
| Intestine | 1.25 ± 0.15 | 0.95 ± 0.08 | 0.30 ± 0.06 | 0.13 ± 0.04 | 0.06 ± 0.03 |
| Stomach | 0.47 ± 0.18 | 0.37 ± 0.06 | 0.18 ± 0.04 | 0.19 ± 0.09 | 0.05 ± 0.04 |
| Spleen | 8.80 ± 2.53 | 3.22 ± 1.01 | 0.59 ± 0.19 | 0.12 ± 0.04 | 0.22 ± 0.11 |
| Liver | 1.91 ± 0.38 | 1.46 ± 0.17 | 0.42 ± 0.08 | 0.13 ± 0.05 | 0.13 ± 0.04 |
| Pancreas | 1.61 ± 0.24 | 1.15 ± 0.13 | 0.26 ± 0.04 | 0.05 ± 0.02 | 0.04 ± 0.01 |
| Adrenal glands | 5.53 ± 1.90 | 3.41 ± 0.54 | 0.76 ± 0.10 | 0.12 ± 0.05 | 0.11 ± 0.11 |
| Kidneys | 98.6 ± 9.27 | 101 ± 13.3 | 20.3 ± 6.51 | 1.27 ± 0.58 | 1.06 ± 0.74 |
| Lungs | 4.41 ± 0.49 | 3.20 ± 0.41 | 0.83 ± 0.12 | 0.14 ± 0.04 | 0.10 ± 0.04 |
| Heart | 2.44 ± 0.43 | 1.69 ± 0.13 | 0.41 ± 0.07 | 0.07 ± 0.02 | 0.06 ± 0.02 |
| Tumor | 10.8 ± 1.57 | 18.7 ± 2.96 | 19.8 ± 6.13 | 15.2 ± 4.72 | 22.3 ± 6.90 |
| Muscle | 0.94 ± 0.20 | 0.56 ± 0.15 | 0.15 ± 0.03 | 0.02 ± 0.01 | 0.02 ± 0.02 |
| Bone | 0.29 ± 0.07 | 0.45 ± 0.53 | 0.07 ± 0.02 | 0.02 ± 0.01 | 0.02 ± 0.00 |
| Brain | 0.04 ± 0.01 | 0.05 ± 0.05 | 0.01 ± 0.00 | 0.01 ± 0.00 | 0.01 ± 0.00 |
| Tail | 3.41 ± 3.03 | 1.06 ± 0.60 | 0.34 ± 0.17 | 0.13 ± 0.08 | 0.11 ± 0.07 |
| Thyroid | 3.38 ± 0.44 | 2.10 ± 0.19 | 0.47 ± 0.09 | 0.09 ± 0.02 | 0.08 ± 0.03 |
| Salivary | 5.88 ± 0.82 | 2.18 ± 0.56 | 0.40 ± 0.06 | 0.08 ± 0.03 | 0.06 ± 0.04 |

TABLE 6-continued

Biodistribution data and tumor-to-background contrast ratios of $^{177}$Lu-labelled HTK03041 in mice bearing PSMA-expressing cancer xenografts.

| Tissue (% ID/g) | $^{177}$Lu-HTK03041 | | | | |
|---|---|---|---|---|---|
| | 1 h (n = 5) | 4 h (n = 5) | 24 h (n = 5) | 72 h (n = 5) | 120 h (n = 5) |
| Lacrimal | 0.03 ± 0.04 | 0.02 ± 0.01 | 0.00 ± 0.00 | 0.01 ± 0.01 | 0.01 ± 0.01 |
| Tumor: Blood | 13.4 ± 4.08 | 60.3 ± 4.81 | 282 ± 82.6 | 805 ± 164 | 1670 ± 272 |
| Tumor: Muscle | 12.1 ± 4.21 | 34.4 ± 8.39 | 142 ± 30.1 | 647 ± 119 | 1215 ± 512 |
| Tumor: kidney | 0.11 ± 0.02 | 0.19 ± 0.02 | 0.97 ± 0.15 | 13.1 ± 3.75 | 25.4 ± 9.59 |

Discussion

Here we disclose the design and synthesis of four $^{68}$Ga-labeled PSMA-targeting tracers ($^{68}$Ga-labeled HTK03026, HTK03027, HTK03029 and HTK03041), and their evaluation in LNCaP prostate tumor-bearing mice by in vivo PET/CT imaging and ex vivo biodistribution studies. The top candidate HTK03041 was selected, radiolabeled with $^{177}$Lu, and further evaluated in LNCaP prostate tumor-bearing mice by in vivo SPECT/CT imaging and ex vivo biodistribution studies for up to 120 h post-injection.

The radioligand with the highest commercialization potential is $^{177}$Lu-HTK03041 for radiotherapy of metastatic prostate cancer. Compared with the gold standard $^{177}$Lu-PSMA-617 which is currently under multicenter clinical trials, $^{177}$Lu-HTK03041 has higher peaked tumor uptake (~20% ID/g for $^{177}$Lu-HTK03041 vs ~15% ID/g for $^{177}$Lu-PSMA-617 reported previously: see Kuo H T et al. Molecular Pharmaceutics 2018; 15: 5183-5191). Most importantly, the tumor uptake of $^{177}$Lu-HTK03041 sustained over the course of the study (up to 120 h post-injection), whereas the tumor uptake of $^{177}$Lu-PSMA-617 was reported to gradually drop to ~8% ID/g at 120 h post-injection (see Kuo H T et al. Molecular Pharmaceutics 2018; 15: 5183-5191). Therefore, the radiation dose delivered to tumors by $^{177}$Lu-HTK03041 is expected to be much higher than $^{177}$Lu-PSMA-617, potentially leading to superior treatment efficacy of $^{177}$Lu-HTK03041.

What is claimed is:

1. A compound, wherein the compound has Formula I or is a salt or a solvate of Formula I:

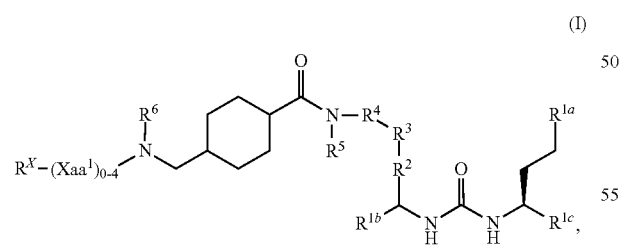

(I)

wherein:
each of $R^{1a}$, $R^{1b}$ and $R^{1c}$ is independently —CO$_2$H, —SO$_2$H, —SO$_3$H, —SO$_4$H, —PO$_2$H, —PO$_3$H, or —PO$_4$H;

$R^2$ is a linear or branched, cyclic or acyclic, and/or aromatic or non-aromatic $C_1$-$C_{20}$ alkylenyl or alkenylenyl, or a linear or branched, cyclic or acyclic, and/or aromatic or non-aromatic $C_2$-$C_{20}$ heteroalkylenyl or heteroalkenylenyl;

$R^3$ is —O—, —S—, —S(O)—, —S(O)$_2$—, —NHC(O)—, —C(O)NH—,

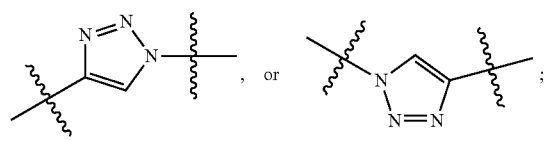 [SMILES: *c1cn(*)nn1 ; *c1cn(*)nn1]

, or ;

$R^4$ is —(CH$_2$)$_{0-3}$CH(R$_7$)(CH$_2$)$_{0-3}$—, wherein $R^7$ is (CH$_2$)$_5$CH$_3$,

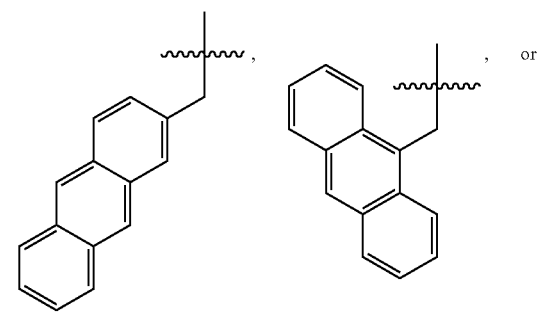

, or

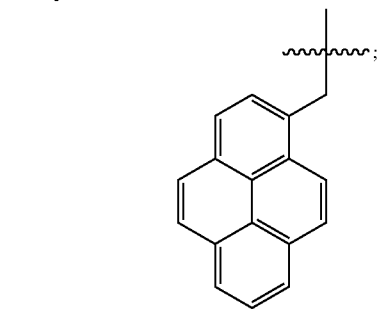

;

each of $R^5$ and $R^6$ is independently hydrogen or methyl;
Xaa$^1$ is an amino acid of formula —N(R$^8$)R$^9$C(O)—, wherein each $R^8$ is independently hydrogen or methyl, and wherein each $R^9$ is independently: a linear or branched, cyclic or acyclic, and/or aromatic or non-aromatic $C_1$-$C_{20}$ alkylenyl, alkenylenyl, or alkynylenyl; or a linear or branched, cyclic or acyclic, and/or aromatic or non-aromatic $C_2$-$C_{20}$ heteroalkylenyl, heteroalkenylenyl, or heteroalkynylenyl; and
$R^X$ is a radiolabeling group independently selected from: a radiometal chelator optionally bound by a radiometal; an aryl substituted with a radioisotope; a prosthetic group containing a trifluoroborate; and a prosthetic group containing a silicon-fluorine-acceptor moiety.

2. The compound of claim 1, which is of Formula I-a or is a salt or solvate of Formula I-a

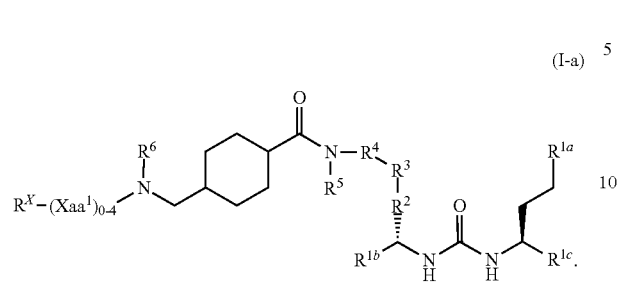

(I-a)

3. The compound of claim 1, which is of Formula I-b or is a salt or solvate of Formula I-b

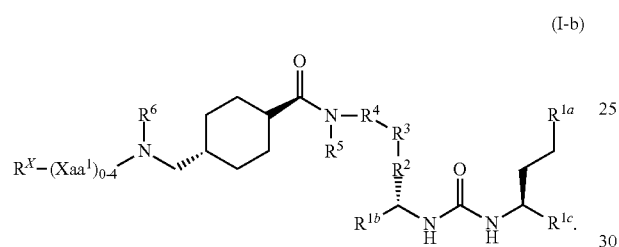

(I-b)

4. The compound of claim 1, wherein $R^7$ is —$(CH_2)_5CH_3$,

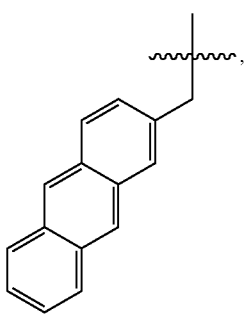 [SMILES: *Cc1ccc2cc3ccccc3cc2c1]

or

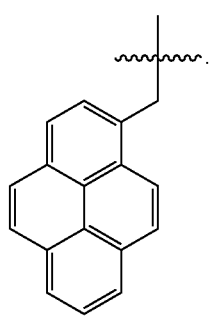 [SMILES: *Cc1ccc2ccc3cccc4ccc1c2c34]

5. The compound of claim 1, wherein $R^7$ is

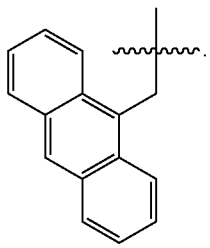

6. The compound of claim 1, wherein $R^7$ forms the side chain of an L-amino acid residue.
7. The compound of claim 1, wherein $R^7$ forms the side chain of a D-amino acid residue.
8. The compound of claim 1, wherein $R^7$ is

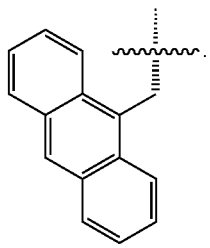

9. The compound of claim 1, wherein $R^2$ is a linear or branched $C_1$-$C_{20}$ alkylenyl in which 0-5 carbons are replaced with N, S, and/or O heteroatoms.
10. The compound of claim 1, wherein $R^2$ is —$(CH_2)_{1-8}$—.
11. The compound of claim 1, wherein $R^2$ is —$(CH_2)_4$—.
12. The compound of claim 1, wherein $R^3$ is —NHC(O)— or —C(O)NH—.
13. The compound of claim 1, wherein $R^5$ is hydrogen.
14. The compound of claim 1, wherein $R^6$ is hydrogen.
15. The compound of claim 1, wherein each of $R^{1a}$, $R^{1b}$, and $R^{1c}$ is —$CO_2H$.
16. The compound of claim 1, wherein the compound is of Formula II or is a salt or solvate of Formula II

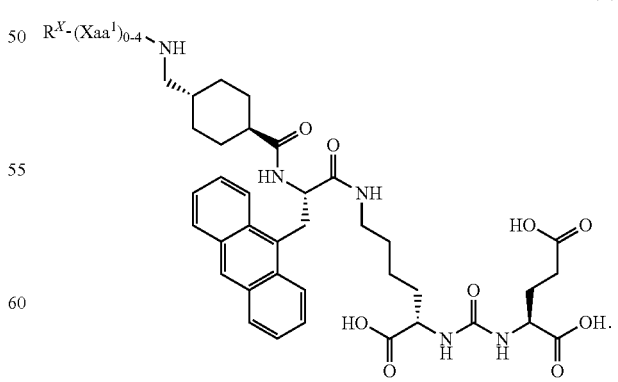

(II)

17. The compound of claim 1, wherein $(Xaa^1)_{0-4}$ is $Xaa^1$.
18. The compound of claim 1, wherein each $R^9$ is independently: a linear or branched $C_1$-$C_{18}$ alkylenyl in which 0-5 carbons are replaced with N, S, and/or O heteroatoms; or —CH(CH$_2$R$^{10}$)— wherein each R$^{10}$ is independently a C$_5$-C$_{16}$ cyclic or multicylic system in which 0-5 carbons are replaced with N and optionally substituted with 0-5 hydroxy groups, and which is non-aromatic, partially aromatic or fully aromatic.

19. The compound of claim 1, wherein each Xaa$^1$ is an amino acid independently selected from a proteinogenic amino acid or an amino acid listed in Table 1, and R$^X$ forms an amide bond with Xaa$^1$.

20. The compound of claim 1, wherein (Xaa$^1$)$_{0-4}$ is (Xaa$^1$)$_{2-4}$ in which each Xaa$^1$ is an amino acid independently selected from a proteinogenic amino acid or an amino acid listed in Table 1, and wherein the linkages between Xaa$^1$ groups and between R$^X$ and Xaa$^1$ are amide bonds.

21. The compound of claim 1, wherein (Xaa$^1$)$_{0-4}$ is absent.

22. The compound of claim 1, wherein R$^X$ is polyaminocarboxylate chelator attached through an amide bond.

23. The compound of claim 1, wherein R$^X$ is:
DOTA (1,4,7,10-tetraazacyclododecane-1,4,7,10-tetraacetic acid) or a derivative thereof;
TETA (1,4,8,11-tetraazacyclotetradecane-1,4,8,11-tetraacetic acid) or a derivative thereof;
SarAr (1-N-(4-Aminobenzyl)-3,6,10,13,16,19-hexaazabicyclo[6.6.6]-eicosane-1,8-diamine) or a derivative thereof;
NOTA (1,4,7-triazacyclononane-1,4,7-triacetic acid) or a derivative thereof;
TRAP (1,4,7-triazacyclononane-1,4,7-tris[methyl(2-carboxyethyl)phosphinic acid) or a derivative thereof;
HBED (N,N'-bis(2-hydroxybenzyl)-ethylenediamine-N,N'-diacetic acid) or a derivative thereof;
2,3-HOPO (3-hydroxypyridin-2-one) or a derivative thereof;
PCTA (3,6,9,15-tetraazabicyclo[9.3.1]-pentadeca-1(15), 11,13-triene-3,6,9,-triacetic acid) or a derivative thereof;
DFO (desferrioxamine) or a derivative thereof;
DTPA (diethylenetriaminepentaacetic acid) or a derivative thereof;
OCTAPA (N,N'-bis(6-carboxy-2-pyridylmethyl)-ethylenediamine-N,N'-diacetic acid) or a derivative thereof; or
H$_2$-MACROPA (N,N'-bis[(6-carboxy-2-pyridil)methyl]-4,13-diaza-18-crown-6) or a derivative thereof.

24. The compound of claim 23, wherein R$^X$ is DOTA.

25. The compound of claim 1, wherein R$^X$ is a chelator moiety in complex with radioisotope X wherein X is $^{64}$Cu, $^{67}$Cu, $^{90}$Y, $^{111}$In, $^{114m}$In, $^{117m}$Sn, $^{153}$Sm, $^{149}$Tb, $^{161}$Tb, $^{177}$Lu, $^{225}$Ac, $^{213}$Bi, $^{224}$Ra, $^{212}$Bi, $^{212}$Pb, $^{227}$Th, $^{223}$Ra, $^{47}$Sc, $^{186}$Re, or $^{188}$Re.

26. The compound of claim 25, wherein X is $^{177}$Lu.

27. The compound of claim 1, wherein R$^X$ is a chelator moiety in complex with radioisotope X wherein X is $^{64}$Cu, $^{68}$Ga, $^{86}$Y, $^{111}$In, $^{94m}$Tc, $^{44}$Sc, $^{89}$Zr, or $^{99m}$Tc.

28. The compound of claim 27, wherein X is $^{68}$Ga.

29. The compound of claim 1, wherein R$^X$ is an aryl substituted with a radioisotope.

30. The compound of claim 29, wherein the radioisotope is $^{131}$I.

31. The compound of claim 1, wherein R$^X$ is a prosthetic group containing a trifluoroborate.

32. The compound of claim 31, wherein the prosthetic group is selected from Table 3 or 4.

33. The compound of claim 31, wherein the prosthetic group is

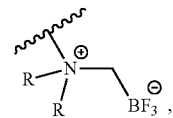

wherein each R is a branched or linear C$_1$-C$_5$ alkyl.

34. The compound of claim 1, wherein R$^X$ is a prosthetic group containing a silicon-fluorine-acceptor moiety.

35. The compound of claim 31, wherein the prosthetic group comprises $^{18}$F.

36. A method of imaging a prostate-specific membrane antigen (PSMA)-expressing cancer in a subject, comprising administering to the subject in need of imaging an effective amount of a compound of claim 1; and imaging the PSMA-expressing cancer, wherein R$^X$ comprises or is complexed with an imaging radioisotope.

37. A method of treating a prostate-specific membrane antigen (PSMA)-expressing cancer in a subject, comprising administering to the subject in need thereof a therapeutically effective amount of a compound of claim 1; wherein R$^X$ comprises or is complexed with a therapeutic radioisotope.

38. The method of claim 37, wherein the PSMA-expressing cancer is prostate cancer, renal cancer, breast cancer, thyroid cancer, gastric cancer, colorectal cancer, bladder cancer, pancreatic cancer, lung cancer, liver cancer, brain tumor, melanoma, neuroendocrine tumor, ovarian cancer, or sarcoma.

39. The method of claim 36, wherein the PSMA-expressing cancer is prostate cancer, renal cancer, breast cancer, thyroid cancer, gastric cancer, colorectal cancer, bladder cancer, pancreatic cancer, lung cancer, liver cancer, brain tumor, melanoma, neuroendocrine tumor, ovarian cancer, or sarcoma.

40. The compound of claim 1 of Formula I or a salt or a solvate of Formula I having the following chemical formula:

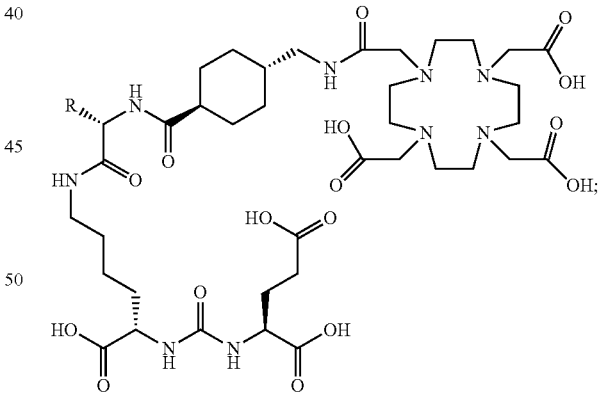

wherein R is

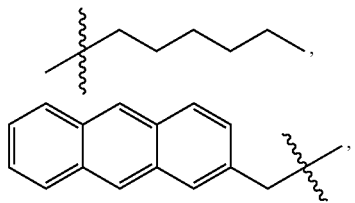

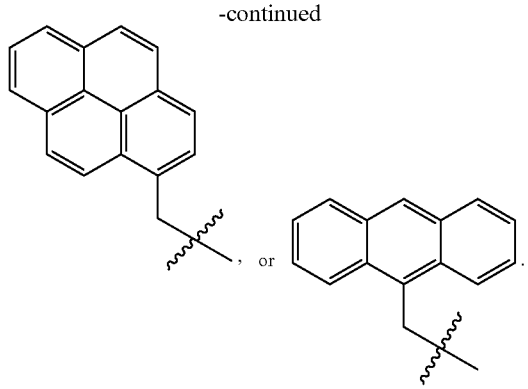
* * * * *